(12) United States Patent
Yu et al.

(10) Patent No.: US 12,689,490 B2
(45) Date of Patent: Jul. 21, 2026

(54) NULL DATA PACKET ANNOUNCEMENT FRAME TRANSMISSION METHOD AND RELATED APPARATUS

(71) Applicant: Nokia Technologies OY, Espoo (FI)

(72) Inventors: Jian Yu, Shenzhen (CN); Yuchen Guo, Shenzhen (CN); Chenchen Liu, Shenzhen (CN); Yunbo Li, Shenzhen (CN); Ming Gan, Shenzhen (CN); Dandan Liang, Shenzhen (CN)

(73) Assignee: Nokia Technologies Oy, Espoo (FI)

( * ) Notice: Subject to any disclaimer, the term of this patent is extended or adjusted under 35 U.S.C. 154(b) by 67 days.

(21) Appl. No.: 17/992,705

(22) Filed: Nov. 22, 2022

(65) Prior Publication Data

US 2023/0086669 A1     Mar. 23, 2023

Related U.S. Application Data

(63) Continuation of application No. PCT/CN2021/093950, filed on May 14, 2021.

(30) Foreign Application Priority Data

May 22, 2020   (CN) .......................... 202010443487.6
Sep. 14, 2020   (CN) .......................... 202010963022.3

(51) Int. Cl.
*H04L 5/00* (2006.01)
(52) U.S. Cl.
CPC .................................. *H04L 5/0057* (2013.01)
(58) Field of Classification Search
USPC ....... 370/229, 230, 236, 241, 251, 252, 328, 370/329, 330
See application file for complete search history.

(56) References Cited

U.S. PATENT DOCUMENTS 9,520,964 B2   12/2016   Sohn et al.
9,756,612 B2   9/2017   Park et al.
(Continued)

FOREIGN PATENT DOCUMENTS

AU       2012295079 A1   3/2014
CN       103202085 A   7/2013
(Continued)

OTHER PUBLICATIONS

"IEEE P802.11ax/D6.0 Draft Standard for Information technology—Tele-communications and information exchange between systems Local and metropolitan area networks—Specific requirements," Part 11: Wireless LAN Medium Access Control (MAC) and Physical Layer (PHY) Specifications, Total 780 pages, Institute of Electrical Electronics Engineers, New York, New York (Nov. 2019).
(Continued)

*Primary Examiner* — Nguyen H Ngo
(74) *Attorney, Agent, or Firm* — Harness, Dickey & Pierce, P.L.C.

(57) ABSTRACT

A method includes: An access point generates an NDPA frame, where the NDPA frame includes a station information field, and the station information field includes an AID subfield indicating an association identifier AID of a station; the station information field further includes a partial bandwidth information subfield; the partial bandwidth information subfield indicates an RU that is in a bandwidth corresponding to the NDPA frame and for which the station needs to feed back channel state information; and the bandwidth corresponding to the NDPA frame is greater than 160 MHz. The access point transmits the NDPA frame.

13 Claims, 15 Drawing Sheets

(56) References Cited

U.S. PATENT DOCUMENTS

| | | | |
|---|---|---|---|
| 10,057,036 B2 | 8/2018 | Lee et al. | |
| 2015/0311964 A1 | 10/2015 | Sohn et al. | |
| 2016/0165574 A1 | 6/2016 | Chu et al. | |
| 2016/0254884 A1 | 9/2016 | Hedayat et al. | |
| 2017/0054542 A1 | 2/2017 | Vermani et al. | |
| 2017/0079027 A1 | 3/2017 | Chun et al. | |
| 2017/0111148 A1 | 4/2017 | Park et al. | |
| 2017/0127385 A1 | 5/2017 | Vermani et al. | |
| 2018/0205442 A1* | 7/2018 | Oteri | H04B 7/0632 |
| 2018/0234135 A1 | 8/2018 | Vermani et al. | |
| 2018/0292518 A1 | 10/2018 | Chu et al. | |
| 2019/0069267 A1 | 2/2019 | Seok et al. | |
| 2019/0215037 A1* | 7/2019 | Seok | H04B 17/336 |
| 2019/0238259 A1 | 8/2019 | Huang et al. | |
| 2019/0261369 A1 | 8/2019 | Verma et al. | |
| 2019/0349067 A1 | 11/2019 | Huang et al. | |
| 2020/0153491 A1 | 5/2020 | Yang et al. | |
| 2020/0304266 A1* | 9/2020 | Chu | H04W 72/0453 |
| 2021/0329628 A1* | 10/2021 | Hu | H04W 74/04 |
| 2021/0336752 A1* | 10/2021 | Kwon | H04L 5/0055 |

FOREIGN PATENT DOCUMENTS

| | | |
|---|---|---|
| CN | 106658741 A | 5/2017 |
| CN | 109417436 A | 3/2019 |
| CN | 109547072 A | 3/2019 |
| CN | 109714092 A | 5/2019 |
| CN | 110730050 A | 1/2020 |
| CN | 110740457 A | 1/2020 |
| CN | 111162825 A | 5/2020 |
| KR | 20170117445 A | 10/2017 |
| WO | 2017030342 A1 | 2/2017 |
| WO | 2018222177 A1 | 12/2018 |
| WO | 2020094098 A1 | 5/2020 |

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11-2016, Total 3534 pages, Institute of Electrical Electronics Engineers, New York, New York (Approved Dec. 7, 2016).

Porat et al., "Sounding Design," Broadcom, doc.: IEEE 802.11-16/0389r0, Total 34 pages (Mar. 13, 2016).

Jian Yu et al., "HE NDPA frame format," Huawei, doc.: IEEE 802.11-16/0609r1, Total 19 pages (May 13, 2016).

Porat et al., "Feedback Tone Map and Quantization," Broadcom, doc.: IEEE 802.11-16/0649r0, Total 17 pages (May 14, 2016).

Banerjea et al., "CIDs for: Section 25.6 HE Sounding Comment Resolution," IEEE P802.11 Wireless LANs, May 16, 2016, doc.: IEEE 802.11-16/0773r4, Total 15 pages (Jun. 2016).

Wentink et al., "11ax D1.0 Mac Comment Resolution for 9.3.1.20," IEEE P802.11 Wireless LANs, May 8, 2017, doc.: IEEE 802.11-17/1081r2, Total 9 pages (Jul. 2017).

Asterjadhi et al., "Comment resolutions for 9.3.1.20," IEEE P802.11 Wireless LANs, doc.: IEEE 802.11-18/0008r0, Total 6 pages (Jan. 2018).

Fischer et al., "Disallowed Sub channels," Broadcom, IEEE P802.11 Wireless LANs, doc.: IEEE 802.11-18/0496r15, Total 20 pages (Sep. 2018).

Chen, "Changes to D3.2," IEEE P802.11 Wireless LANs, doc.: IEEE 802.11-18/2033r0, Total 4 pages (Nov. 2018).

Park et al., "Discussion on 240MHz Bandwidth," LG Electronics, doc.: IEEE 802.11-19/1889r2, total 15 pages (Nov. 2019).

Search Report and Written Opinion for Singapore Application No. 11202260485Q dated Sep. 14, 2025.

Office Action for Brazilian Application No. BR112022023636-0 dated May 14, 2021.

* cited by examiner

Bits: bits:

| 11 | 8 | ≤5 | 1 | ≥2 | 1 | 4 |
|----|---|----|----|-----|----|---|
| AID | Resource unit start index RU start index | Resource unit offset index RU offset index | Codebook size codebook Size | Feedback type and Ng feedback type and Ng | Disambiguation disambiguation | Number of columns Nc |

NULL DATA PACKET ANNOUNCEMENT FRAME TRANSMISSION METHOD AND RELATED APPARATUS

CROSS-REFERENCE TO RELATED APPLICATIONS

This application is a continuation of International Patent Application No. PCT/CN2021/093950, filed on May 14, 2021, which claims priority to Chinese Patent Application No. 202010443487.6, filed on May 22, 2020 and Chinese Patent Application No. 202010963022.3, filed on Sep. 14, 2020. All of the aforementioned patent applications are hereby incorporated by reference in their entireties.

TECHNICAL FIELD

Embodiments of this application relate to the field of wireless local area network technologies, and in particular, to a null data packet announcement frame transmission method and a related apparatus.

BACKGROUND

In a wireless system such as a wireless local area network (WLAN), an access point (AP) and a station (STA) need to obtain channel state information in advance for performing functions such as beamforming (BF), rate control, and resource allocation. In the WLAN, a procedure for obtaining channel state information is referred to as channel sounding. In a related technology, in a process in which the AP performs channel sounding, the AP first transmits a null data packet announcement (NDPA) frame to notify the STA that needs to perform channel sounding. Then, after a short inter-frame space (SIFS) elapses, the AP transmits a null data packet (NDP) without a data field part. The STA performs channel estimation based on the NDP, and then feeds back channel state information (CSI) by using a beamforming report (BF Report) frame.

In 802.11ax, the NDPA frame is referred to as a high efficient (HE) NDPA frame. The HE NDPA frame includes a station information field. The station information field includes a station association identifier (AID) subfield, a partial bandwidth information (Partial BW Info) subfield, a feedback type and number of grouping subfield, and a number of columns (Nc) subfield. The partial bandwidth information subfield is used to indicate a frequency domain range for which the STA needs to feed back channel state information. The partial bandwidth information subfield includes a resource unit (RU) start index and a resource unit end index to indicate a segment of contiguous RUs, thereby indicating a frequency domain range corresponding to the segment of contiguous RUs. However, a maximum bandwidth allowed for transmission is 160 MHz. The bandwidth of 160 MHz corresponds to a maximum of seventy-four 26-tone resource units (26-tone RU). The RU start index and the RU end index separately indicate one of the seventy-four 26-tone RUs.

However, as WLAN technologies develop, transmission in a larger bandwidth needs to be supported in a next-generation Wi-Fi standard (for example, 802.11be or Wi-Fi 7), for example, transmission in a bandwidth greater than 160 MHz. Before data transmission is performed, channel sounding needs to be performed. Therefore, the following is crucial: how to perform channel sounding on a channel with a larger bandwidth (for example, a bandwidth greater than 160 MHz) to obtain channel state information, so as to support data transmission in a larger bandwidth and improve a transmission rate in the next-generation Wi-Fi standard.

SUMMARY

Embodiments of this application provide an NDPA frame transmission method and a related apparatus, to meet a requirement for indicating an RU that is in a bandwidth greater than 160 MHz and for which channel state information needs to be fed back.

According to a first aspect, an implementation of this application provides an NDPA frame transmission method, including the following steps.

An access point generates an NDPA frame. The NDPA frame includes a station information field. The station information field includes an AID subfield indicating an association identifier AID of a station. The station information field further includes a partial bandwidth information subfield and/or a number of columns subfield. The partial bandwidth information subfield indicates a resource unit (RU) that is in a bandwidth corresponding to the NDPA frame and for which the station needs to feed back channel state information. The number of columns subfield indicates a quantity of columns in a compressed beamforming feedback matrix. The bandwidth corresponding to the NDPA frame is greater than 160 MHz. A column quantity indicated by the number of columns subfield is greater than 8.

The access point transmits the NDPA frame.

According to a second aspect, an implementation of this application provides an NDPA frame transmission method, including the following steps.

A station receives an NDPA frame. The NDPA frame includes a station information field. The station information field includes an AID subfield indicating an association identifier AID of a station. The station information field further includes a partial bandwidth information subfield and/or a number of columns subfield. The partial bandwidth information subfield indicates an RU that is in a bandwidth corresponding to the NDPA frame and for which the station needs to feed back channel state information. The bandwidth corresponding to the NDPA frame is greater than 160 MHz. A column quantity indicated by the number of columns subfield is greater than 8.

The station obtains, from the NDPA frame, the RU for which channel state information needs to be fed back.

According to a third aspect, an implementation of this application further provides a transmission apparatus, including a processing unit and a transmitting unit.

The processing unit is configured to generate an NDPA frame. The NDPA frame includes a station information field. The station information field includes an AID subfield indicating an association identifier AID of a station. The station information field further includes a partial bandwidth information subfield and/or a number of columns subfield. The partial bandwidth information subfield indicates a resource unit (RU) that is in a bandwidth corresponding to the NDPA frame and for which the station needs to feed back channel state information. The number of columns subfield indicates a quantity of columns in a compressed beamforming feedback matrix. The bandwidth corresponding to the NDPA frame is greater than 160 MHz. A column quantity indicated by the number of columns subfield is greater than 8.

The transmitting unit is configured to transmit the NDPA frame.

According to a fourth aspect, an implementation of this application further provides a transmission apparatus, including a processing unit and a receiving unit.

The receiving unit is configured to receive an NDPA frame. The NDPA frame includes a station information field. The station information field includes an AID subfield indicating an association identifier AID of a station. The station information field further includes a partial bandwidth information subfield and/or a number of columns subfield. The partial bandwidth information subfield indicates an RU that is in a bandwidth corresponding to the NDPA frame and for which the station needs to feed back channel state information. The bandwidth corresponding to the NDPA frame is greater than 160 MHz. A column quantity indicated by the number of columns subfield is greater than 8.

The processing unit is configured to obtain, from the NDPA frame, the RU for which channel state information needs to be fed back.

In technical solutions in this application, the partial bandwidth information subfield in the NDPA frame indicates an RU that is in a bandwidth greater than 160 MHz and for which channel state information needs to be fed back. The station information field can indicate the station to sound a channel with a bandwidth greater than 160 MHz, and feed back a beamforming report based on a channel sounding result, thereby implementing data transmission in a larger bandwidth and improving transmission efficiency. The column quantity indicated by the number of columns subfield is greater than 8. The station information field can indicate the station to sound a channel with a bandwidth whose column quantity is greater than 8, and feed back a beamforming report based on a channel sounding result, thereby implementing data transmission in more streams and improving transmission efficiency.

In addition or alternatively, a channel with a stream quantity greater than 8 is sounded, and a beamforming report is fed back based on a channel sounding result, thereby implementing data transmission in a larger bandwidth and/or in more streams and improving transmission efficiency.

In some implementations, the NDPA frame includes type information, and the type information indicates that the NDPA frame is an extremely high throughput EHT NDPA frame.

In this way, the type information can indicate an NDPA frame variant corresponding to 802.11be or another standard that occurs after 802.11be. For example, the NDPA frame variant may be an extremely high throughput (EHT) NDPA frame corresponding to the 802.11be standard. The EHT NDPA frame can indicate an RU that is in a bandwidth greater than 160 MHz and for which channel state information needs to be fed back, to indicate a station to sound a channel with a bandwidth greater than 160 MHz, and feed back a beamforming report based on a channel sounding result, thereby implementing data transmission in a larger bandwidth and improving transmission efficiency. The EHT NDPA frame can further indicate a column quantity greater than 8, to indicate a station to sound a channel with a bandwidth whose column quantity is greater than 8, and feed back a beamforming report based on a channel sounding result, thereby implementing data transmission in more streams and improving transmission efficiency.

It should be understood that the NDPA frame provided in this implementation of this application is also applicable to a case in which a bandwidth is less than or equal to 160 MHz or a case in which an indicated column quantity is less than or equal to 8.

In some implementations, the NDPA frame further includes a sounding dialog token field and a special station information field. The sounding dialog token field includes a frame type subfield. The special station information field includes a frame subtype subfield. The type information is carried in the frame type subfield and the frame subtype subfield. The frame type subfield indicates that the NDPA frame is not a high throughput (HT) NDPA frame or a ranging NDPA frame. The frame subtype subfield indicates that the NDPA frame is an EHT NDPA frame.

In this way, an HE STA or a ranging STA that does not support the EHT NDPA frame identifies the EHT NDPA frame as a VHT NDPA frame based on the frame type subfield in the sounding dialog token field, and reads the NDPA frame according to a format of a VHT NDPA frame. The station information field in the EHT NDPA frame does not include an AID of the HE STA or the ranging STA. The HE STA or the ranging STA receiving the EHT NDPA frame identifies a mismatch between the AID in the station information field and the AID of the HE STA or the ranging STA, and does not provide feedback based on the NDPA frame. In this way, the HE STA or the ranging STA can be prevented from misreading the EHT NDPA frame. An EHT STA supporting the EHT NDPA frame can determine, based on the frame subtype subfield, whether the NDPA frame is an EHT NDPA frame. When the frame subtype subfield indicates that the NDPA frame is an EHT NDPA frame, the EHT STA reads the partial bandwidth information subfield and/or the number of columns subfield in the NDPA frame according to a structure of an EHT NDPA frame, thereby accurately obtaining information about a partial bandwidth for which channel state information needs to be fed back and/or a quantity of columns for which feedback needs to be provided.

It should be understood that the HE STA in this application is an HE STA that does not support an NDPA frame variant occurring after an HE NDPA frame, and the ranging STA in this embodiment of this application is an earlier-version ranging STA that does not support an NDPA frame variant occurring after a ranging NDPA frame.

The following provides some implementations of the partial bandwidth information subfield.

In some implementations, the partial bandwidth information subfield includes a resource unit start index and a resource unit offset index. The resource unit start index is used to indicate a first RU for which the station needs to feed back channel state information. The resource unit offset index indicates an offset, relative to the first RU, of a last RU for which the station needs to feed back channel state information. In this way, the station can determine, based on the offset and the first RU indicated by the partial bandwidth information subfield, the last RU for which channel state information needs to be fed back. As such, a bit quantity of the resource unit offset index can be compressed, and a quantity of bits required by the partial bandwidth information subfield can be further compressed when same partial bandwidth information is indicated, thereby supporting indication of an RU that is in a larger bandwidth and for which channel state information needs to be fed back without increasing a bit quantity of the partial bandwidth information subfield.

In this application, the resource unit start index uses eight bits, and the resource unit offset index uses five or less bits. In this way, when a solution in this application is compared with a solution in which the HE NDPA frame uses a 14-bit partial bandwidth information subfield, a bit quantity of the partial bandwidth information subfield can be reduced, and a saved bit can be added to the number of columns subfield. In this case, bits of the number of columns subfield are increased, so that the number of columns subfield indicates a column quantity greater than 8.

In a specific implementation, the resource unit offset index indicates the offset of the last RU relative to the first RU by indicating a multiple that the offset is of a basic granularity. In other words, the resource unit offset index indicates the offset by indicating a value obtained by dividing the offset by the basic granularity. When being expressed by a mathematical expression, the resource unit offset index may be expressed as N=offset/basic granularity. The resource unit offset index may indicate the offset by indicating N, where N is a positive integer. In this way, the resource unit offset index can be more effectively compressed, thereby helping support indication of an RU that is in a larger bandwidth and for which channel state information needs to be fed back, and also helping the number of columns subfield indicate a larger column quantity.

A degree of compression of the resource unit offset index may be adjusted by adjusting the basic granularity. A larger basic granularity indicates a greater degree of compression. A greater degree of compression indicates a smaller quantity of bits required to indicate a same offset, and indicates less signaling overheads. In this way, the partial bandwidth information subfield can support indication of an RU that is in a larger bandwidth and for which channel state information needs to be fed back. Optionally, the basic granularity is eight 26-tone RUs.

In some other implementations, the partial bandwidth information subfield includes an RU indication index. The RU indication index includes a frequency domain indication part and an RU indication part. The frequency domain indication part is used to indicate a frequency domain range in which the RU for which the station needs to feed back channel state information is located. The RU indication part is used to indicate the RU for which channel state information needs to be fed back. The RU for which channel state information needs to be fed back may be one RU or a combination of a plurality of RUs. In this way, the partial bandwidth information subfield requires a smaller bit quantity when indicating information about a partial bandwidth that is in a same bandwidth, and signaling overheads are less, thereby supporting indication of an RU that is in a larger bandwidth and for which channel state information needs to be fed back, and also helping the number of columns subfield indicate a larger column quantity.

In a specific implementation, the RU indication index is nine bits, where the frequency domain indication part is two bits, and the RU indication part is seven bits. In this way, by appropriately allocating the bits to the frequency domain indication part and the RU indication part, an RU that is in a larger bandwidth and for which channel state information needs to be fed back can be indicated by using a smaller quantity of bits.

In some other implementations, the partial bandwidth information subfield includes an RU indication index. The RU indication index indicates an RU corresponding to a partial or full bandwidth for which the station needs to feed back channel state information, and indicates a frequency position of the RU in a complete bandwidth.

Specifically, a minimum RU granularity indicated by the RU indication index is one 242-tone RU. In this way, it is unnecessary to indicate a small RU, thereby helping reduce a quantity of bits of the RU indication index and reducing indication overheads.

In an embodiment, a partial bandwidth for which channel state information needs to be fed back is N*80 MHz, and an RU corresponding to the partial bandwidth for which channel state information needs to be fed back is an N*996-tone RU, where N=1, 2, 3, or 4. The RU indication index includes a 4-bit bitmap. Each bit in the bitmap corresponds to one 80 MHz. Each bit in the bitmap is used to indicate whether 80 MHz corresponding to the bit is the partial bandwidth for which channel state information needs to be fed back.

In another embodiment, a bandwidth for which channel state information needs to be fed back is a complete bandwidth. The RU indication index is a first index used to indicate the complete bandwidth. Optionally, the complete bandwidth is one of 20 MHz, 40 MHz, 80 MHz, 160 MHz, or 320 MHz.

Optionally, the RU indication index is five bits, six bits, or seven bits.

Specifically, when the RU indication index is five bits, the RU indication index indicates only a single RU.

When the RU indication index is six bits, an RU indicated by the RU indication index may be one of a 242-tone RU, a 484-tone RU, a 484+996-tone RU, a 242+484-tone RU, a 996-tone RU, a 2*996-tone RU, a 3*996-tone RU, or a 4*996-tone RU.

When the RU indication index is seven bits, an RU indicated by the RU indication index may be one of a 242-tone RU, a 484-tone RU, a 484+996-tone RU, a 242+484-tone RU, a 996-tone RU, a 2*996-tone RU, a 2*996+484-tone RU, a 3*996-tone RU, a 3*996+484-tone RU, or a 4*996-tone RU.

In still some other implementations, the partial bandwidth information subfield includes a resource unit start index and a resource unit end index. The resource unit start index is used to indicate a first RU for which the station needs to feed back channel state information. The resource unit end index is used to indicate a last RU for which the station needs to feed back channel state information. The first RU is a $(k_1*n+c_1)^{th}$ 26-tone RU, where $c_1$ and $k_1$ are positive integers, and n is a natural number. The last RU is a $(k_2*m+c_2)$th 26-tone RU, where $c_2$ and $k_2$ are positive integers, and m is a natural number. The resource unit start index indicates the first RU by indicating n. The resource unit end index indicates the last RU by indicating m. $k_1 \geq 2$ and/or $k_2 \geq 2$. In this way, a degree of compression of the partial bandwidth information subfield can be adjusted by adjusting a value of $k_1$ or $k_2$ or adjusting values of both $k_1$ and $k_2$. A larger $k_1$ indicates a greater degree of compression of the partial bandwidth information subfield, and a larger $k_2$ also indicates a greater degree of compression of the partial bandwidth information subfield. A greater degree of compression indicates a smaller quantity of bits required to indicate same partial bandwidth information. In this way, the partial bandwidth information subfield can support indication of an RU that is in a larger bandwidth and for which channel state information needs to be fed back.

In any one of the foregoing implementations, the station information field may use four octets. In this way, an RU that is in a bandwidth greater than 160 MHz and for which channel state information needs to be fed back, and/or a stream quantity greater than 8 can be indicated without increasing overheads of the station information field. In this case, the station information field can indicate the station to sound a channel with a bandwidth greater than 160 MHz and/or a channel with a stream quantity greater than 8, and feed back a beamforming report based on a channel sounding result, thereby implementing data transmission in a larger bandwidth and/or in more streams and improving transmission efficiency.

In addition, an octet quantity of the station information field in the EHT NDPA frame is consistent with an octet quantity of a station information field in the HE NDPA frame. Compared with a solution in which the octet quantity of the station information field in the EHT NDPA frame is set to 6, this solution using the 4-octet station information field can prevent an HE STA from misreading. This is because the HE STA may not be able to accurately identify a type of the EHT NDPA frame, and may consider the EHT NDPA frame as an HE NDPA frame and read the EHT NDPA frame according to a structure of an HE NDPA frame. If the station information field in the EHT NDPA frame is six octets, the HE STA reads first 11 bits of third two octets of the station information field as an AID. If the first 11 bits of the third two octets of the station information field happen to match an AID of the HE STA, the HE STA mistakes the third two octets and two octets following the third two octets for a station information field of the HE STA. In this way, incorrect bit reading causes the HE STA to misread.

The octet quantity of the 4-octet station information field provided in this application is consistent with the octet quantity of the station information field in the HE NDPA frame, and first 11 bits of each two octets of the station information field in the EHT NDPA frame indicate an AID of an EHT STA. Even if the HE STA considers the EHT NDPA frame as an HE NDPA frame and reads the EHT NDPA frame according to the structure of the HE NDPA frame, the HE STA recognizes that first 11 bits of each two octets do not match the AID of the HE STA, thereby effectively preventing the HE STA from misreading.

According to a fifth aspect, an implementation of this application further provides an NDPA frame transmission method, including the following steps.

An access point generates an NDPA frame. The NDPA frame includes at least two station information fields. Two of the at least two station information fields include an AID subfield indicating an association identifier AID of a same station. The access point transmits the NDPA frame.

The two station information fields meet at least one of the following:

partial bandwidth information subfields in the two station information fields jointly indicate an RU for which the station needs to feed back channel state information, and a bandwidth corresponding to the NDPA frame is greater than 160 MHz; or a number of columns subfield in one of the two station information fields and a number of columns subfield in the other station information field indicate a quantity of columns in a compressed beamforming feedback matrix, and a column quantity indicated by the number of columns subfields is greater than 8.

The access point transmits the NDPA frame.

According to a sixth aspect, an implementation of this application further provides an NDPA frame transmission method, including the following steps.

A station receives an NDPA frame. The NDPA frame includes at least two station information fields. Two of the at least two station information fields include an AID subfield indicating an association identifier AID of a same station. The access point transmits the NDPA frame.

The two station information fields meet at least one of the following:

partial bandwidth information subfields in the two station information fields jointly indicate an RU for which the station needs to feed back channel state information, and a bandwidth corresponding to the NDPA frame is greater than 160 MHz; or a number of columns subfield in one of the two station information fields and a number of columns subfield in the other station information field indicate a quantity of columns in a compressed beamforming feedback matrix, and a column quantity indicated by the number of columns subfields is greater than 8.

The station obtains, from the NDPA frame, the RU for which channel state information needs to be fed back.

According to a seventh aspect, an implementation of this application further provides a transmission apparatus, including a processing unit and a transmitting unit.

The processing unit is configured to generate an NDPA frame. The NDPA frame includes at least two station information fields. Two of the at least two station information fields include an AID subfield indicating an association identifier AID of a same station. The access point transmits the NDPA frame.

The two station information fields meet at least one of the following:

partial bandwidth information subfields in the two station information fields jointly indicate an RU for which the station needs to feed back channel state information, and a bandwidth corresponding to the NDPA frame is greater than 160 MHz; or a number of columns subfield in one of the two station information fields and a number of columns subfield in the other station information field indicate a quantity of columns in a compressed beamforming feedback matrix, and a column quantity indicated by the number of columns subfields is greater than 8.

The transmitting unit is configured to transmit the NDPA frame.

According to an eighth aspect, an implementation of this application further provides a transmission apparatus, including a processing unit and a receiving unit.

The receiving unit is configured to receive an NDPA frame. The NDPA frame includes at least two station information fields. Two of the at least two station information fields include an AID subfield indicating an association identifier AID of a same station. The access point transmits the NDPA frame.

The two station information fields meet at least one of the following:

partial bandwidth information subfields in the two station information fields jointly indicate an RU for which the station needs to feed back channel state information, and a bandwidth corresponding to the NDPA frame is greater than 160 MHz; or a number of columns subfield in one of the two station information fields and a number of columns subfield in the other station information field indicate a quantity of columns in a compressed beamforming feedback matrix, and a column quantity indicated by the number of columns subfields is greater than 8.

The processing unit is configured to obtain, from the NDPA frame, the RU for which channel state information needs to be fed back.

In this way, a station information field corresponding to a station can be newly added without changing a station information field that is originally included in an NDPA frame and that corresponds to the station. Partial bandwidth information subfields in the two station information fields cooperate to indicate an RU that is in a bandwidth greater than 160 MHz and for which channel state information needs to be fed back. The station can be indicated to sound a channel with a bandwidth greater than 160 MHz, and feed back a beamforming report based on a channel sounding result, thereby implementing data transmission in a larger bandwidth and improving transmission efficiency. Number of columns subfields in the two station information fields cooperate to indicate a column quantity greater than 8. The station can be indicated to sound a channel with a bandwidth whose column quantity is greater than 8, and feed back a beamforming report based on a channel sounding result, thereby implementing data transmission in more streams and improving transmission efficiency.

The two station information fields indicate, in two manners, an RU for which the station needs to feed back channel state information. In a specific implementation, a resource unit start index in one of the two station information fields and a resource unit start index in the other station information field indicate a first RU that is in the bandwidth corresponding to the NDPA frame and for which the station needs to feed back channel state information, and a resource unit end index in the one station information field and a resource unit end index in the other station information field indicate a last RU for which the station needs to feed back channel state information. For example, the resource unit start index in the one station information field is seven bits, the resource unit start index in the other station information field is one bit, the resource unit end index in the one station information field is one bit, and the resource unit end index in the other station information field is one bit.

In another specific implementation, one of the two station information fields includes a resource unit start index, used to indicate a first RU for which the station needs to feed back channel state information, and the other station information field includes a resource unit end index, used to indicate a last RU for which the station needs to feed back channel state information.

Optionally, of the two station information fields, a number of columns subfield in one station information field is three bits, and a number of columns subfield in the other station information field is one bit.

In some implementations, the NDPA frame includes type information, and the type information indicates that the NDPA frame is an extremely high throughput EHT NDPA frame.

In some implementations, the NDPA frame further includes a sounding dialog token field and a special station information field. The sounding dialog token field includes a frame type subfield. The special station information field includes a frame subtype subfield. The type information is carried in the frame type subfield and the frame subtype subfield. The frame type subfield indicates that the NDPA frame is not an HE NDPA frame or a ranging NDPA frame. The frame subtype subfield indicates that the NDPA frame is an EHT NDPA frame.

The special station information field further includes a special AID. The special AID indicates that the station information field is a special station information field. The special AID may be, for example, but is not limited to, 2047.

According to a ninth aspect, an implementation of this application further provides an NDPA frame transmission method, including the following steps.

An access point generates an NDPA frame. The NDPA frame includes a sounding dialog token field, a special station information field, and a station information field. The sounding dialog token field includes a frame type subfield. The special station information field includes a frame subtype subfield. The frame type subfield indicates that the NDPA frame is not an HE NDPA frame or a ranging NDPA frame. The frame subtype subfield indicates that the NDPA frame is an EHT NDPA frame.

The access point transmits the NDPA frame.

According to a tenth aspect, an implementation of this application further provides an NDPA frame transmission method, including the following steps.

A station receives an NDPA frame. The NDPA frame includes a sounding dialog token field, a special station information field, and a station information field. The sounding dialog token field includes a frame type subfield. The special station information field includes a frame subtype subfield. The frame type subfield indicates that the NDPA frame is not an HE NDPA frame or a ranging NDPA frame. The frame subtype subfield indicates that the NDPA frame is an EHT NDPA frame.

The station obtains the frame type subfield and the frame subtype subfield from the NDPA frame, to determine that the NDPA frame is an EHT NDPA frame.

According to an eleventh aspect, an implementation of this application further provides a transmission apparatus, including a processing unit and a transmitting unit.

The processing unit is configured to generate an NDPA frame. The NDPA frame includes a sounding dialog token field, a special station information field, and a station information field. The sounding dialog token field includes a frame type subfield. The special station information field includes a frame subtype subfield. The frame type subfield indicates that the NDPA frame is not an HE NDPA frame or a ranging NDPA frame. The frame subtype subfield indicates that the NDPA frame is an EHT NDPA frame.

The transmitting unit is configured to transmit the NDPA frame.

According to a twelfth aspect, an implementation of this application further provides a transmission apparatus, including a processing unit and a receiving unit.

The receiving unit is configured to receive an NDPA frame. The NDPA frame includes a sounding dialog token field, a special station information field, and a station information field. The sounding dialog token field includes a frame type subfield. The special station information field includes a frame subtype subfield. The frame type subfield indicates that the NDPA frame is not an HE NDPA frame or a ranging NDPA frame. The frame subtype subfield indicates that the NDPA frame is an EHT NDPA frame.

The processing unit is configured to obtain the frame type subfield and the frame subtype subfield from the NDPA frame, to determine that the NDPA frame is an EHT NDPA frame.

In this way, the frame type subfield and the frame subtype subfield jointly indicate that the NDPA frame is an EHT NDPA frame. The EHT NDPA frame can indicate an RU that is in a bandwidth greater than 160 MHz and for which channel state information needs to be fed back, to indicate a station to sound a channel with a bandwidth greater than 160 MHz, and feed back a beamforming report based on a channel sounding result, thereby implementing data transmission in a larger bandwidth and improving transmission efficiency. The EHT NDPA frame can further indicate a column quantity greater than 8, to indicate a station to sound a channel with a bandwidth whose column quantity is greater than 8, and feed back a beamforming report based on a channel sounding result, thereby implementing data transmission in more streams and improving transmission efficiency. In addition, in this case, a new frame does not need to be defined, and an available type remaining in a MAC frame is fully utilized, thereby saving resources.

According to a thirteenth aspect, an implementation of this application further provides a communication apparatus. The communication apparatus may include a processor and a transceiver, and optionally, further includes a memory. When the processor executes a computer program or instructions in the memory, the method according to any one of the implementations of the first aspect, the second aspect, the fifth aspect, the sixth aspect, the ninth aspect, or the tenth aspect is performed.

According to a fourteenth aspect, an implementation of this application further provides a computer-readable storage medium. The computer-readable storage medium stores computer instructions. The computer instructions instruct a communication device to perform the method according to any one of the implementations of the first aspect, the second aspect, the fifth aspect, the sixth aspect, the ninth aspect, or the tenth aspect.

According to a fifteenth aspect, an implementation of this application further provides a computer program product. The computer program product includes a computer program. When the computer program is run on a computer, the computer is enabled to perform the method according to any one of the implementations of the first aspect, the second aspect, the fifth aspect, the sixth aspect, the ninth aspect, or the tenth aspect.

According to a sixteenth aspect, this application further provides a processor, configured to perform any method according to the first aspect, the second aspect, the fifth aspect, the sixth aspect, the ninth aspect, or the tenth aspect. In a process of performing these methods, a process of sending the foregoing information and a process of receiving the foregoing information in the foregoing methods may be understood as a process of outputting the foregoing information by the processor and a process of receiving the foregoing input information by the processor. Specifically, when outputting the information, the processor outputs the information to a transceiver, so that the transceiver transmits the information. Still further, after the information is output by the processor, other processing may further need to be performed on the information before the information arrives at the transceiver. Similarly, when the processor receives the input information, the transceiver receives the information and inputs the information into the processor. Still further, after the transceiver receives the information, other processing may need to be performed on the information before the information is input into the processor.

In this case, for operations such as transmission, sending, and receiving related to the processor, if there is no particular statement, or if the operations do not contradict an actual function or internal logic of the operations in related descriptions, the operations may be more generally understood as operations such as output, receiving, and input of the processor, instead of operations such as transmission, sending, and receiving directly performed by a radio frequency circuit and an antenna.

In a specific implementation process, the processor may be a processor specially configured to perform these methods, or a processor, for example, a general-purpose processor, configured to execute computer instructions in a memory to perform these methods. The memory may be a non-transitory memory such as a read-only memory (read-only memory, ROM). The memory and the processor may be integrated on a same chip, or may be separately disposed on different chips. A type of the memory and a manner of disposing the memory and the processor are not limited in embodiments of the present invention.

According to a seventeenth aspect, this application provides a chip system. The chip system includes a processor and an interface, and is configured to support a communication transmission device in implementing a function in the method according to any one of the first aspect to the fourth aspect, for example, determining or processing at least one of data and information in the foregoing method. In a possible design, the chip system further includes a memory. The memory is configured to store information and data that are necessary for the communication apparatus. The chip system may include a chip, or may include a chip and another discrete component.

According to an eighteenth aspect, this application provides a functional entity. The functional entity is configured to implement the method according to the first aspect, the second aspect, the fifth aspect, the sixth aspect, the ninth aspect, or the tenth aspect.

DESCRIPTION OF EMBODIMENTS

The following describes technical solutions in this application with reference to the accompanying drawings.

An embodiment of this application provides an NDPA frame transmission method that is applied to a wireless communication system. The wireless communication system may be a wireless local area network (WLAN) or a cellular network. The method may be implemented by a communication device in the wireless communication system or by a chip or a processor in the communication device. In the wireless local area network, the communication device supports communication performed by using protocols of the IEEE 802.11 series. The protocols of the IEEE 802.11 series include 802.11be, 802.11ax, or 802.11a/b/g/n/ac.

Figure 1:
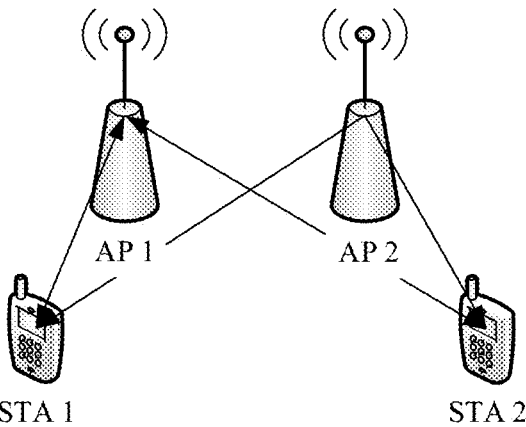
FIG. 1 is a schematic diagram of a network architecture of a communication system according to an embodiment of this application.

FIG. 1 is used as an example to describe a network structure to which the NDPA frame transmission method in this application is applicable. FIG. 1 is a schematic diagram of a network structure according to an embodiment of this application. The network structure may be a wireless local area network. The network structure may include one or more access point (AP) stations and one or more non-access point stations (non-AP STA). For ease of description, an access point station is referred to as an access point (AP), and a non-access point station is referred to as a station (STA) in this specification. The APs are, for example, an AP 1 and an AP 2 in FIG. 1, and the STAs are, for example, a STA 1 and a STA 2 in FIG. 1.

The access point may be an access point through which a terminal device (for example, a mobile phone) accesses a wired (or wireless) network, and is mainly deployed in a home, a building, and a campus, with a typical coverage radius ranging from dozens of meters to hundreds of meters. Certainly, the access point may be alternatively deployed outdoors. The access point is equivalent to a bridge that connects a wired network and a wireless network. A main function of the access point is to connect various wireless network clients together and then connect the wireless network to an Ethernet. Specifically, the access point may be a terminal device (for example, a mobile phone) or a network device (for example, a router) with a wireless fidelity (WiFi) chip. The access point may be a device supporting the 802.11be standard. Alternatively, the access point may be a device supporting a plurality of wireless local area network (wireless local area networks, WLAN) standards of the 802.11 family, such as 802.11be, 802.11ax, 802.11ac, 802.11n, 802.11g, 802.11b, and 802.11a. The access point in this application may be an extremely high throughput (EHT) AP, or may be an access point to which a specific generation of a Wi-Fi standard in the future is applicable.

The access point may include a processor and a transceiver. The processor is configured to control and manage an action of the access point. The transceiver is configured to receive or transmit information.

The station may be a wireless communication chip, a wireless sensor, a wireless communication terminal, or the like, and may also be referred to as a user. For example, the station may be a mobile phone supporting a Wi-Fi communication function, a tablet computer supporting a Wi-Fi communication function, a set-top box supporting a Wi-Fi communication function, a smart TV supporting a Wi-Fi communication function, a smart wearable device supporting a Wi-Fi communication function, a vehicle-mounted communication device supporting a Wi-Fi communication function, a computer supporting a Wi-Fi communication function, or the like. Optionally, the station may support the 802.11be standard. The station may also support a plurality of wireless local area network (WLAN) standards of the 802.11 family, such as 802.11be, 802.11ax, 802.11ac, 802.11n, 802.11g, 802.11b, and 802.11a.

The station may include a processor and a transceiver. The processor is configured to control and manage an action of the station. The transceiver is configured to receive or transmit information.

The station in this application may be an extremely high throughput (EHT) STA, or may be a STA to which a specific generation of the Wi-Fi standard in the future is applicable.

For example, the access point and the station may be devices applied to an internet of vehicles; internet of things nodes, sensors, or the like in an internet of things (IoT); smart cameras, smart remote controls, smart water meters, or smart power meters in a smart household; sensors in a smart city; or the like.

The access point and the station in embodiments of this application may also be collectively referred to as communication apparatuses. The communication apparatus may include a hardware structure and a software module, and implement the foregoing functions in a form of the hardware structure, the software module, or a combination of the hardware structure and the software module. A specific function of the foregoing functions may be implemented in a manner of the hardware structure, the software module, or the combination of the hardware structure and the software module.

Figure 2:
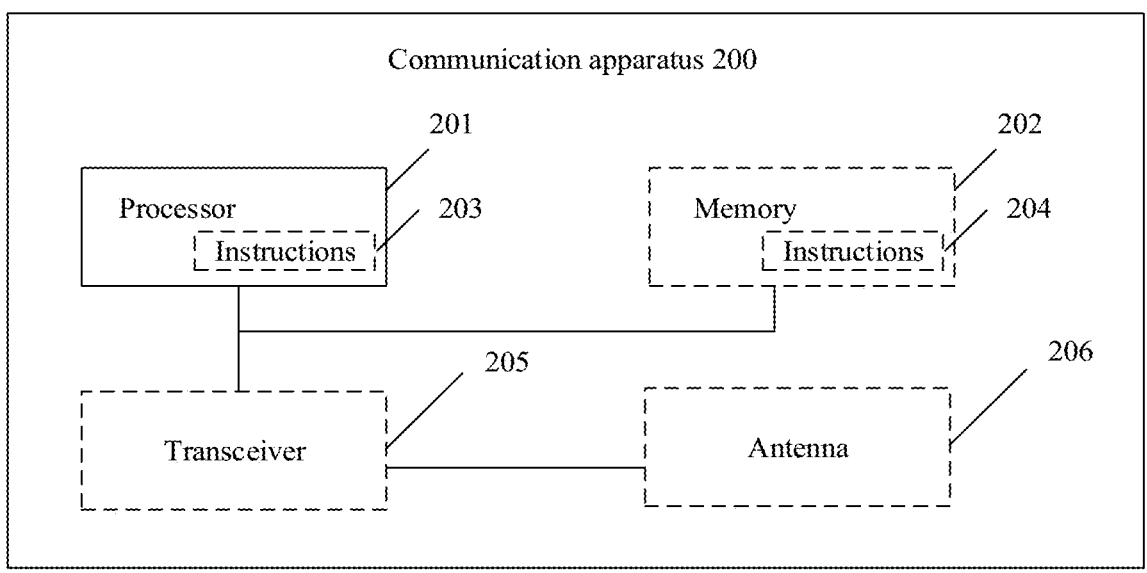
FIG. 2 is a schematic diagram of a structure of a communication apparatus according to an embodiment of this application.

FIG. 2 is a schematic diagram of a structure of a communication apparatus according to an embodiment of this application. As shown in FIG. 2, the communication apparatus 200 may include a processor 201 and a transceiver 205, and optionally, further includes a memory 202.

The transceiver 205 may be referred to as a transceiver unit, a transceiver, a transceiver circuit, or the like, and is configured to implement a transceiver function. The transceiver 205 may include a receiver and a transmitter. The receiver may be referred to as a receiving machine, a receiver circuit, or the like, and is configured to implement a receiving function. The transmitter may be referred to as a transmitting machine, a transmitter circuit, or the like, and is configured to implement a sending function.

The memory 202 may store a computer program or software code or instructions 204. The computer program or software code or instructions 204 may also be referred to as firmware. The processor 201 may control a MAC layer and a PHY layer by running a computer program or software code or instructions 203 in the processor 201 or by invoking the computer program or software code or instructions 204 stored in the memory 202, to implement an NDPA frame transmission method provided in the following embodiments of this application. The processor 201 may be a central processing unit (CPU). The memory 202 may be, for example, a read-only memory (ROM) or a random access memory (RAM).

The processor 201 and the transceiver 205 that are described in this application may be implemented on an integrated circuit (IC), an analog IC, a radio frequency integrated circuit (RFIC), a hybrid signal IC, an application-specific integrated circuit (ASIC), a printed circuit board (PCB), an electronic device, or the like.

The communication apparatus 200 may further include an antenna 206. The modules included in the communication apparatus 200 are merely examples for description. This is not limited in this application.

As described above, the communication apparatus 200 described in the foregoing embodiment may be an access point or a station. However, a scope of the communication apparatus described in this application is not limited thereto, and a structure of the communication apparatus may not be limited to that shown in FIG. 2. The communication apparatus may be an independent device or a part of a large device. For example, an implementation form of the communication apparatus may be as follows:

(1) an independent integrated circuit IC, chip, chip system, or chip subsystem; (2) a set with one or more ICs, where optionally, the IC set may also include a storage component configured to store data or instructions; (3) a module that can be embedded in another device; (4) a receiver, an intelligent terminal, a wireless device, a handset, a mobile unit, a vehicle-mounted device, a cloud device, an artificial intelligence device, or the like; or (5) others or the like.

Figure 3:
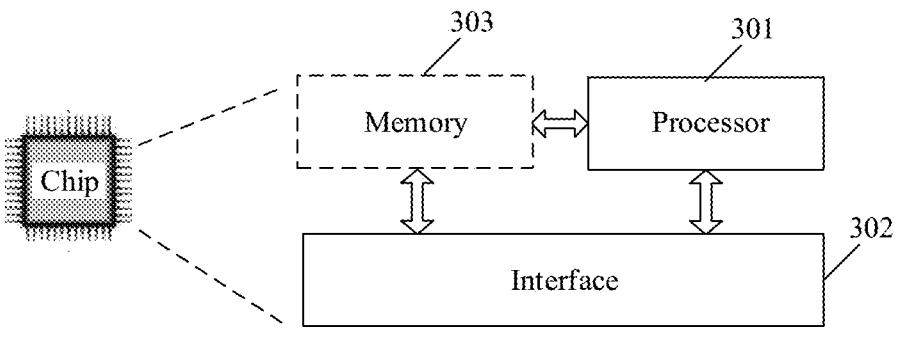
FIG. 3 is a schematic diagram of a structure of a chip according to an embodiment of this application.

For a case in which the implementation form of the communication apparatus is a chip or a chip system, refer to a schematic diagram of a structure of a chip shown in FIG. 3. The chip shown in FIG. 3 includes a processor 301 and an interface 302. There may be one or more processors 301 and a plurality of interfaces 302. The interface 302 is configured to receive and transmit signals. Optionally, the chip or the chip system may include a memory 303. The memory 303 is configured to store program instructions and data that are necessary for the chip or the chip system.

In addition, embodiments of this application do not limit the protection scope and applicability of the claims. A person skilled in the art may make adaptive changes to functions and deployments of elements in this application, or may omit, replace, or add various processes or components as appropriate without departing from the scope of embodiments of this application.

Since the 802.11a/g standard, WLANs have gone through a plurality of generations of standards, for example, 802.11n, 802.11ac, and 802.11ax that is currently under discussion. An NDPA frame has different variants in different standards.

Figure 4A:
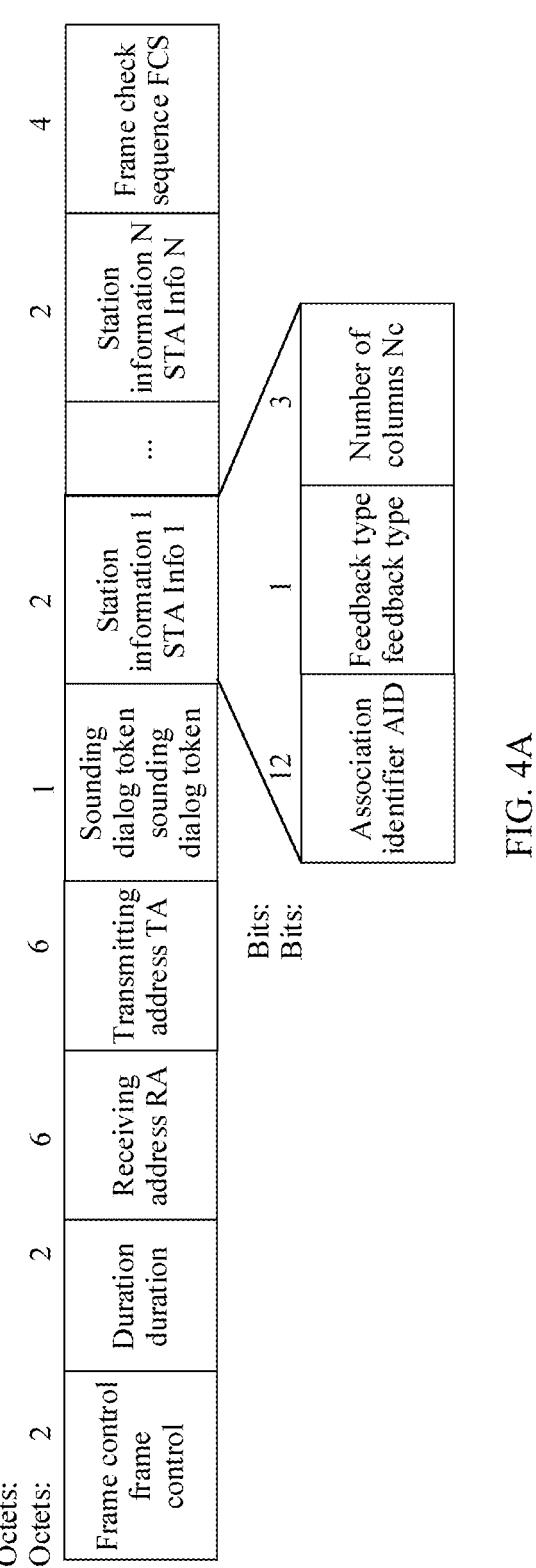
FIG. 4A is a schematic diagram of a structure of a VHT NDPA frame according to this application.

802.11ac is a previous-generation standard of 802.11ax. In the 802.11ac standard, an NDPA frame variant may be referred to as a very high throughput (VHT) NDPA frame. FIG. 4A is a schematic diagram of a structure of a VHT NDPA frame.

As shown in FIG. 4A, the VHT NDPA frame includes a frame control field, a duration field, a receiving address (RA) field, a transmitting address (TA) field, a sounding dialog token field, and one or more station information (STA information, STA Info) fields. The frame control field includes a frame type subfield and a frame subtype subfield, indicating that the frame is an NDPA frame. The sounding dialog token field is used to index a channel sounding sequence number. The RA field and the TA field are used to identify a receive end and a transmit end of a MAC frame.

The station information field includes an AID subfield indicating an association identifier (AID), a feedback type subfield, and a number of columns (Nc) subfield. One station information field is two octets.

The AID subfield indicates an AID of a station corresponding to the station information field. The feedback type subfield indicates whether feedback is single-user feedback or multi-user feedback. The number of columns (Nc) subfield indicates a quantity of columns for which the station needs to feed back channel state information, or may be understood as indicating a quantity of spatial streams for which the station needs to feed back channel state information.

Figure 4B:
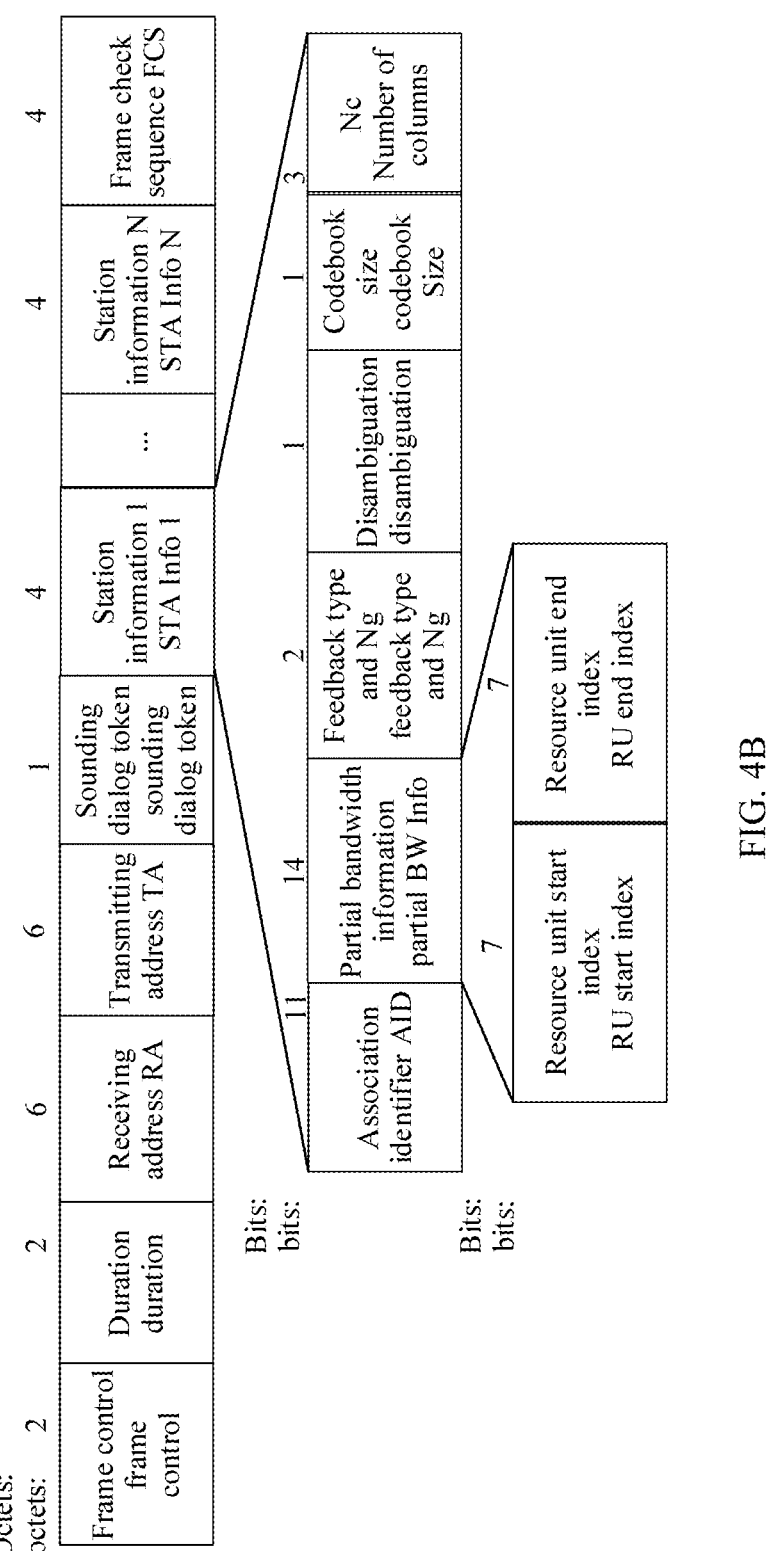
FIG. 4B is a schematic diagram of a structure of an HE NDPA frame according to this application.

In 802.11ax, a corresponding NDPA frame variant is a high throughput (HT) NDPA frame. FIG. 4B is a schematic diagram of a structure of an HE NDPA frame. The HE NDPA frame includes a frame control field, a duration field, an RA field, a TA field, a sounding dialog token field, and one or more station information fields.

The sounding dialog token may use one octet, that is, the sounding dialog token may use eight bits, namely, B0 to B7. The sounding dialog token field includes a 1-bit frame type subfield. The frame type subfield is located at B1 of the sounding dialog token, and used to indicate whether the NDPA frame is an HE NDPA frame. 0 indicates that the NDPA frame is not an HE NDPA frame, and 1 indicates that the NDPA frame is an HE NDPA frame.

The station information field includes an AID subfield, a partial bandwidth information (partial BW Info) subfield, a feedback type and Ng subfield, a disambiguation subfield, a codebook size subfield, and a number of columns (Nc) subfield. One station information field is four octets.

The AID subfield and the number of columns subfield serve the same purposes as the AID subfield and the number of columns subfield in the VHT NDPA frame.

The partial bandwidth information subfield indicates a frequency domain range for which a station corresponding to the AID needs to feed back channel state information.

A bandwidth used for transmitting data may be divided into one or more resource units (RU). An RU may be a 26-tone RU, a 52-tone RU, a 106-tone RU, a 242-tone RU, a 484-tone RU, a 996-tone RU, or the like. A tone represents a subcarrier. For example, the 26-tone RU represents an RU including 26 subcarriers. A frequency domain resource of 20 MHz may include one entire 242-tone resource unit (242-tone RU), or may include nine 26-tone RUs.

The partial bandwidth information subfield indicates, by indicating a segment of contiguous 26-tone RUs, a frequency domain range for which a station needs to feed back channel state information. In other words, the partial bandwidth information subfield indicates RUs for which a STA corresponding to the AID needs to feed back channel state information, to indicate a frequency domain range of a partial bandwidth for which the station needs to feed back channel state information. It should be understood that the frequency domain range of the partial bandwidth belongs to a bandwidth corresponding to the NDPA frame.

The partial bandwidth information subfield includes a resource unit start index and a resource unit end index, and indicates a segment of contiguous RUs by using the resource unit start index and the resource unit end index. In 802.11ax, a maximum bandwidth is 160 MHz and includes seventy-four 26-tone RUs. Therefore, the RU start index needs $[\log_2 74]=7$ bits to indicate a first RU for which the station corresponding to the AID needs to feed back channel state information, and the RU end index needs seven bits to indicate a last RU for which the station needs to feed back channel state information. "⌈ ⌉" indicates rounding up.

The feedback type and Ng subfield indicates whether feedback is single-user feedback or multi-user feedback, and indicates that Ng subcarriers are allocated into one group. In this way, channel state information of subcarriers in a same group is fed back together, helping reduce overheads.

The disambiguation subfield is used to prevent a VHT STA from misreading an NDPA frame as a VHT NDPA frame. The VHT STA in this application is an earlier-version VHT STA that supports the 802.11ac protocol but does not support an NDPA frame variant occurring after the VHT NDPA frame.

The codebook size (codebook size) subfield indicates precision of quantization. Different precisions correspond to different overheads.

In 802.11ax, a station has a maximum of eight antennas and supports a maximum of eight columns. Therefore, the number of columns subfield needs [log₂8]=3 bits to indicate a specific value of a column quantity, that is, one of 1 to 8.

In 802.11az, that is, in a phase of a ranging standard, a corresponding NDPA frame variant is a ranging NDPA frame. A structure of the ranging NDPA frame is basically the same as the structure of the HE NDPA frame. For the structure of the ranging NDPA frame, refer to FIG. 4B.

Different from the HE NDPA frame, a frame type subfield in a sounding dialog token field in the ranging NDPA frame is two bits. The two bits are B0 and B1 of B0 to B7. One bit (B1) is used to indicate whether the NDPA frame is an HE NDPA frame, and the other bit (B0) is used to indicate whether the NDPA frame is a ranging NDPA frame. A ranging STA determines an NDPA frame variant based on the 2-bit frame type subfield. Specific indication relationships of the frame type subfield are shown in Table 1 below.

TABLE 1

| Frame type subfield | | |
| --- | --- | --- |
| Ranging | HE | Variant (Variant) |
| 0 | 0 | VHT NDPA frame |
| 0 | 1 | HE NDPA frame |
| 1 | 0 | Ranging NDPA frame |
| 1 | 1 | Undefined |

It should be understood that an HE STA does not read the bit that is of the frame type subfield and that is used to indicate whether an NDPA frame is a ranging NDPA frame. The HE STA in this application is an earlier-version HE STA that supports the 802.11ax protocol but does not support an NDPA frame variant occurring after the HE NDPA frame. The ranging STA in this application is an earlier-version ranging STA that supports the 802.11az protocol but does not support an NDPA frame variant occurring after the ranging NDPA frame.

The following describes indication manners of the partial bandwidth information subfield in different generations of the standard. In 802.11ax, a maximum bandwidth is 160 MHz, and the partial bandwidth information subfield may indicate a bandwidth by using seventy-four 26-tone RUs. Ordinal values corresponding to the seventy-four 26-tone RUs are 0, 1, 2, 3, . . . , and 73 sequentially in ascending order of a corresponding frequency.

In an HE NDPA frame, an indication manner of the partial bandwidth information subfield is as follows: A resource unit start index in the partial bandwidth information subfield indicates one of the seventy-four 26-tone RUs, and a resource unit end index in the partial bandwidth information subfield is used to indicate one of the seventy-four 26-tone RUs. Specifically, the resource unit start index indicates one of the seventy-four 26-tone RUs by indicating an ordinal value of the 26-tone RU, and the resource unit end index indicates one of the seventy-four 26-tone RUs by indicating an ordinal value of the 26-tone RU.

It can be learned that in the foregoing solution, the RU start index in the partial bandwidth information subfield supports only one of the seventy-four 26-tone RUs, and the RU end index in the partial bandwidth information subfield also supports only one of the seventy-four 26-tone RUs.

However, in the 802.11be standard, a maximum bandwidth that can be supported is 320 MHz. For example, when a 26-tone RU is used as a granularity for indication, 320 MHz may correspond to a maximum of one hundred and forty-eight 26-tone RUs, and 148 cases need to be indicated. Clearly, in this case, the partial bandwidth information subfield in the HE NDPA frame cannot meet a requirement for indicating an RU that is in a larger bandwidth and for which channel state information needs to be fed back in the 802.11be standard.

The following describes manners in which the number of columns subfield indicates a column quantity in different generations of the standard. In 802.11ax, a largest column quantity is 8. The 3-bit number of columns subfield in the HE NDPA frame indicates a column quantity by indicating a value of 1 to 8. However, in the 802.11be standard that is under discussion, a maximum of 16 columns need to be indicated. Clearly, the number of columns subfield in the HE NDPA frame cannot meet a requirement for indicating a larger column quantity in the 802.11be standard.

The following describes technical solutions in this application with reference to the NDPA frame transmission method provided in embodiments of this application. In embodiments of this application, the NDPA frame includes a plurality of fields and subfields. It should be understood that names of the fields and subfields in the NDPA frame are not limited in embodiments of this application, and in another embodiment, may be alternatively replaced with other names.

Figure 5:
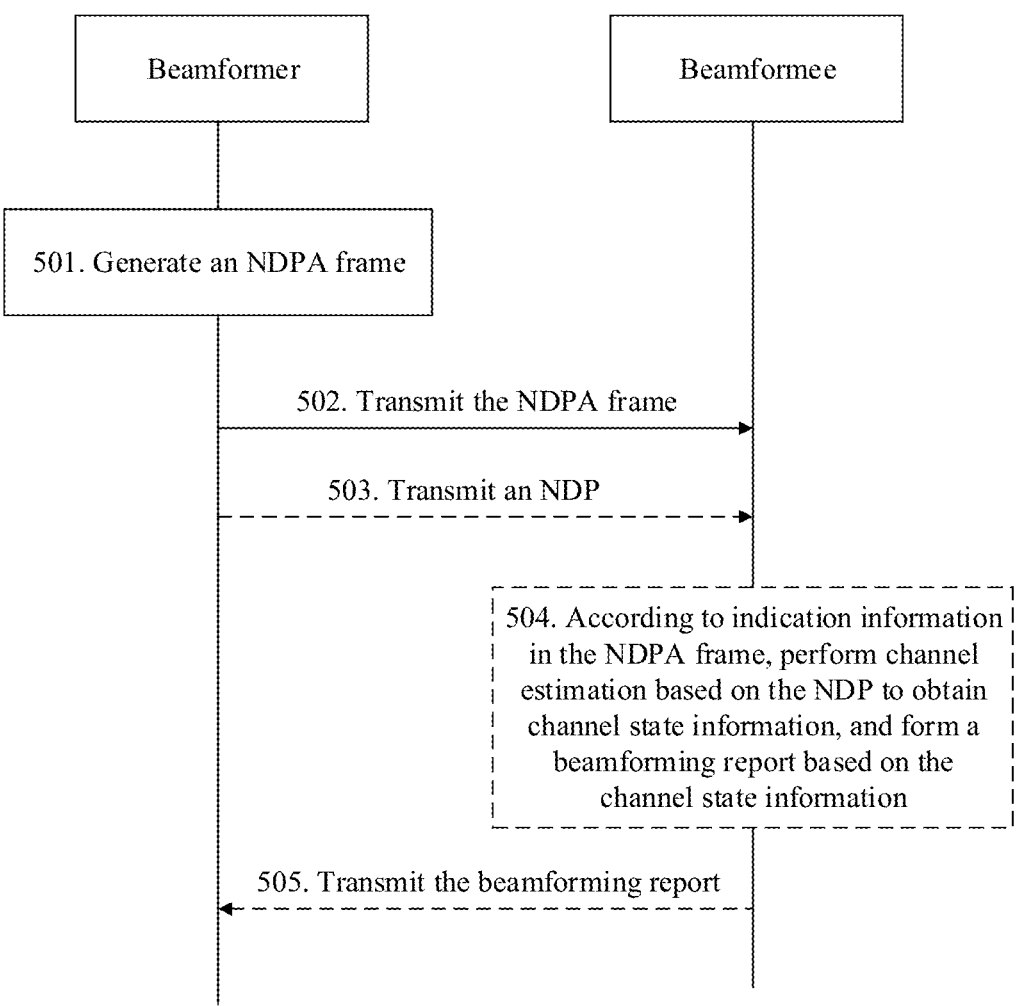
FIG. 5 is a schematic flowchart of an NDPA frame transmission method according to an embodiment of this application.

FIG. 5 is a schematic flowchart of an NDPA frame transmission method according to an embodiment of this application. The method includes the following steps.

501. A beamformer (Bfer) generates an NDPA frame.

The NDPA frame includes one or more station information fields. The station information field includes an AID subfield indicating an AID, a partial bandwidth information subfield, and/or a number of columns subfield. The partial bandwidth information subfield indicates an RU that is of RUs included in a bandwidth corresponding to the NDPA frame and for which a beamformee (Bfee) corresponding to the AID needs to feed back channel state information. It may be alternatively understood that the partial bandwidth information subfield indicates an RU for which the Bfer requests feedback. The RU for which the station needs to feed back channel state information or the RU for which the Bfer requests feedback may be one RU or a combination of a plurality of RUs.

It should be understood that RUs indicated by the partial bandwidth information subfield are a segment of contiguous RUs, and the partial bandwidth information subfield is not limited to indicating a segment of contiguous 26-tone RUs. For example, the partial bandwidth information subfield may indicate a segment of contiguous 52-tone RUs, a segment of contiguous 242-tone RUs, or a combination of a plurality of contiguous RUs of different sizes.

In this application, the RU indicated by the partial bandwidth information subfield is not necessarily an actual RU. RUs correspond to subcarriers. The partial bandwidth information subfield indicates a range of subcarriers by indicating RUs in a bandwidth, to indicate a frequency domain range of a partial bandwidth for which the Bfer requests feedback. For example, indicating 320 MHz as one hundred and forty-eight 26-tone RUs does not mean that a bandwidth of 320 MHz includes one hundred and forty-eight 26-tone RUs. The RU indicated by the partial bandwidth information subfield is only used to indicate a corresponding frequency domain range.

The bandwidth corresponding to the NDPA frame is greater than 160 MHz, or a column quantity indicated by the number of columns subfield is greater than 8; or the bandwidth corresponding to the NDPA frame is greater than 160 MHz, and a column quantity indicated by the number of columns subfield is greater than 8.

The bandwidth corresponding to the NDPA frame may be understood as a channel sounding bandwidth. Alternatively, the bandwidth corresponding to the NDPA frame is a bandwidth of an NDP transmitted by the AP after the AP transmits the NDPA frame.

It may be understood that the station information field may include any one of the partial bandwidth information subfield and the number of columns subfield, or may include the partial bandwidth information subfield and the number of columns subfield.

The NDPA frame in this embodiment of this application meets the following: any one of a case in which the bandwidth corresponding to the NDPA frame is greater than 160 MHz and a case in which a column quantity indicated by the number of columns subfield is greater than 8; or a case in which the bandwidth corresponding to the NDPA frame is greater than 160 MHz and a case in which a column quantity indicated by the number of columns subfield is greater than 8.

502. The Bfer transmits the NDPA frame.

Correspondingly, the Bfee receives the NDPA frame and obtains a related channel sounding parameter from the NDPA frame, for example, partial bandwidth information and/or a quantity of columns in a compressed beamforming feedback matrix.

The Bfer may be an AP or a STA. The Bfee may be a STA or an AP.

Optionally, after step 502, the beamformee may start a channel sounding procedure. The channel sounding procedure may include the following steps.

503. The Bfer transmits a null data packet (NDP).

It should be understood that the Bfer transmits the NDP after a short inter-frame space (SIFS) elapses.

Correspondingly, after the SIFS elapses after receiving the NDPA frame, the Bfee receives the NDP based on the related channel sounding parameter obtained from the NDPA frame.

504. According to indication information in the NDPA frame, the Bfee performs channel estimation based on the NDP to obtain channel state information, and forms a beamforming report based on the channel state information.

Specifically, the Bfee determines, based on the AID subfield in the station information field in the NDPA frame, that the AID subfield matches an AID of the Bfee, and determines that the Bfee itself needs to perform channel sounding. The Bfee may determine, based on the partial bandwidth information subfield in the station information field, a frequency range for which channel state information needs to be fed back, and then perform channel estimation based on the NDP, to obtain channel state information of the frequency range for which the station needs to feed back channel state information. Alternatively, the Bfee may determine the quantity of columns in the compressed beamforming feedback matrix based on Nc. The compressed beamforming feedback matrix is a part of the beamforming report and carries at least a part of channel state information.

505. The Bfee transmits the beamforming report.

It may be understood that the beamforming report includes the channel state information.

The Bfer may be an AP or a STA. The Bfee may be a STA or an AP. In this embodiment of this application, an example in which the Bfer is an AP and the Bfee is a STA is used for description. It should be understood that the technical solutions in this embodiment of this application are also applicable to a case in which the Bfer is a STA or the Bfee is an AP.

Certainly, the channel sounding procedure is not limited to a solution of steps 503 to 505 proposed in this embodiment of this application. Optionally, the channel sounding procedure may be alternatively as follows: Another Bfer transmits an NDP frame, and the beamformee performs sounding based on the NDP frame.

In the technical solutions in this embodiment of this application, the partial bandwidth information subfield in the NDPA frame indicates an RU that is in a bandwidth greater than 160 MHz and for which channel state information needs to be fed back. In this case, the station information field can indicate the station to sound a channel with a bandwidth greater than 160 MHz, and feed back a beamforming report based on a channel sounding result, thereby implementing data transmission in a larger bandwidth and improving transmission efficiency. The column quantity indicated by the number of columns subfield is greater than 8. The station information field can indicate the station to sound a channel with a bandwidth whose column quantity is greater than 8, and feed back a beamforming report based on a channel sounding result, thereby implementing data transmission in more streams and improving transmission efficiency.

Specifically, the NDPA frame includes type information. The type information is used to indicate an NDPA frame variant. For example, the type information indicates that the NDPA frame is an EHT NDPA frame. The type information is carried in a field preceding one or more station information fields.

In this way, when receiving an NDPA frame, a station first obtains type information from the NDPA frame, determines an NDPA frame variant based on the type information, and then determines, based on the NDPA frame variant, a policy for reading a station information field. For example, the station is an EHT STA, and the type information indicates that the NDPA frame variant is an EHT NDPA frame. The EHT STA reads the station information field according to a structure of a station information field in an EHT NDPA frame. The EHT STA obtains the station information field that includes an AID of the EHT STA, and obtains a related channel sounding parameter (for example, an RU that is in a bandwidth greater than 160 MHz and for which channel state information needs to be fed back and/or indication of a column quantity greater than 8) from the station information field. Then, the EHT STA receives an NDP based on the related channel sounding parameter, then obtains channel state information based on the NDP, and feeds back the channel state information to an access point by using a beamforming report.

It can be learned that the type information can indicate that a new NDPA frame variant is an EHT NDPA frame. The EHT NDPA frame can indicate an RU that is in a bandwidth greater than 160 MHz and for which channel state information needs to be fed back, to indicate a station to sound a channel with a bandwidth greater than 160 MHz, and feed back a beamforming report based on a channel sounding result, thereby implementing data transmission in a larger bandwidth and improving transmission efficiency. The EHT NDPA frame can further indicate a column quantity greater than 8, to indicate a station to sound a channel with a bandwidth whose column quantity is greater than 8, and feed back a beamforming report based on a channel sounding result, thereby implementing data transmission in more streams and improving transmission efficiency. In addition, in this case, a new frame does not need to be defined, and an available type remaining in a MAC frame is fully utilized, thereby saving resources.

It should be understood that if the type information indicates that the NDPA frame is a VHT NDPA frame, an HE NDPA frame, or a ranging NDPA frame, the EHT STA can also read the NDPA frame separately according to a format corresponding to the VHT NDPA frame, the HE NDPA frame, or the ranging NDPA frame.

The following describes in detail type information indication solutions provided in an embodiment of this application. The type information indication solutions in this embodiment of this application are not limited to a scenario of indicating that an NDPA frame variant is an EHT NDPA frame, and are also applicable to a scenario of indicating that an NDPA frame variant is a new NDPA frame variant corresponding to a standard that occurs after 802.11be.

An NDPA frame further includes a sounding dialog token. The sounding dialog token includes a frame type indication field.

As shown in Table 2, in a first type information indication solution provided in this application, a sounding dialog token field includes a 2-bit frame type indication field. When values of two bits of the frame type subfield are both 1, it indicates a new NDPA frame variant. The new variant may be, for example, an EHT NDPA frame corresponding to 802.11be, or an NDPA frame corresponding to a standard that occurs after 802.11be. In this embodiment of this application, an example is used for description in which an NDPA frame variant transmitted by an AP is an EHT NDPA frame, and a frame type subfield in a sounding dialog token field indicates that an NDPA frame variant is an EHT NDPA frame.

TABLE 2

| Frame type subfield | | |
| --- | --- | --- |
| Ranging | HE | Variant |
| 0 | 0 | VHT NDPA frame |
| 0 | 1 | HE NDPA frame |
| 1 | 0 | Ranging NDPA frame |
| 1 | 1 | EHT NDPA frame |

It may be understood that in this solution, the type information is carried in the frame type subfield. In this way, defining a new NDPA frame variant as an EHT NDPA frame can be implemented with no need to change an existing correspondence between a value of the frame type subfield and an indicated NDPA frame variant.

An EHT STA receives an NDPA frame from an AP, and determines the NDPA frame variant by reading a 2-bit frame type subfield in the NDPA frame. For example, the frame type subfield indicates that the NDPA frame variant is an EHT NDPA frame. The EHT STA determines, based on the frame type subfield, that the NDPA frame is an EHT NDPA frame. The EHT STA may read a station information field in the EHT NDPA frame according to a format of an EHT NDPA frame. In this way, the EHT NDPA frame can indicate an RU that is in a bandwidth greater than 160 MHz and for which channel state information needs to be fed back, so that the station can sound a channel with a bandwidth greater than 160 MHz, and feed back a beamforming report based on a channel sounding result, thereby implementing data transmission in a larger bandwidth and improving transmission efficiency. The EHT NDPA frame can further indicate a column quantity greater than 8, so that the station can sound a channel with a bandwidth whose column quantity is greater than 8, and feed back a beamforming report based on a channel sounding result, thereby implementing data transmission in more streams and improving transmission efficiency.

It should be understood that in this embodiment of this application, the frame type subfield in a sounding dialog token field indicates that the NDPA frame variant is an EHT NDPA frame, and in another embodiment, the frame type subfield in the sounding dialog token field may alternatively indicate that the NDPA frame variant is a VHT NDPA frame, an HE NDPA frame, or a ranging NDPA frame. If the frame type subfield indicates that the NDPA frame is a VHT NDPA frame, an HE NDPA frame, or a ranging NDPA frame, the EHT STA can also read the NDPA frame separately according to a format corresponding to the VHT NDPA frame, the HE NDPA frame, or the ranging NDPA frame.

As shown in Table 3, in a second type information indication solution provided in this application, the foregoing entry used to indicate the ranging NDPA frame is exchanged with the foregoing entry used to indicate the EHT NDPA frame. In a frame type subfield, when a value of a bit indicating whether an NDPA frame is a ranging NDPA frame is 1, and a value of a bit indicating whether an NDPA frame is an HE NDPA frame is 0, an indicated NDPA frame variant is an EHT NDPA frame; and when the value of the bit indicating whether an NDPA frame is a ranging NDPA frame is 1, and the value of the bit indicating whether an NDPA frame is an HE NDPA frame is 1, an indicated NDPA frame variant is a ranging NDPA frame. In this way, defining a new NDPA frame variant as an EHT NDPA frame can also be implemented. A frame type subfield in a sounding dialog token field can indicate that a type of a frame variant is EHT NDPA. The EHT NDPA frame can indicate an RU that is in a bandwidth greater than 160 MHz and for which channel state information needs to be fed back, to indicate a station to sound a channel with a bandwidth greater than 160 MHz, and feed back a beamforming report based on a channel sounding result, thereby implementing data transmission in a larger bandwidth and improving transmission efficiency. The EHT NDPA frame can further indicate a column quantity greater than 8, to indicate a station to sound a channel with a bandwidth whose column quantity is greater than 8, and feed back a beamforming report based on a channel sounding result, thereby implementing data transmission in more streams and improving transmission efficiency.

TABLE 3

| Frame type subfield | | |
| --- | --- | --- |
| Ranging | HE | Variant |
| 0 | 0 | VHT NDPA frame |
| 0 | 1 | HE NDPA frame |
| 1 | 0 | EHT NDPA frame |
| 1 | 1 | Ranging NDPA frame |

A $(16n+12)^{th}$ bit (for example, a $28^{th}$ bit or a $44^{th}$ bit) of each station information field in the EHT NDPA frame is a disambiguation subfield, where n is a positive integer. A first bit of a station information field corresponds to B0 of the station information field. In this way, compared with the solution corresponding to Table 2, the solution corresponding to Table 3 can prevent an HE STA from misreading.

This is because the HE STA does not read the bit that is of the frame type subfield and that indicates whether an NDPA frame is a ranging NDPA frame. In the solution corresponding to Table 2, when the value of the bit that is of the frame type subfield and that indicates whether an NDPA frame is an HE NDPA frame is 1, the HE STA reads the NDPA frame as an HE NDPA frame. However, when the value of the bit that is of the NDPA frame and that indicates whether an NDPA frame is an HE NDPA frame is 1, the NDPA frame may indeed be an HE NDPA frame, or may be an EHT NDPA frame. However, the EHT NDPA frame may use more than four octets, for example, six octets. In this case, the HE STA reads first 11 bits of third two octets as an AID. If the first 11 bits of the third two octets of the station information field happen to match an AID of the HE STA, the HE STA reads the two octets indicating the AID and two adjacent octets following the two octets as a station information field of the HE STA, causing the HE STA to misread.

According to the solution corresponding to Table 3, when the value of the bit that is of the NDPA frame and that indicates whether an NDPA frame is an HE NDPA frame is 0, the HE STA can identify the NDPA frame as a VHT NDPA frame and read the NDPA frame according to a format of a VHT NDPA frame. If the NDPA frame is indeed a VHT NDPA frame, the HE STA can correctly read the VHT NDPA frame. If the NDPA frame is an EHT NDPA frame, first 11 or 12 bits of each station information field in the EHT NDPA frame indicate an AID. The AID is not the AID of the HE STA, and the $(16n+12)^{th}$ bit of the station information field is the disambiguation subfield. In this case, first 12 bits of each two octets in the EHT NDPA frame do not match the AID of the HE STA. Even if the HE STA considers the EHT NDPA frame as a VHT NDPA frame, reads the NDPA frame according to the format of the VHT NDPA frame, and reads the first 12 bits of each two octets of each station information field as an AID, the HE STA can recognize that the first 12 bits of each two octets do not match the AID of the HE STA, thereby preventing the HE STA from mistaking a station information field in the EHT NDPA frame for the station information field of the HE STA and consequently misreading the NDPA frame.

When the value of the bit that is of the NDPA frame and that indicates whether an NDPA frame is an HE NDPA frame is 1, if the NDPA frame is actually indeed an HE NDPA frame, the HE STA can correctly read the HE NDPA frame. If the NDPA frame is actually a ranging NDPA frame, the HE STA can read an AID in the NDPA frame at a correct position, because a station information field in a ranging NDPA frame has a same structure as a station information field in an HE NDPA frame. Station information fields in the ranging NDPA frame do not include the AID of the HE STA, and the HE STA can also find, by reading the station information fields, that an AID in each station information field does not match the AID of the HE STA. In this way, the HE STA does not consider one of the station information fields in the NDPA frame as the station information field of the HE STA, and therefore, does not misread the NDPA frame.

However, as network technologies develop, there will be a next-generation standard following 802.11be. The next-generation standard may support a larger bandwidth. In this case, if a new NDPA frame variant occurring after the EHT NDPA frame needs to be defined, another NDPA frame variant occurring after the EHT NDPA frame cannot be indicated by the foregoing 2-bit frame type subfield.

Figure 6:
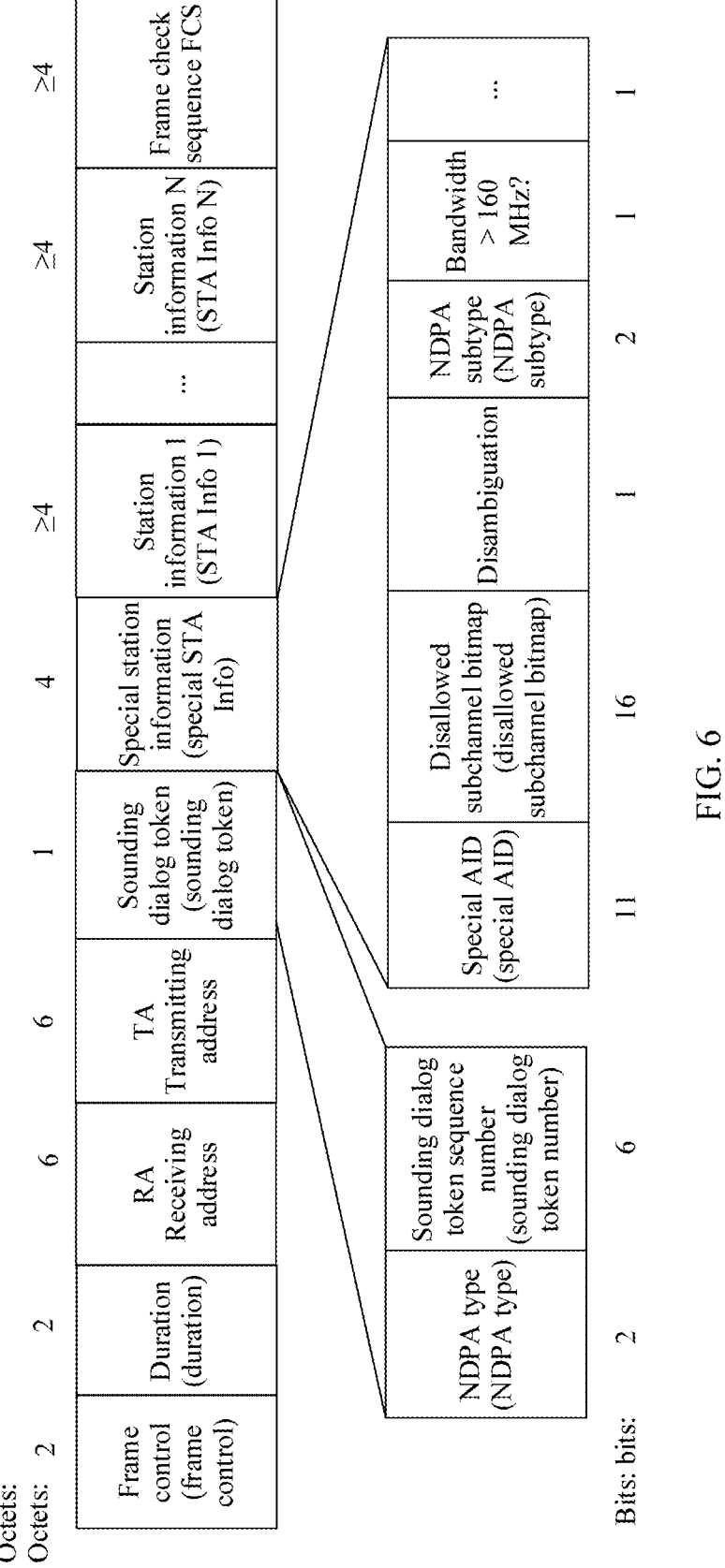
FIG. 6 is a schematic diagram of a structure of an NDPA frame according to an embodiment of this application.

FIG. 6 is a schematic diagram of a structure of an NDPA frame according to an embodiment of this application. In a third type information indication solution provided in this embodiment of this application, a special station information field is newly added to the NDPA frame. The special station information field includes a special AID field and a frame subtype field.

The special AID indicates the special station information field. For example, a special AID may be 2047, indicating that the station information field is a special station infor-mation field. An AID of 2047 is not defined in an existing standard. Therefore, a STA can identify the special station information field based on the special AID. It should be understood that in another embodiment, the special AID is not limited to 2047, and may be, for example, another AID that is not defined.

A frame type subfield in a sounding dialog token field and the frame subtype subfield in the newly added special station information field jointly indicate an NDPA frame variant. For example, the frame type subfield indicates that the NDPA frame is not an HE NDPA frame or a ranging NDPA frame, and the frame subtype subfield in the special station information field indicates a specific NDPA frame variant. For example, the frame subtype subfield in the special station information field may indicate that the NDPA frame is an EHT NDPA frame. It should be understood that the frame subtype subfield may alternatively indicate that an NDPA frame variant is another NDPA frame variant occur-ring after the EHT NDPA frame.

Specifically, as shown in Table 4, in the indication solu-tion, when values of two bits of the frame type subfield are both 0, it indicates that the NDPA frame is not an HE NDPA frame or a ranging NDPA frame.

TABLE 4

| Frame type subfield | | Variant |
| --- | --- | --- |
| 0 | 0 | (not an HE NDPA frame or a ranging NDPA frame) |
| 0 | 1 | HE NDPA frame |
| 1 | 0 | Ranging NDPA frame |
| 1 | 1 | Undefined |

It may be understood that in this solution, the type information is carried in the frame type subfield and the frame subtype subfield. In this way, indicating one or more new NDPA frame variants that occur after the HE NDPA frame and the ranging NDPA frame can be supported. The new NDPA frame variant may be, for example, the EHT NDPA frame or another NDPA frame occurring after the EHT NDPA frame.

An STA supporting a new NDPA frame variant can determine, based on the frame subtype subfield in the special station field, which variant the NDPA frame is specifically, so as to read the NDPA frame according to a structure of the NDPA frame variant. For example, the frame type subfield and the frame subtype subfield indicate that the NDPA frame variant is an EHT NDPA frame. The EHT STA may determine, based on the frame subtype subfield, that the NDPA frame is an EHT NDPA frame. Then, the EHT STA reads a partial bandwidth information subfield and a number of columns subfield in the NDPA frame according to a structure of an EHT NDPA frame, thereby accurately obtaining information about a partial bandwidth for which channel state information needs to be fed back and a quantity of columns for which feedback needs to be provided.

If the frame type subfield indicates that the NDPA frame is a VHT NDPA frame, an HE NDPA frame, or a ranging NDPA frame, the EHT STA can also read the NDPA frame separately according to a format corresponding to the VHT NDPA frame, the HE NDPA frame, or the ranging NDPA frame.

It should be understood that an octet quantity of a station information field in this embodiment of this application is an integer multiple of 2. The station information field may use four octets, or may use more than four octets, for example, six octets.

In this solution, the frame type subfield in the sounding dialog token field indicates NDPA frames other than the HE NDPA frame and the ranging NDPA frame as a category of NDPA frames, and then the frame subtype subfield in the special station field indicates which variant the NDPA frame is specifically. This can prevent an HE STA or a ranging STA from misreading a new NDPA frame variant.

For example, the frame subtype subfield indicates that the NDPA frame is an EHT NDPA frame. The HE STA or the ranging STA can consider the EHT NDPA frame as a VHT NDPA frame based on the frame type subfield in the sounding dialog token field, and read the EHT NDPA frame according to a structure of a VHT NDPA frame. The station information field in the EHT NDPA frame does not include an AID of the HE STA or the ranging STA. The earlier-version HE STA or ranging STA receiving the EHT NDPA frame does not provide feedback based on the EHT NDPA frame, because an AID in the station information field does not match the AID of the earlier-version HE STA or ranging STA. This can prevent the earlier-version HE STA or ranging STA from misreading the EHT NDPA frame.

Further, in an NDPA frame transmitted by an AP, a $(16n+12)^{th}$ bit of a special station information field is a disambiguation subfield, and a $(16n+12)^{th}$ bit (for example, a $28^{th}$ bit) of each station information field is a disambiguation subfield, where n is a positive integer. A first bit of the special station information field corresponds to B0 of the special station information field. A first bit of each station information field corresponds to B0 of the station information field.

In this case, when the frame type subfield indicates that the NDPA frame is not an HE NDPA frame or a ranging NDPA frame, a VHT STA does not read the frame type subfield in the sounding dialog token field, and cannot identify the NDPA frame variant. In this embodiment of this application, on a basis of the conventional technology, an NDPA frame variant indicated when the values of the two bits of the frame type subfield are both 0 is changed, which does not cause the VHT STA to misread another NDPA frame variant.

For example, an NDPA frame transmitted by an AP is an EHT NDPA frame, first 11 bits of a special station information field and first 11 bits of any station information field in the EHT NDPA frame are set as an 11-bit AID, the AID is not an AID of the VHT STA, and a $(16n+12)^{th}$ bit of the special station information field and a $(16n+12)^{th}$ bit of any station information field are the disambiguation subfield. In this case, first 12 bits of each two octets of the station information field and the special station information field in the EHT NDPA frame do not match the AID of the VHT STA. Even if the VHT STA reads the EHT NDPA frame according to the structure of the VHT NDPA frame, and reads the first 12 bits of each two octets of the special station information field or the station information field as an AID, the VHT STA can recognize that the first 12 bits of each two octets do not match the AID of the VHT STA, thereby preventing the VHT STA from mistaking the special station information field or a station information field in the EHT NDPA frame for a station information field of the VHT STA and consequently misreading the NDPA frame.

In addition, when an indication manner in Table 4 is compared with an indication manner in Table 3, the original entry that indicates the ranging NDPA frame and that is of the frame type subfield does not need to be changed, either. In this case, the ranging STA can still normally identify a ranging NDPA frame based on the frame type subfield.

It can be learned from the foregoing description that by using the third type information indication solution, a new NDPA frame variant (for example, an EHT NDPA frame) can be indicated, and the VHT STA, the HE STA, and the ranging STA can be prevented from misreading the new NDPA frame variant.

In some embodiments, the special station information field may further include a disallowed subchannel bitmap. The disallowed subchannel bitmap is used to indicate preamble puncturing information.

For example, each bit of the disallowed subchannel bitmap corresponds to frequency domain resources of one granularity, and each bit indicates whether the corresponding frequency domain resources are punctured. The granularity may be $2^n*10$ MHz, where n is a positive integer. For example, the granularity may be 20 MHz, 40 MHz, 80 MHz, or the like.

A bit quantity of the disallowed subchannel bitmap may be fixed. For example, a bit quantity of a disallowed subchannel bitmap in an EHT NDPA frame may be set to 16. Sixteen bits can indicate preamble puncturing information of a bandwidth of 320 MHz. When a bandwidth is less than 320 MHz, each 20 MHz corresponds to one bit of the disallowed subchannel bitmap, and a remaining bit in the disallowed subchannel bitmap indicates that corresponding frequency domain resources are punctured. For example, when a bandwidth is 240 MHz, first 12 bits of the disallowed subchannel bitmap indicate preamble puncturing information of 240 MHz, and last four bits indicate that corresponding frequency domain resources are punctured.

The bit quantity of the disallowed subchannel bitmap may be alternatively variable. The bit quantity of the disallowed subchannel bitmap may be determined based on a bandwidth. For example, when the granularity is 20 MHz, if a bandwidth is 160 MHz, the bit quantity of the disallowed subchannel bitmap may be 8; or if a bandwidth is 320 MHz, the bit quantity of the disallowed subchannel bitmap may be 16. When the granularity is 40 MHz, if a bandwidth is 160 MHz, the bit quantity of the disallowed subchannel bitmap may be 4; or if a bandwidth is 320 MHz, the bit quantity of the disallowed subchannel bitmap may be 8. When a bandwidth is less than 80 MHz, the bit quantity of the disallowed subchannel bitmap may also be 4, each 20 MHz corresponds to one bit in the disallowed subchannel bitmap, and a remaining bit in the disallowed subchannel bitmap indicates that corresponding frequency domain resources are punctured. For example, when a bandwidth is 40 MHz, first two bits of the disallowed subchannel bitmap are used to indicate a puncturing status of a first 20 MHz and a puncturing status of a second 20 MHz of the 40 MHz, and last two bits of the disallowed subchannel bitmap indicate that corresponding frequency domain resources are punctured.

In some embodiments, the disallowed subchannel bitmap may be alternatively carried in an NDP that is transmitted by an AP after the AP transmits an NDPA frame. Alternatively, the disallowed subchannel bitmap is carried only in an NDP.

Optionally, the special station information field further includes a bandwidth indication subfield for indicating a bandwidth. A partial bandwidth indicated by the partial bandwidth information subfield is in a frequency domain range of the bandwidth indicated by the bandwidth indication subfield.

To indicate an RU that is in a bandwidth greater than 160 MHz and for which channel state information needs to be fed back or to indicate more spatial streams, an embodiment of this application provides some station information field design solutions.

In this embodiment of this application, an example is used for description in which an NDPA frame variant transmitted by an AP is an EHT NDPA frame. The station information field design solutions in this application are not limited to the EHT NDPA frame, and are also applicable to an NDPA frame variant corresponding to a standard that occurs after 802.11be.

The following describes the station information field design solutions that are provided in a case in which a bandwidth corresponding to an NDPA frame is greater than 160 MHz.

In a first station information field design solution provided in this embodiment of this application, a quantity of octets of a station information field are increased, and a quantity of bits of a partial bandwidth information subfield are also increased, to implement that the partial bandwidth information subfield indicates an RU that is in a bandwidth greater than 160 MHz and for which channel state information needs to be fed back. For example, a station information field in an NDPA frame may use six octets, and a partial bandwidth information subfield uses more than seven bits. In this way, an RU that is in a larger bandwidth and for which channel state information needs to be fed back can be indicated. When the station information field is six octets, a quantity of bits of a number of columns subfield can also be increased. For example, the number of columns subfield is more than three bits. In this case, a larger column quantity can also be indicated. It should be understood that an octet quantity of the station information field in the NDPA frame may be 2*N, where N is greater than or equal to 3. For example, the octet quantity of the station information field in the NDPA frame may be alternatively 8, 10, 12, or the like.

Further, six octets may be divided into three two octets sequentially. A $12^{th}$ bit of second two octets and a $12^{th}$ bit of third two octets are set as a disambiguation field. In this case, even if a VHT STA reads the NDPA frame according to a format of a VHT NDPA frame and reads first 12 bits of each two octets as an AID, the VHT STA can recognize that the first 12 bits of each two octets do not match an AID of the VHT STA, thereby preventing the VHT STA from mistaking a station information field in the new NDPA frame variant for a station information field of the VHT STA and consequently misreading the new NDPA frame variant.

In this solution, the partial bandwidth information subfield in the station information field includes an RU start index and an RU end index. The RU start index uses more than seven bits, and the RU end index also uses more than seven bits.

The number of columns subfield in the station information field is more than three bits.

In a specific embodiment, a bandwidth is 320 MHz, and a length of a station information field is six octets. A structure of a station information field in an EHT NDPA frame is shown in FIG. 7.

In this embodiment, a partial bandwidth information subfield in the station information field includes an RU start index and an RU end index. The RU start index uses eight bits and is used to indicate one 26-tone RU in 320 MHz. The RU end index also uses eight bits and is used to indicate one 26-tone RU in 320 MHz. A $A_{12}$th bit of a second octet (a $28^{th}$ bit of the station information field) and a $12^{th}$ bit of a third octet (a $44^{th}$ bit of the station information field) are set as a disambiguation field.

Figure 7:
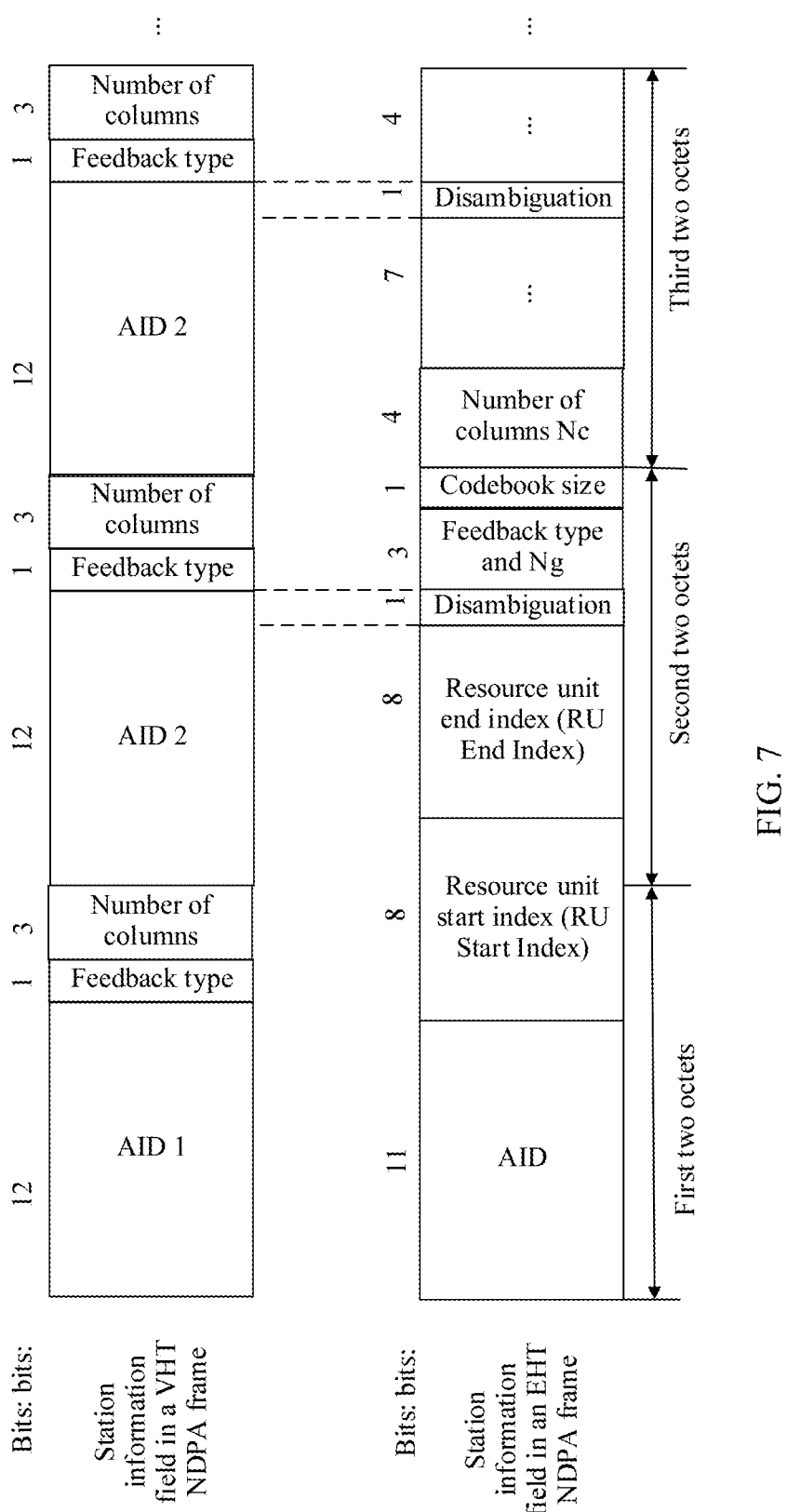
FIG. 7 is a schematic diagram of a structure of a station information field according to an embodiment of this application.

As shown in FIG. 7, a length of a station information field in a VHT NDPA frame is two octets, that is, 16 bits in total. First 12 bits of the station information field in the VHT NDPA frame are an AID. A VHT STA does not read a frame type subfield or identify an NDPA frame variant. The VHT STA reads the EHT NDPA frame as a VHT NDPA frame. This causes the VHT STA to read first 12 bits of each two octets of a station information field in the EHT NDPA frame as an AID. If first 12 bits of second two octets of a station information field in the station information field happen to match an AID of the VHT STA receiving the EHT NDPA frame, misreading is caused. Of the station information field in the EHT NDPA frame provided in this embodiment, first 11 bits of first two octets are an AID of an EHT STA. In this case, first 12 bits of the first two octets do not match the AID of the VHT STA. A $12^{th}$ bit (B11) of the second two octets of the station information field is a disambiguation field. The first 12 bits of the second two octets of the station information field do not match the AID of the VHT STA, either. In this way, the VHT STA can be prevented from mistaking a station information field for a station information field of the VHT STA, consequently causing the VHT STA to misread the EHT NDPA frame.

It may be understood that an 8-bit index field can indicate a maximum of $2^8 = 256$ cases. 320 MHz may include a maximum of one hundred and forty-eight 26-tone RUs. The 8-bit RU start index may indicate one of one hundred and forty-eight 26-tone RUs. The 8-bit RU end index may also indicate one of one hundred and forty-eight 26-tone RUs.

In the embodiment in which the first station information field design solution is used, the bandwidth corresponding to the NDPA frame is not limited to 320 MHz in the foregoing example, and may be alternatively another bandwidth greater than 160 MHz, for example, 240 MHz or 480 MHz. Accordingly, a bit quantity of the partial bandwidth information subfield may be adaptively adjusted based on a size of the bandwidth.

It should be understood that the first station information field design solution may be implemented in combination with the foregoing second and third type information indication solutions, or may be implemented separately.

For the EHT NDPA frame using the foregoing first station information field design solution, setting of the disambiguation field can prevent the VHT STA from misreading. However, if the EHT NDPA frame uses the foregoing first type information indication solution, an HE STA does not read a bit that is of a frame type subfield and that indicates whether an NDPA frame is a ranging NDPA frame. As a result, the HE STA cannot distinguish an HE NDPA frame from an EHT NDPA frame. In this case, the HE STA reads the EHT NDPA frame as an HE NDPA frame. When reading third two octets of a station information field in the EHT NDPA frame, the HE STA reads first 11 bits of the third two octets as an AID indicated by first 11 bits of a station information field in an HE NDPA frame. If the first 11 bits of the third two octets of the station information field in the EHT NDPA frame match an AID of the HE STA receiving the EHT NDPA frame, it causes the HE STA to misread the EHT NDPA frame.

If the EHT NDPA frame using the foregoing first station information field design solution uses the second type information indication solution, the HE STA reads the EHT NDPA frame as a VHT NDPA frame. The station information field in the EHT NDPA frame does not include an AID of an HE STA, an AID of a ranging STA, or an AID of a VHT STA, and a disambiguation subfield is set at another position that may be considered by the HE STA, the ranging STA, or the VHT STA to have an AID specified. In this way, the HE STA can be prevented from misreading the EHT NDPA frame.

If the EHT NDPA frame using the foregoing first station information field design solution uses the third type information indication solution, when an indication of a bit that is of the frame type subfield and that indicates whether an NDPA frame is an HE NDPA frame is 1, it only indicates that the NDPA frame is an HE NDPA frame, and there is no other indication case. The HE STA can accurately determine, based on the indication of the bit that is of the frame type subfield and that indicates whether an NDPA frame is an HE NDPA frame, whether the NDPA frame is an HE NDPA frame, and does not read another NDPA frame variant as an HE NDPA frame.

Figure 8:
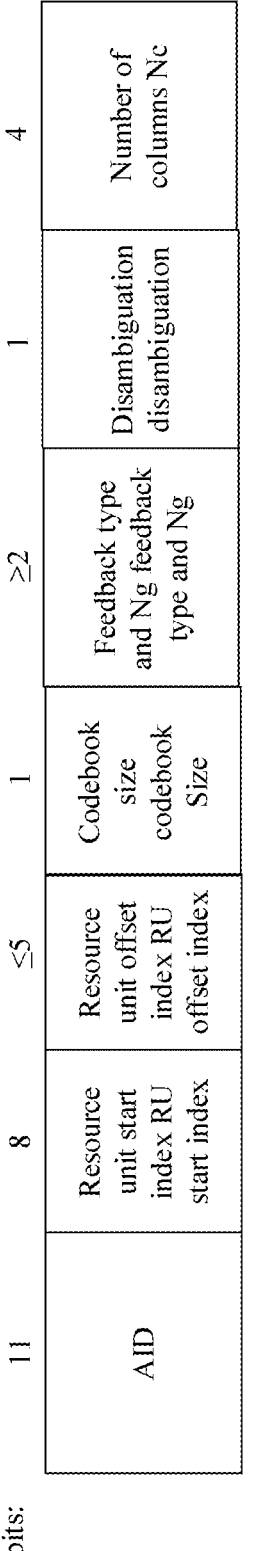
FIG. 8 is a schematic diagram of a structure of another station information field according to an embodiment of this application.

FIG. 8 is a schematic diagram of a structure of a station information field in an EHT NDPA frame according to an embodiment of this application. In a second station information field design solution provided in this embodiment of this application, a station information field is four octets. When the EHT NDPA frame is compared with an HE NDPA frame, an octet quantity of a station information field is not changed. In this solution, a quantity of bits of a partial bandwidth information subfield are compressed, and an indication manner of the partial bandwidth information subfield is improved, to indicate an RU that is in a larger bandwidth and for which channel state information needs to be fed back and/or to indicate a column quantity greater than 8.

For example, the quantity of the bits of the partial bandwidth information subfield may be compressed. The partial bandwidth information subfield may use 13 or less bits. In this way, a quantity of bits of a number of columns subfield can be increased, so that the number of columns subfield uses four or more bits, and the number of columns subfield can indicate a larger column quantity. Alternatively, when the quantity of the bits of the partial bandwidth information subfield are compressed, a resource unit start index and a resource unit end index may support indication of an RU that is in a larger bandwidth and for which channel state information needs to be fed back. Certainly, when this solution is used, it is not limited to that a bit quantity of the number of columns subfield needs to be increased to be greater than or equal to 4. The number of columns subfield may alternatively use three bits.

In a possible implementation, the partial bandwidth information subfield in the station information field includes a resource unit start index and a resource unit offset index. The resource unit start index is used to indicate a first RU of RUs for which a station corresponding to an AID needs to feed back channel state information. The resource unit offset index indicates an offset, relative to the first RU, of a last RU for which channel state information needs to be fed back. Alternatively, the resource unit start index indicates a first RU for which a Bfer requests feedback, and the resource unit offset index indicates an offset, relative to the first RU, of a last RU for which the Bfer requests feedback. The offset may be 0.

It may be understood that the RU offset indicated by the resource unit offset index does not indicate an RU actually included in a bandwidth. Actually, the resource unit offset index indicates a subcarrier offset in frequency domain by indicating the RU offset, to cooperate with the resource unit start index to indicate a contiguous frequency domain range.

As shown in FIG. 8, the station information field is not limited to being used by the EHT NDPA frame, and may also be used by another NDPA frame variant occurring after the EHT NDPA frame.

Refer to FIG. 8. The resource unit start index uses eight bits. In this case, when a bandwidth is 320 MHz, the resource unit start index can indicate one of one hundred and forty-eight 26-tone RUs corresponding to 320 MHz. The resource unit offset index may use five or less bits. In this case, the partial bandwidth information subfield uses 13 or less bits. Therefore, the number of columns subfield can use four or more bits, thereby indicating a larger column quantity.

It should be understood that a $28^{th}$ bit (B27) of the station information field is set as a disambiguation subfield, which is used to prevent an earlier-version STA from misreading. For a principle of how the disambiguation subfield prevents misreading, refer to a related description in the foregoing embodiment. Details are not described herein again.

In a specific embodiment, offsets of different sizes may be indicated by different resource unit offset indexes. For a scenario in which a bandwidth is 320 MHz, the following uses an example for description.

In an example, a correspondence between a resource unit offset index and a corresponding offset is shown in Table 5 below.

TABLE 5

| Resource unit offset index | Offset |
|---|---|
| 0000 | 0 |
| 0001 | 26-tone RU |
| 0010 | 52-tone RU |
| 0011 | 106-tone RU |
| 0100 | 242-tone RU |
| 0101 | 484-tone RU |
| 0111 | 996-tone RU |
| 0111 | 2*996-tone RU |
| 1000 | 3*996-tone RU |
| 1001 | 4*996-tone RU |

For example, when the resource unit offset index is 0010, it indicates that an offset, relative to a first RU, of a last RU for which channel state information needs to be fed back is a 52-tone RU. Further, if the resource unit start index indicates that a first RU for which a station needs to feed back channel state information is a first 26-tone RU, an RU for which the station needs to feed back channel state information is the first 26-tone RU and a 52-tone RU adjacent to the first 26-tone RU. In this case, a frequency domain range for which the station needs to feed back channel state information is a frequency domain range corresponding to the first 26-tone RU and the 52-tone RU adjacent to the first 26-tone RU, that is, first 78 subcarriers with lowest frequencies in 320 MHz.

In another example, a correspondence between a resource unit offset index and a corresponding offset is shown in Table 6 below.

TABLE 6

| Resource unit offset index | Offset |
|---|---|
| 0000 | 0 |
| 0001 | 26-tone RU |
| 0010 | 2*26-tone RU |
| 0011 | 4*26-tone RU |
| 0100 | 9*26-tone RU |
| 0101 | 18*26-tone RU |
| 0111 | 37*26-tone RU |
| 0111 | 74*26-tone RU |
| 1000 | 111*26-tone RU |
| 1001 | 148*26-tone RU |

For example, when the resource unit offset index is 0011, it indicates that an offset, relative to a first RU, of a last RU for which channel state information needs to be fed back is a 4*26-tone RU.

When the bandwidth is 320 MHz, a 26-tone RU is used as a granularity, a first RU is indicated by the resource unit start index, and a last RU is indicated by the resource unit end index, the resource unit start index and the resource unit end index each require eight bits. In other words, the partial bandwidth information subfield requires at least 16 bits. In contrast, in the foregoing solution in which indication is performed by using the resource unit start index and the resource unit offset index, 10 resource unit offset indexes can indicate 10 resource offsets of different sizes, and the resource unit offset index may use four bits. In this way, a bit quantity of the partial bandwidth information subfield can be reduced. In addition, a saved bit may be used to increase bits of the number of columns subfield, thereby indicating a larger quantity of space-time streams.

Certainly, in another implementation, the correspondence between a resource unit offset index and an offset is not limited to the foregoing example shown in Table 5 or Table 6, and another correspondence may be alternatively set. A bit quantity of the resource unit offset index is also not limited to 4, provided that a sum of a bit quantity of the resource unit start index and the bit quantity of the resource unit offset index is less than or equal to 13.

In another specific embodiment, the resource unit offset index indicates an offset by indicating a multiple that an RU for which channel state information needs to be fed back is of a basic granularity. The basic granularity is greater than or equal to a 26-tone RU. In other words, the resource unit offset index indicates the offset by indicating a value obtained by dividing the offset by the basic granularity. When being expressed by a mathematical expression, the resource unit offset index may be expressed as N=offset/basic granularity. The resource unit offset index may indicate the offset by indicating N, where N is a positive integer.

For example, a bandwidth is 320 MHz, including one hundred and forty-eight 26-tone RUs, and a basic granularity is an 8*26-tone RU. In this case, an offset has 20 values. The resource unit offset index may use five bits to indicate 20 values. For a correspondence between a resource unit offset index and a corresponding offset, refer to Table 7.

TABLE 7

| Resource unit offset index | Offset |
|---|---|
| 00000 | 0 |
| 00001 | 8*26-tone RU |
| 00010 | 16*26-tone RU |
| 00011 | 24*26-tone RU |
| 00100 | 32*26-tone RU |
| 00101 | 40*26-tone RU |
| 00111 | 48*26-tone RU |
| 00111 | 56*26-tone RU |
| 01000 | 64*26-tone RU |
| 01001 | 72*26-tone RU |
| 01010 | 80*26-tone RU |
| 01011 | 88*26-tone RU |
| 01100 | 96*26-tone RU |
| 01101 | 104*26-tone RU |
| 01110 | 112*26-tone RU |
| 01111 | 120*26-tone RU |
| 10000 | 128*26-tone RU |
| 10001 | 136*26-tone RU |
| 10010 | 144*26-tone RU |
| 10011 | 150*26-tone RU |

If the offset is eight 26-tone RUs, the resource unit offset index may be 00001. If the offset is sixteen 26-tone RUs, the resource unit offset index may be 00010.

The resource unit start index may use eight bits. The resource unit start index may indicate one of the one hundred and forty-eight 26-tone RUs. An STA may determine, based on the resource unit start index and the resource unit offset index, a first RU and a last RU for which channel state information needs to be fed back. Alternatively, the STA may determine, based on the resource unit start index and the resource unit offset index, a range of RUs for which channel state information needs to be fed back.

For example, if the resource unit start index indicates that a first RU for which a STA corresponding to the station information field needs to feed back channel state information is a ninth 26-tone RU of the one hundred and forty-eight 26-tone RUs, and the resource unit offset index is 00010, it can be determined that a last RU for which the STA needs to feed back channel state information is a $25^{th}$ 26-tone RU. RUs for which the STA needs to feed back channel state information are the ninth 26-tone RU to the $25^{th}$ 26-tone RU.

For another example, if an ordinal value of the last RU that is determined based on the resource unit start index and the resource unit offset index and for which the STA needs to feed back channel state information is greater than 148, it can be determined that the last RU for which the STA needs to feed back channel state information is a $148^{th}$ RU. For example, if the first RU that is indicated by the resource unit start index and for which channel state information needs to be fed back is a $142^{nd}$ RU of the one hundred and forty-eight 26-tone RUs, and the resource unit offset index indicates that the offset is eight 26-tone RUs, it can be determined that the last RU for which the STA needs to feed back channel state information is the $148^{th}$ RU.

It may be understood that a degree of compression of the resource unit offset index may be adjusted by adjusting the basic granularity. A larger basic granularity indicates a greater degree of compression. A greater degree of compression indicates a smaller quantity of bits required to indicate a same offset. In this way, the partial bandwidth information subfield can support indication of an RU that is in a larger bandwidth and for which channel state information needs to be fed back.

In another possible implementation, the partial bandwidth information subfield includes an RU indication index. The RU indication index includes a frequency domain indication part and an RU indication part. The frequency domain indication part is used to indicate a frequency domain range in which an RU for which a station corresponding to an AID needs to feed back channel state information is located. The RU indication part is used to indicate the RU for which channel state information needs to be fed back.

In a specific embodiment, a bandwidth is 320 MHz, and the 320 MHz is divided into four frequency domain ranges, which may also be referred to as four frequency segments. The four frequency domain ranges correspond to a first 80 MHz, a second 80 MHz, a third 80 MHz, and a fourth 80 MHz in the 320 MHz sequentially in ascending order of frequency. The frequency domain indication part may use two bits, and indicates that a frequency domain range in which an RU for which a STA needs to feed back channel state information is located is one of the four frequency domain ranges. For example, for a correspondence between a frequency domain indication part and an indicated frequency domain range, refer to Table 8.

TABLE 8

| Frequency domain indication part | Frequency domain range |
|---|---|
| 00 | First 80 MHz |
| 01 | Second 80 MHz |
| 10 | Third 80 MHz |
| 11 | Fourth 80 MHz |

The RU indication part uses seven bits, and is used to indicate that the RU for which channel state information needs to be fed back is one RU or a combination of a plurality of RUs in the frequency domain range indicated by the frequency domain indication part. For a relationship between an RU indication part and an indicated RU, refer to Table 9.

TABLE 9

| RU indication part (seven bits) | Description of an indicated RU (description) | Number of entries (number of entries) |
|---|---|---|
| 0-36 | May indicate thirty-seven 26-tone RUs in 80 MHz, respectively. (Possible 26-tone RU cases in 80 MHz) | 37 |
| 37-52 | May indicate sixteen 52-tone RUs in 80 MHz, respectively. (Possible 52-tone RU cases in 80 MHz) | 16 |
| 53-60 | May indicate eight 106-tone RUs in 80 MHz, respectively. (Possible 106-tone RU cases in 80 MHz) | 8 |
| 61-64 | May indicate four 242-tone RUs in 80 MHz, respectively. (Possible 242-tone RU cases in 80 MHz) | 4 |
| 65-66 | May indicate two 484-tone RUs in 80 MHz, respectively. (Possible 484-tone RU cases in 80 MHz) | 2 |
| 67 | Indicates one 996-tone RU in 80 MHz. (996-tone RU cases in 80 MHz) | 1 |
| 68-70 | Two 996-tone RUs | 3 |
| 71 | Four 996-tone RUs | 1 |
| 72-75 | A 106-tone RU at a low frequency in one 20 MHz of 80 MHz is combined with a center 26-tone RU in the 20 MHz. | 4 (Each entry corresponds to one 20 MHz) |
| 76-79 | A 106-tone RU at a high frequency in one 20 MHz of 80 MHz is combined with a center 26-tone RU in the 20 MHz. | 4 (Each entry corresponds to one 20 MHz) |
| 80-83 | A 52-tone RU at a second lowest frequency in one 20 MHz of 80 MHz is combined with an adjacent 26-tone RU on a same side in the 20 MHz. | 4 (Each entry corresponds to one 20 MHz) |
| 84-87 | A 52-tone RU at a second lowest frequency in one 20 MHz of 80 MHz is combined with a center 26-tone RU in the 20 MHz. | 4 (Each entry corresponds to one 20 MHz) |
| 88-91 | A 52-tone RU at a second highest frequency in one 20 MHz of 80 MHz is combined with a contiguous 26-tone RU on a same side in the 20 MHz. | 4 (Each entry corresponds to one 20 MHz) |
| 92-95 | A 52-tone RU at a second highest frequency in one 20 MHz of 80 MHz is combined with a center 26-tone RU in the 20 MHz. | 4 (Each entry corresponds to one 20 MHz) |
| 96-97 | A 484-tone RU in 80 MHz is combined with an adjacent 242-tone RU. | 2 (The two entries correspond to a 484-tone RU at a low frequency and a 484-tone RU at a high frequency, respectively) |
| 98-99 | A 484-tone RU in 80 MHz is combined with a non-adjacent 242-tone RU. | 2 (The two entries correspond to a 484-tone RU at a low frequency and a 484-tone RU at a high frequency, respectively) |

TABLE 9-continued

| RU indication part (seven bits) | Description of an indicated RU (description) | Number of entries (number of entries) |
|---|---|---|
| 100 | Two 242-tone RUs on two sides in 80 MHz are combined. | 1 |
| 101-102 | A currently indicated 996-tone RU is combined with a 484-tone RU that is in an adjacent 80 MHz and is not adjacent to the 996-tone RU. | 2 (The two entries correspond to a 484-tone RU that is located in an adjacent 80 MHz at a low frequency and a 484-tone RU that is located in an adjacent 80 MHz at a high frequency, respectively) |
| 103-104 | A currently indicated 996-tone RU is combined with a 484-tone RU and a 242-tone RU that are in an adjacent 80 MHz and are not adjacent to the 996-tone RU. | 2 (The two entries correspond to a 484-tone RU and a 242-tone RU that are located in an adjacent 80 MHz at a low frequency and a 484-tone RU and a 242-tone RU that are located in an adjacent 80 MHz at a high frequency, respectively) |
| 105-106 | A currently indicated 996-tone RU is combined with two 242-tone RUs in an adjacent 80 MHz. | 2 (The two entries correspond to two 242-tone RUs that are located in an adjacent 80 MHz at a low frequency and two 242-tone RUs that are located in an adjacent 80 MHz at a high frequency, respectively) |
| 107 | Two 996-tone RUs at a lowest frequency in 320 MHz are combined with a 996-tone RU at a highest frequency. | 1 |
| 108 | A 996-tone RU at a lowest frequency in 320 MHz is combined with two 996-tone RUs at a highest frequency. | 1 |
| 109 | Three 996-tone RUs at a lowest frequency in 320 MHz are combined. | 1 |
| 110 | Three 996-tone RUs at a highest frequency in 320 MHz are combined. | 1 |
| 111-126 | A 484-tone RU and a 242-tone RU that are in a currently indicated 80 MHz are combined with a 484-tone RU and a 242-tone RU that are in an adjacent 80 MHz. | 16 |
| 127 | Reserved | 1 |

The RU indication part of each entry in Table 9 is a decimal value. In the partial bandwidth information subfield, the RU indication part of the RU indication index is a binary value corresponding to the decimal value in Table 9.

It should be understood that a correspondence between the RU indication part and the indicated RU that are of each entry in Table 9 is merely an optional embodiment. In this application, the correspondence between an RU indication part and an indicated RU is not limited to the correspondence in Table 9. In another embodiment, the correspondence between an RU indication part and an indicated RU may be alternatively different from the correspondence in Table 9.

With reference to Table 8 and Table 9, in a specific example, first two bits of an RU indication index are a frequency domain indication part, and last seven bits of the RU indication index are an RU indication part. If the RU indication index is 000000001, 00 indicates a first 80 MHz, 0000001 indicates a second 26-tone RU in the 80 MHz, and therefore, 000000001 indicates that an RU for which a station needs to feed back channel state information is the second 26-tone RU in the first 80 MHz. If the RU indication index is 111000010, 11 indicates a fourth 80 MHz, 1000010 indicates a second 484-tone RU in the 80 MHz, and therefore, 111000010 indicates that an RU for which a station needs to feed back channel state information is the second 484-tone RU in the fourth 80 MHz.

In still another possible implementation, the partial bandwidth information subfield includes a resource unit start index and a resource unit end index. The resource unit start index is used to indicate a first RU for which a station corresponding to an AID needs to feed back channel state information. The resource unit end index is used to indicate a last RU for which the station corresponding to the AID needs to feed back channel state information.

In this implementation, the resource unit start index and the resource unit end index are compressed, and granularities of RUs indicated by the resource unit start index and the resource unit end index are increased. For example, the granularity is increased from a 26-tone RU to a 2*26-tone RU or a 4*26-tone RU.

Specifically, the first RU indicated by the resource unit start index is a $(k_1*n+c_1)^{th}$ 26-tone RU, where $c_1$ and $k_1$ are positive integers, and n is a natural number. The last RU indicated by the resource unit end index is a $(k_2*m+c_2)^{th}$ 26-tone RU, where $c_2$ and $k_2$ are positive integers, and m is a natural number. The resource unit start index indicates the first RU by indicating n. The resource unit end index indicates the last RU by indicating m. $k_1 \geq 2$ and/or $k_2 \geq 2$.

For example, in a specific embodiment, a bandwidth is 320 MHz, $k_1$ is 2, and $c_1$ is 1. A resource unit start index indicates a first, third, fifth, . . . , $(2n+1)^{th}$, or $147^{th}$ 26-tone RU, where $n \leq 73$. In this case, a granularity of a first RU indicated by the resource unit start index is a 2*26-tone RU. The resource unit start index indicates a total of 74 cases and requires seven bits. $k_2$ is 4, and $c_2$ is 2. Are source unit end index indicates a second, sixth, . . . , $(4n+2)^{th}$, or $150^{th}$ 26-tone RU. In this case, a granularity of a last RU indicated by the resource unit end index is a 4*26-tone RU. The resource unit end index indicates a total of 37 cases and requires six bits, and $n \leq 37$.

For a correspondence between a resource unit start index and an RU, refer to Table 10. For a correspondence between a resource unit end index and an RU, refer to Table 11.

TABLE 10

| Resource unit start index | RU |
| --- | --- |
| 0000000 | First 26-tone RU |
| 0000001 | Third 26-tone RU |
| 0000010 | Fifth 26-tone RU |
| . . . | . . . |
| 1001000 | $147^{th}$ 26-tone RU |

TABLE 11

| Resource unit end index | RU |
| --- | --- |
| 000000 | Second 26-tone RU |
| 000001 | Sixth 26-tone RU |
| 000010 | $10^{th}$ 26-tone RU |
| . . . | . . . |
| 100100 | $150^{th}$ 26-tone RU |

It may be understood that when an ordinal value of an RU indicated by the resource unit end index is greater than an ordinal value of a last RU corresponding to a bandwidth, the RU indicated by the resource unit end index is the last RU corresponding to the bandwidth. For example, in the foregoing example, when a bandwidth is 320 MHz, and the resource unit end index indicates the $150^{th}$ 26-tone RU, an indicated RU is actually a $148^{th}$ 26-tone RU.

A degree of compression of the partial bandwidth information subfield can be adjusted by adjusting a value of $k_1$ or $k_2$ or adjusting values of both $k_1$ and $k_2$. A larger $k_1$ indicates a greater degree of compression of the partial bandwidth information subfield, and a larger $k_2$ also indicates a greater degree of compression of the partial bandwidth information subfield. A greater degree of compression indicates a smaller quantity of bits required to indicate same partial bandwidth information. In this way, the partial bandwidth information subfield can indicate an RU that is in a larger bandwidth and for which channel state information needs to be fed back.

Optionally, when a bandwidth is less than or equal to 160 MHz, the partial bandwidth information subfield may indicate partial bandwidth information in a manner used in an HE NDPA frame.

It should be understood that the foregoing second station information field design solution may be implemented separately, or may be implemented in combination with any one of the foregoing type information indication solutions.

In an EHT NDPA frame specified by using the second station information field design solution, an octet quantity of a station information field is 4 and is consistent with an octet quantity of a station information field in an HE NDPA frame. The station information field in the EHT NDPA frame does not include an AID of an HE STA, an AID of a ranging STA, or an AID of a VHT STA, and a disambiguation subfield is set at another position that may be considered by the HE STA, the ranging STA, or the VHT STA to have an AID specified. In this way, the HE STA, the ranging STA, or the VHT STA can be prevented from misreading the EHT NDPA frame.

The following describes a design solution of a number of columns subfield in a station information field, where the design solution is provided in a case in which a column quantity indicated by a number of columns subfield in an NDPA frame is greater than 8. The number of columns subfield design solution is applicable to a case in which the station information field uses six octets, and is also applicable to a case in which the station information field uses four octets.

Specifically, a quantity of bits of the number of columns subfield may be increased to indicate a larger column quantity.

For example, when a quantity of columns for which feedback needs to be provided is in a range from 1 to 16, the number of columns subfield may use four bits. A 4-bit field can indicate $2^4$=16 cases. The number of columns subfield may indicate a column quantity by using a column quantity index. For a correspondence between a column quantity index and a column quantity, refer to Table 12.

TABLE 12

| Column quantity index | Quantity of columns |
| --- | --- |
| 0000 | 1 |
| 0001 | 2 |
| 0010 | 3 |
| . . . | . . . |
| 1110 | 15 |
| 1111 | 16 |

It should be understood that the correspondence between a column quantity index and a column quantity is not limited to the correspondence shown in Table 12. In another embodiment, the correspondence between a column quantity index and a column quantity may be flexibly set.

The foregoing number of columns subfield design solution may be implemented in combination with any one of the foregoing station information field design solutions, or may be implemented separately.

When a bandwidth corresponding to an NDPA frame is greater than 160 MHz and a column quantity indicated by a number of columns subfield is greater than 8, a design solution of a partial bandwidth information subfield in a station information field may be any one of the foregoing station information field design solutions that are provided in a case in which a bandwidth corresponding to an NDPA frame is greater than 160 MHz, and for a number of columns subfield design solution, reference may be made to the foregoing number of columns subfield design solution that is provided in a case in which a column quantity indicated by a number of columns subfield is greater than 8.

In an optional embodiment, when a bandwidth is less than or equal to 160 MHz, a partial bandwidth information subfield indicates partial bandwidth information in a manner used in an HE NDPA frame, whereas when a bandwidth is greater than 160 MHz, a partial bandwidth information subfield indicates partial bandwidth information according to the foregoing indication solutions of the partial bandwidth information subfield.

In another optional embodiment, when a bandwidth is less than or equal to 160 MHz, or a maximum quantity of columns for which feedback needs to be provided is less than or equal to 8, a station information field in an EHT NDPA frame may alternatively use the station information field design solution in any one of the foregoing embodiments of this application.

Further, regardless of whether a bandwidth is greater than 160 MHz or less than or equal to 160 MHz and whether a quantity of columns for which feedback needs to be provided is less than or equal to 8 or greater than 8, the station information field in the EHT NDPA frame uses a uniform format. That is, the station information field in the EHT NDPA frame uses a uniform format. In this way, an EHT STA can read station information fields in all EHT NDPA frames by using a uniform read policy. Therefore, it is more convenient for the EHT STA to read the EHT NDPA frames.

An embodiment of this application further provides another station information field design solution in which when a bandwidth is greater than 160 MHz, one station corresponds to two station information fields. In other words, an NDPA frame includes two station information fields corresponding to a same station. The two station information fields include an AID of the same station. The solution may be implemented in combination with any one of the foregoing type information indication solutions, or may be implemented separately.

A manner of indicating partial bandwidth information of the station is as follows: Partial bandwidth information subfields in the two station information fields jointly indicate a first RU and a last RU for which the STA corresponding to the AID needs to feed back channel state information. It may be understood that in this solution, a partial bandwidth information subfield corresponding to the STA that corresponds to the AID is divided into two parts, which are respectively transmitted in the two station information fields including the AID.

In this way, a station information field corresponding to a station can be newly added without changing a station information field that is originally included in an NDPA frame and that corresponds to the station. The two station information fields cooperate to indicate partial bandwidth information, thereby implementing indication of an RU that is in a larger bandwidth and for which channel state information needs to be fed back.

Further, in ascending order of frequency, when an indicated partial bandwidth belongs to a first 160 MHz of a bandwidth, a partial bandwidth information subfield in an EHT NDPA frame may use a setting manner of a partial bandwidth information subfield in an HE NDPA frame. When a partial bandwidth of a station belongs to a first 160 MHz of a bandwidth, an EHT NDPA frame includes two station information fields including an AID of the station. The two station information fields cooperate to indicate partial bandwidth information. Therefore, a quantity of bits occupied by a station information field corresponding to each station can be increased on demand, instead of blindly increasing a quantity of bits of station information fields corresponding to all stations, thereby reducing overheads.

Figure 9:
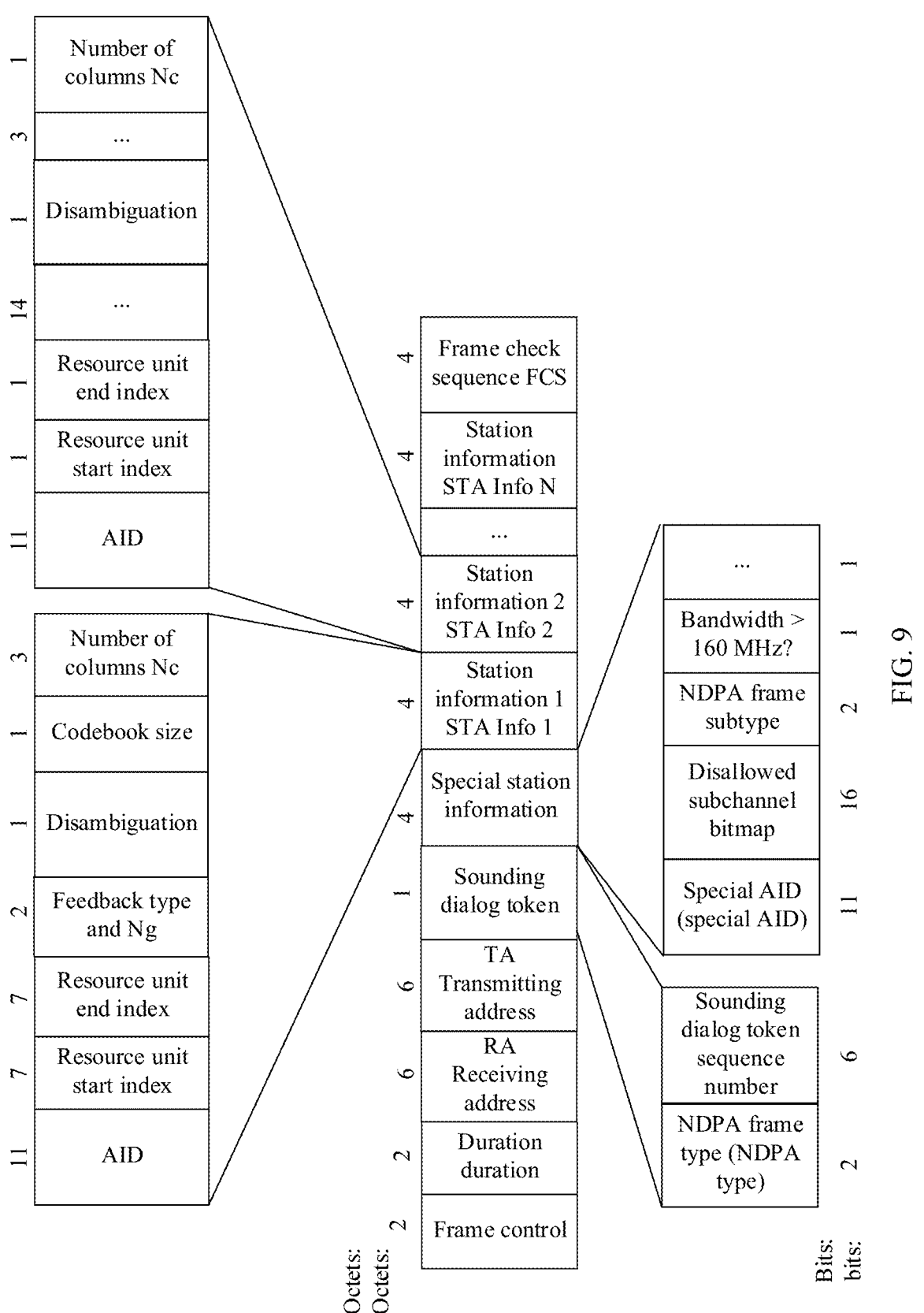
FIG. 9 is a schematic diagram of a structure of another NDPA frame according to an embodiment of this application.

FIG. 9 is a schematic diagram of a structure of another NDPA frame according to an embodiment of this application. In an embodiment, a resource unit start index in one of two station information fields and a resource unit start index in the other station information field indicate a first RU for which a station corresponding to a same AID needs to feed back channel state information, and a resource unit end index in the one station information field and a resource unit end index in the other station information field indicate a last RU for which the station corresponding to the same AID needs to feed back channel state information.

For example, of the two station information fields, the resource unit start index in the one station information field is seven bits, and the resource unit start index in the other station information field is one bit. In this case, the 7-bit resource unit start index in the one station information field and the 1-bit resource unit start index in the other station information field cooperate to indicate the first RU for which the STA corresponding to the same AID needs to feed back channel state information.

It may be understood that the 7-bit resource unit start index in the one station information field and the 1-bit resource unit start index in the other station information field jointly form a complete resource unit start index. The 1-bit resource unit start index in the other station information field may be a most significant bit (MSB), which may also be referred to as a highest bit, of the complete resource unit start index.

Similarly, the 1-bit resource unit end index in the one station information field and the 1-bit resource unit end index in the other station information field jointly form a complete resource unit end index. The complete resource unit end index can indicate the last RU for which the station needs to feed back channel state information. The 1-bit resource unit end index in the other station information field may be a most significant bit, which may also be referred to as a highest bit, of the complete resource unit end index.

Certainly, bit quantities of the resource unit start indexes and the resource unit end indexes in the two station information fields are not limited to the foregoing examples, and may be alternatively other values.

Figure 10:
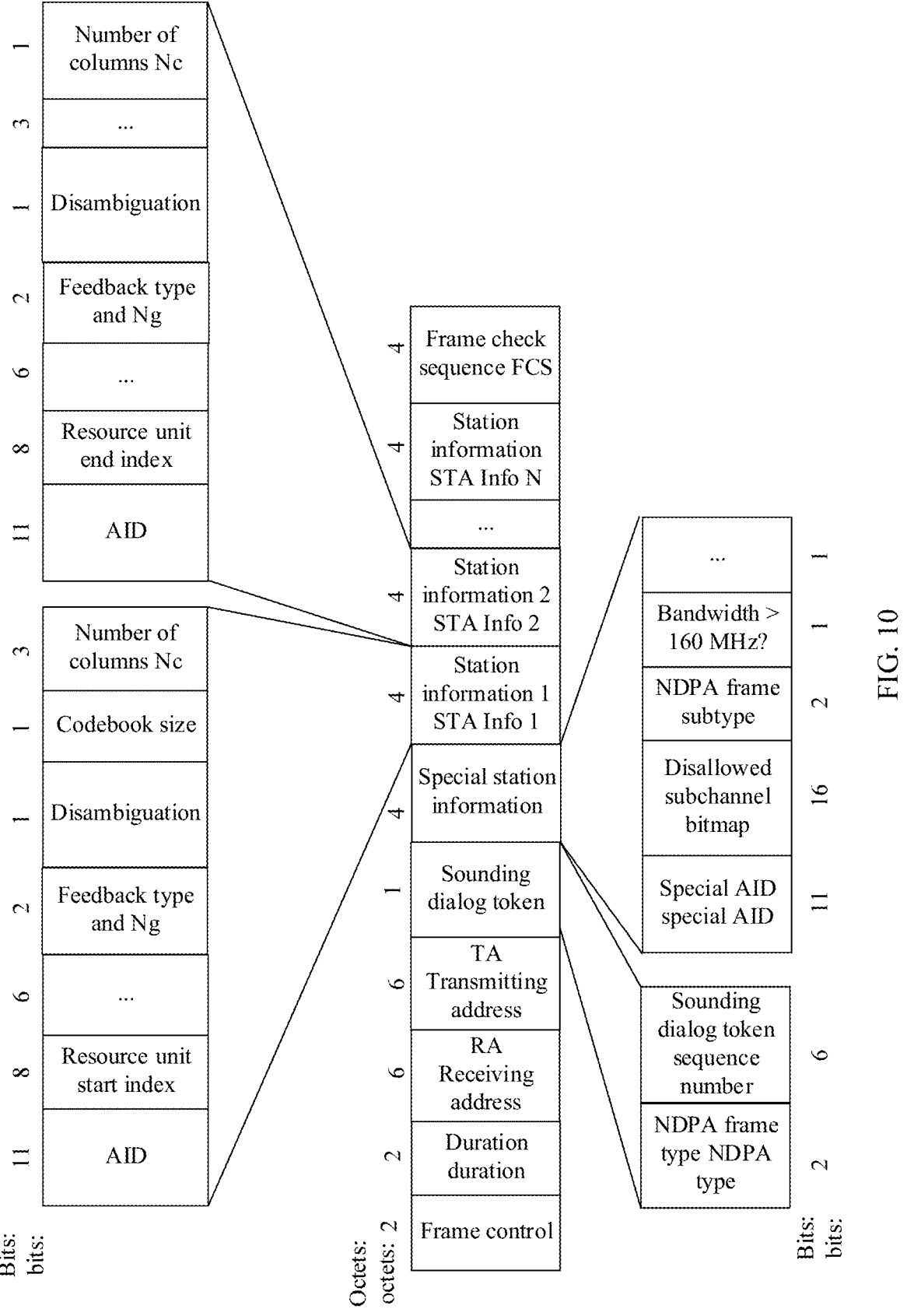
FIG. 10 is a schematic diagram of a structure of still another NDPA frame according to an embodiment of this application.

FIG. 10 is a schematic diagram of a structure of still another NDPA frame according to an embodiment of this application. As shown in FIG. 10, in another embodiment, one of two station information fields includes a resource unit start index but not a resource unit end index, and the other station information field includes a resource unit end index but not a resource unit start index. In this case, the resource unit start index in the one station information field indicates a first RU for which a STA corresponding to the two station information fields needs to feed back channel state information, and the resource unit end index in the other station information field indicates a last RU for which the STA corresponding to the two station information fields needs to feed back channel state information. In this way, in a scenario with a bandwidth of 320 MHz, both partial bandwidth information subfields in the two station information fields use only eight bits, thereby controlling an octet quantity of the station information field to be 4 or less, and supporting indication of an RU that is in 320 MHz and for which channel state information needs to be fed back. In this way, a quantity of bits of a partial bandwidth information subfield in each station information field are reduced, thereby increasing a quantity of bits of a number of columns subfield and also indicating a larger column quantity.

When a column quantity that needs to be indicated is greater than 8, an indication manner of the column quantity may be as follows: A number of columns subfield in one of two station information fields and a number of columns subfield in the other station information field indicate a quantity of columns for which a station corresponding to a same AID needs to feed back channel state information. In a possible embodiment, as shown in FIG. 9, a number of columns subfield in one station information field uses three bits, and a number of columns subfield in the other station information field uses one bit. The number of columns subfield in the one station information field and the number of columns subfield in the other station information field form a complete number of columns subfield. The complete number of columns subfield can accurately indicate a column quantity. The 1-bit number of columns subfield in the other station information field may be a most significant bit (MSB) or a highest bit of the complete number of columns subfield.

It may be understood that the foregoing partial bandwidth information indication manner may be implemented in combination with the foregoing column quantity indication manner, or may be implemented separately. This is not limited in this application.

Figure 11:
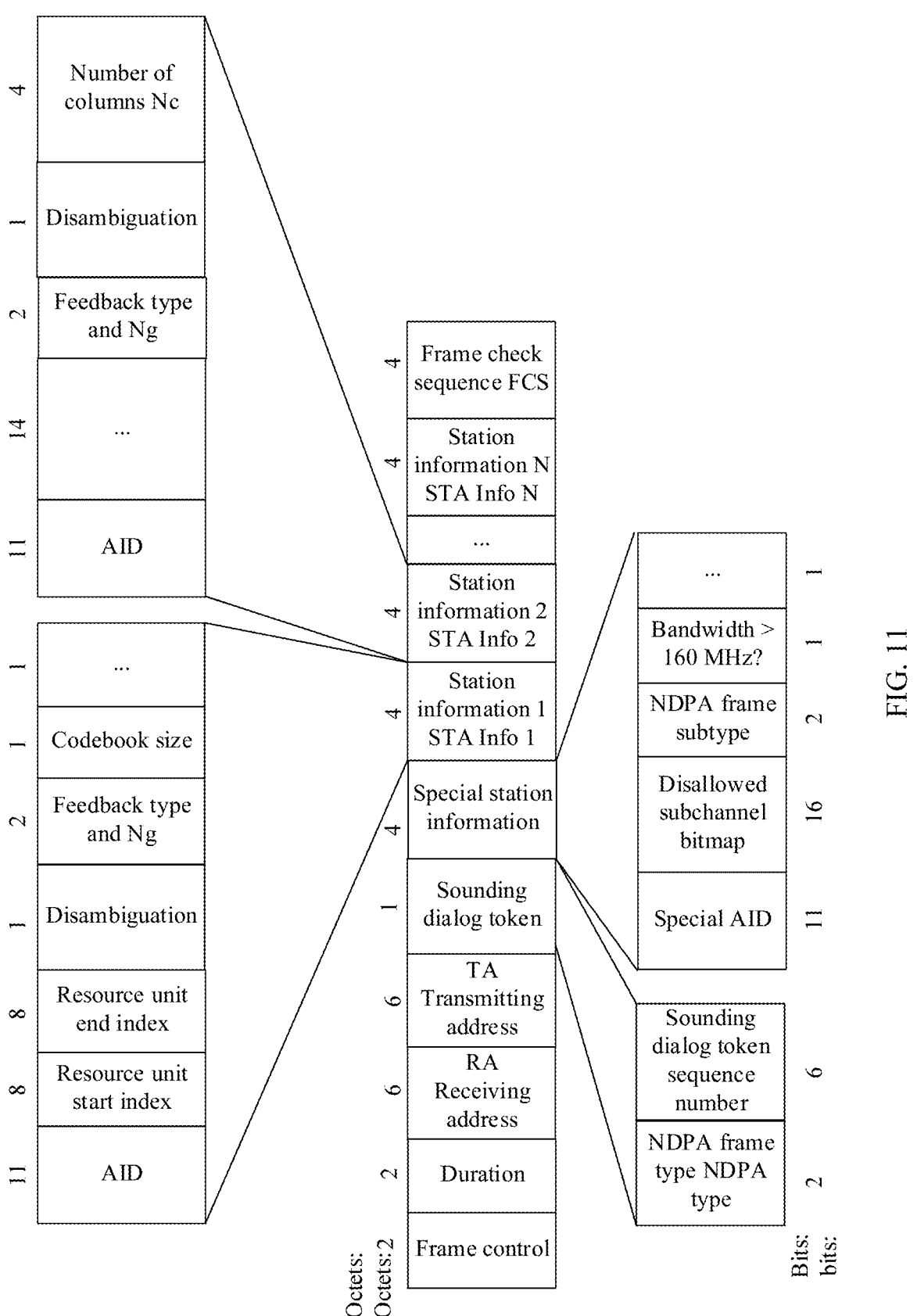
FIG. 11 is a schematic diagram of a structure of yet another NDPA frame according to an embodiment of this application.

FIG. 11 is a schematic diagram of a structure of still another NDPA frame according to an embodiment of this application. As shown in FIG. 11, in still another embodiment, one of two station information fields includes a partial bandwidth information subfield but not a number of columns subfield, and the other station information field includes a number of columns subfield but not a partial bandwidth information subfield.

Optionally, a station corresponds to two station information fields only when frequencies of a partial bandwidth for which the station needs to feed back channel state information are not in a first 160 MHz of an entire bandwidth in ascending order of frequency. The two station information fields include an AID of the station. That is, AIDs included in the two station information fields are the same. When the frequencies of the partial bandwidth for which the station needs to feed back channel state information are in the first 160 MHz of the entire bandwidth, the STA corresponds to only one station information field, thereby avoiding an increase in overheads caused by addition of an excess station information field.

The following describes in detail related content in a beamforming report fed back by a station.

As shown in Table 13, a beamforming report includes category information, EHT action information, EHT multiple input multiple output (MIMO) control information, a compressed beamforming report, and a multiuser exclusive beamforming report (MU exclusive beamforming report).

TABLE 13

| Sequence | Information |
|----------|-------------|
| 1 | Category |
| 2 | EHT action |
| 3 | EHT multiple input multiple output (MIMO) control |
| 4 | Compressed beamforming report |
| 5 | Multiuser exclusive beamforming report (MU exclusive beamforming report, Multiple User) |

Figure 12:
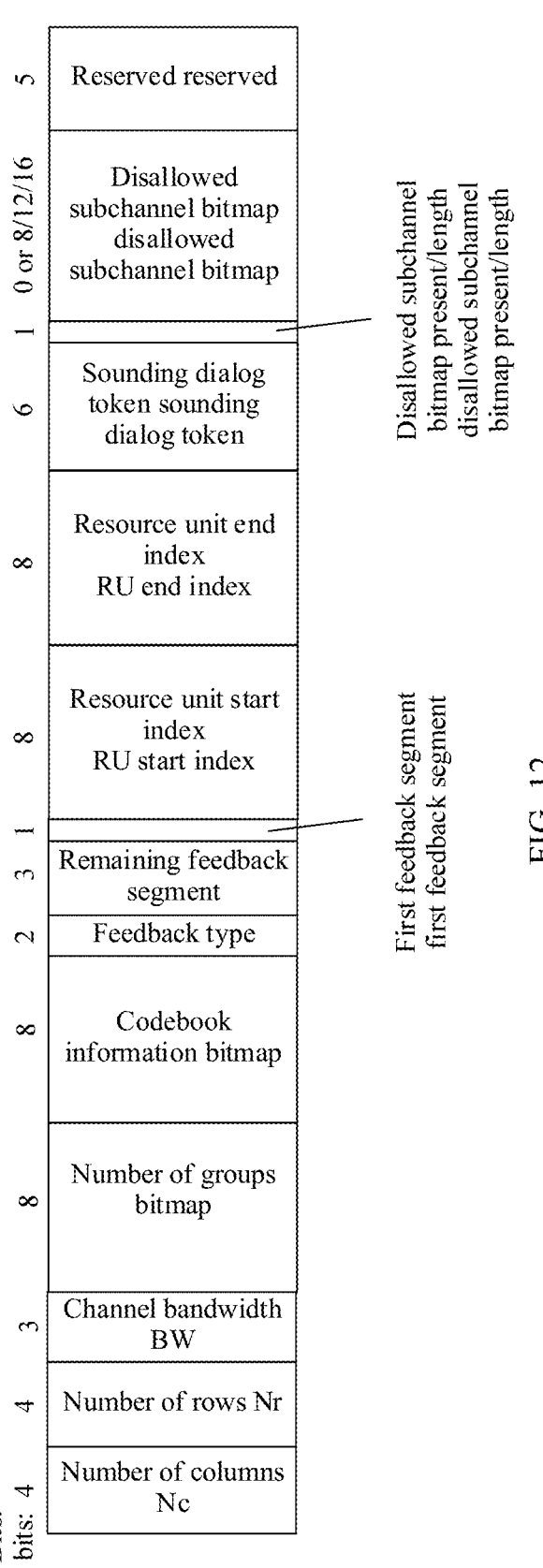
FIG. 12 is a schematic diagram of a structure of an EHT MIMO control field according to an embodiment of this application.

In some embodiments, a MIMO control field in a beamforming report is the EHT MIMO control field that carries EHT MIMO control information. FIG. 12 is a schematic diagram of a structure of an EHT MIMO control field according to an embodiment of this application. The EHT MIMO control field includes a number of columns subfield, a number of rows subfield, a bandwidth (BW) subfield, a number of groups subfield, a codebook information subfield, a feedback type subfield, a remaining feedback segment subfield, a first feedback segment subfield, a resource unit start index, a resource unit end index, a sounding dialog token subfield, a disallowed subchannel bitmap present/length subfield, and a disallowed subchannel bitmap.

The number of columns subfield is used to indicate a quantity of columns for which feedback needs to be provided. The number of rows subfield is used to indicate a quantity of rows for which feedback needs to be provided. The channel bandwidth subfield is used to indicate a bandwidth of a channel. The number of groups subfield is a number of groups bitmap, and is used to indicate how subcarriers are grouped. Channel state information of subcarriers in a same group is fed back together. The feedback type subfield is used to indicate a type of feedback. The remaining feedback segment subfield is used to indicate a segment that is not yet fed back. The first feedback segment subfield is used to indicate whether the segment is a first feedback segment. The resource unit start index is used to indicate a first RU for which a station needs to feed back channel state information. The resource unit end index is used to indicate a last RU for which a station needs to feed back channel state information.

The disallowed subchannel bitmap present/length subfield indicates whether a disallowed subchannel bitmap is present; and when a disallowed subchannel bitmap is present, indicates a length of the disallowed subchannel bitmap. For example, when an indication of the disallowed subchannel bitmap present/length subfield is 0, it may be understood as indicating that no disallowed subchannel bitmap is present.

In an example, each bit in the disallowed subchannel bitmap is used to indicate preamble puncturing information of 20 MHz. For a description of the disallowed subchannel bitmap in the EHT MIMO control field, refer to a related description of the disallowed subchannel bitmap in the NDPA frame in the foregoing embodiment. In this way, the EHT MIMO control field in the beamforming report also includes the disallowed subchannel bitmap. This can prevent the EHT MIMO control field from being misread. The resource unit start index and the resource unit end index in the EHT MIMO control field may be compressed by using any one of the foregoing solutions of compressing a quantity of bits of a partial bandwidth information subfield.

The disallowed subchannel bitmap present/length subfield may indicate a length of a disallowed subchannel bitmap by indicating a bandwidth or a bit quantity. For example, the disallowed subchannel bitmap present/length subfield may indicate that a bandwidth is 320 MHz, to indicate that the length of the disallowed subchannel bitmap is 16 bits; or the disallowed subchannel bitmap present/length subfield indicates that a bandwidth is 240 MHz, to indicate that the length of the disallowed subchannel bitmap is 12 bits; or the disallowed subchannel bitmap present/length subfield indicates that a bandwidth is 160 MHz, to indicate that the length of the disallowed subchannel bitmap is eight bits. Certainly, an indication manner of the disallowed subchannel bitmap present/length subfield and an indicated length are not limited to the foregoing examples. In another embodiment, the disallowed subchannel bitmap present/length subfield may perform indication in another manner, or may indicate another length.

In this way, a network device receiving the EHT MIMO control field can accurately receive the EHT MIMO control field based on the disallowed subchannel bitmap present/length subfield.

In an optional embodiment, the foregoing NDPA frame may be implemented by using a trigger frame. In other words, the NDPA frame in step 502 may be a trigger frame. The trigger frame includes content in the NDPA frame in any one of the foregoing embodiments provided in this application.

Figure 13:
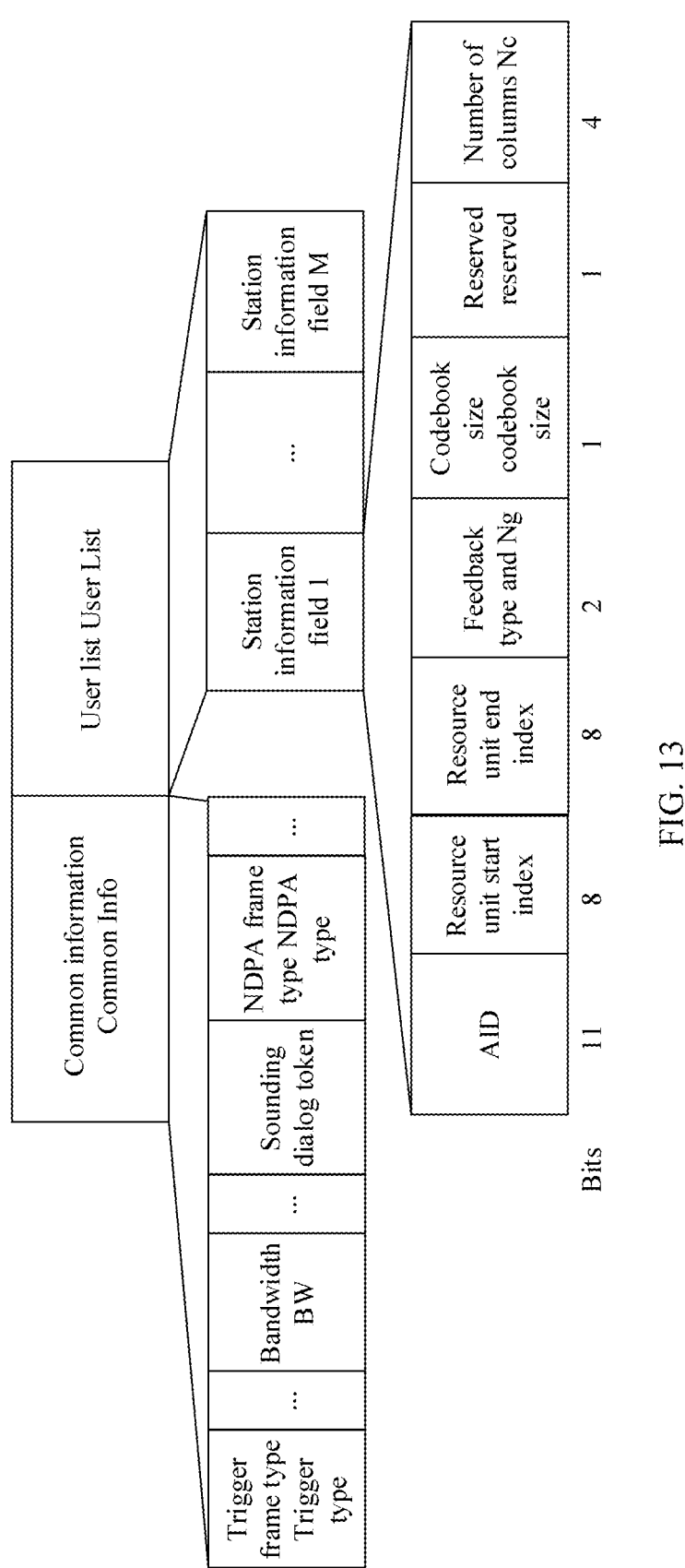
FIG. 13 is a schematic diagram of a structure of a trigger frame according to an embodiment of this application.

Specifically, refer to FIG. 13. FIG. 13 is a schematic diagram of a structure of a trigger frame. The trigger frame includes a trigger frame type field. The field indicates that the trigger frame is an NDPA trigger frame. The trigger frame further includes a bandwidth field, a sounding dialog token field, and an NDPA frame type field. Type information is carried in the NDPA frame type field and used to indicate an NDPA frame variant.

The design solutions of related content in the station information field in any one of the foregoing embodiments are all applicable to a station information field in the trigger frame. Details are not described herein again.

The station information field in the trigger frame may not include a disambiguation field. This is because in 802.11ax and earlier standard protocols, an NDPA frame is not transmitted by using a trigger frame. Accordingly, an HE STA and a STA that adapts to a standard occurring before 802.11ax (for example, a VHT STA) do not receive an NDPA frame by using a trigger frame, either. In the solution of transmitting an NDPA frame by using a trigger frame, there is no need to consider a problem that a device adapting to 802.11ax and earlier standard protocols misreads the NDPA frame. Therefore, there is no need to set the disambiguation field, either.

Figure 14:
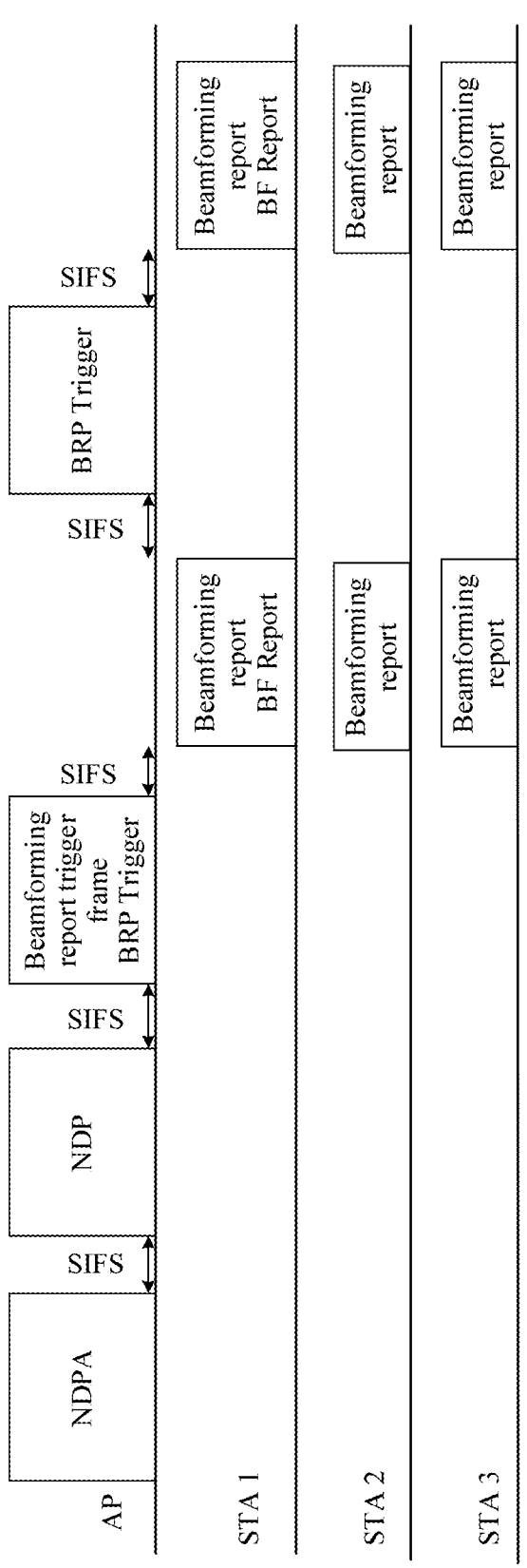
FIG. 14 is a schematic diagram of a feedback process of a beamforming report.

Further, refer to FIG. 14. FIG. 14 is a schematic diagram of a feedback process of a beamforming report. An NDPA frame is transmitted by using a trigger frame. Bfees include a plurality of stations (for example, a STA 1, a STA 2, and a STA 3 in FIG. 14). An AP first transmits the NDPA frame in a form of a trigger frame, and then transmits an NDP after an SIFS elapses.

The trigger frame can trigger a plurality of stations to simultaneously perform uplink transmission. For example, in FIG. 14, the STA 1, the STA 2, and the STA 3 can simultaneously feed back a beamforming report, thereby improving efficiency of channel sounding.

An embodiment of this application further provides another partial bandwidth information indication solution. Station information includes an RU indication index. The RU indication index indicates information about a bandwidth for which channel state information needs to be fed back by indicating an RU corresponding to a partial or full bandwidth for which channel state information needs to be fed back. The RU indication index may be understood as a partial bandwidth information field or a partial bandwidth information subfield.

A minimum RU granularity indicated by the RU indication index is one 242-tone RU. In this way, it is unnecessary to indicate a small RU, thereby helping reduce a quantity of bits of the RU indication index and reducing indication overheads.

The RU indication index indicates a size of an RU corresponding to a partial or full bandwidth for which channel state information needs to be fed back, and indicates a frequency position of the RU in a complete bandwidth.

Specifically, for a 242-tone RU, a corresponding bandwidth is 20 MHz, and 16 different RU indication indexes may be used to indicate different positions of the 242-tone RU in 320 MHz. For example, the 16 different RU indication indexes are used to indicate corresponding sixteen 20 MHz segments in 320 MHz in ascending order of frequency, respectively.

For a 484-tone RU, a corresponding bandwidth is 40 MHz, and eight different RU indication indexes may be used to indicate different positions of the 484-tone RU in 320 MHz. For example, the eight different RU indication indexes are used to indicate corresponding eight 40 MHz segments in 320 MHz in ascending order of frequency, respectively.

For a 242+484-tone RU, a corresponding bandwidth is 60 MHz, and 16 different RU indication indexes may be used to indicate different positions of the 242+484-tone RU in 320 MHz. For example, 320 MHz is understood as a first 80 MHz, a second 80 MHz, a third 80 MHz, and a fourth 80 MHz in ascending order of frequency. Four different RU indication indexes may be used to indicate positions of the 242+484-tone RU in the first 80 MHz, respectively; another four different RU indication indexes may be used to indicate positions of the 242+484-tone RU in the second 80 MHz, respectively; still another four different RU indication indexes may be used to indicate positions of the 242+484-tone RU in the third 80 MHz, respectively; and yet another four different RU indication indexes may be used to indicate positions of the 242+484-tone RU in the fourth 80 MHz, respectively.

For a 996-tone RU, a corresponding bandwidth is 80 MHz, and four different RU indication indexes may be used to indicate different positions of the 996-tone RU in 320 MHz. For example, the four different RU indication indexes are used to indicate corresponding four 80 MHz segments in 320 MHz in ascending order of frequency, respectively.

For a 484+996-tone RU, a corresponding bandwidth is 120 MHz; four different RU indication indexes may be used to indicate different positions of the 484+996-tone RU in 160 MHz that is of 320 MHz and that is at a lowest frequency, respectively; and another four different RU indication indexes may be used to indicate different positions of the 484+996-tone RU in 160 MHz that is of 320 MHz and that is at a highest frequency, respectively.

For a 2*996-tone RU, a corresponding bandwidth is 160 MHz, and six different RU indication indexes may be used to indicate different positions of the 2*996-tone RU in 320 MHz. Alternatively, a position of the 2*996-tone RU may be further specified. In a bandwidth of 320 MHz, only the 2*996-tone RU in 160 MHz at a lowest frequency and the 2*996-tone RU in 160 MHz at a highest frequency are supported, and correspond to only two different RU indication indexes.

For a 3*996-tone RU, a corresponding bandwidth is 240 MHz, and four different RU indication indexes may be used to indicate different positions of the 3*996-tone RU in 320 MHz.

For a 4*996-tone RU, a corresponding bandwidth is 320 MHz. In this case, it may be understood as indicating a full bandwidth, and one RU indication index may be used for indication.

The RU indication index may use, for example, but not limited to, six or seven bits.

It should be understood that a type of an RU indicated by the RU indication index is not limited to the foregoing example types, and the RU indication index may alternatively indicate an RU of another type and a position of the RU in a bandwidth.

For example, the RU indication index may use six bits. In an embodiment, the RU indication index may perform indication according to Table 14.

TABLE 14

| RU indication index (six bits) | Indicated bandwidth/RU (indicated BW/RU) | Comments (comments) |
|---|---|---|
| 000000 to 001111 | 242-tone RUs (20 MHz) | 16 options (16 options), corresponding to sixteen 20 MHz segments in ascending order of frequency, respectively |
| 010000 to 010011 | 242 + 484-tone RU in a first 80 MHz (242 + 484 in 1st 80 MHz Segment) | Four options (4 options) |
| 010100 to 010111 | 242 + 484-tone RU in a second 80 MHz (242 + 484 in 2nd 80 MHz Segment) | Four options (4 options) |
| 011000 to 011011 | 242 + 484-tone RU in a third 80 MHz (242 + 484 in 3rd 80 MHz Segment) | Four options (4 options) |
| 011100 to 011111 | 242 + 484-tone RU in a fourth 80 MHz (242 + 484 in 4th 80 MHz Segment) | Four options (4 options) |
| 100000 to 100111 | 484-tone RUs (40 MHz) | Eight options (8 options), corresponding to eight 40 MHz segments in ascending order of frequency, respectively |
| 101000 to 101011 | 484 + 996-tone RU in a first 160 MHz (484 + 996 in 1st 160 MHz) | Four options (4 options) |
| 101100 to 101111 | 484 + 996-tone RU in a second 160 MHz (484 + 996 in 2nd 160 MHz) | Four options (4 options) |
| 110000 to 110011 | 996-tone RU | Four options (4 options) |
| 110100 to 111001 | 2*996-tone RU | Six options (6 options) |
| 111010 to 111101 | 3*996-tone RU | Four options (4 options) |
| 111110 | Reserved (reserved) | One option (1 options) |
| 111111 | Full BW (full bandwidth) or 4*996-tone RU | One option (1 options) |

It should be understood that in Table 14, correspondences between the RU indication index and the indicated bandwidth/RU are arranged in ascending order of RU size. In another embodiment, correspondences between the RU indication index and the indicated bandwidth/RU are not limited to the correspondences in Table 14. The correspondences between the RU indication index and the indicated bandwidth/RU may be adjusted and converted, provided that a corresponding bandwidth/RU can be obtained based on an RU indication index.

Optionally, for an N*996-tone RU, a corresponding bandwidth is N*80 MHz, and fourteen different RU indication indexes may be used to indicate different positions of the N*996-tone RU in 320 MHz, where N=1, 2, or 3.

Optionally, the RU indication index indicating the N*996-tone RU may include four bits, which are used as a bitmap. Each of the four bits corresponds to one 80 MHz of 320 MHz. For example, if the bitmap is 1100, it indicates that the 2*996-tone RU is located in a first 80 MHz and a second 80

MHz of 320 MHz; or if the bitmap is 0010, it indicates that the 996-tone RU is located in a third 80 MHz of 320 MHz.

Optionally, the 4-bit bitmap is last four bits of the RU indication index.

For a 4*996-tone RU, a corresponding bandwidth is 320 MHz. In this case, it may be understood as indicating a full bandwidth, and one RU indication index may be used for indication. For example, according to the foregoing indication manner of the RU indication indexes corresponding to the N*996-tone RU, an RU indication index indicating the 4*996-tone RU also includes a 4-bit bitmap. The bitmap is 1111, indicating that the 4*996-tone RU is located in the first 80 MHz to a fourth 80 MHz of 320 MHz.

As shown in Table 14 to Table 21, an RU indication index indicating a 4*996-tone RU may be used to indicate a 4*996-tone RU, or may be used to indicate a full bandwidth (a complete bandwidth).

For example, the RU indication index may use six bits. In an embodiment, the RU indication index may perform indication according to Table 15-1.

TABLE 15-1

| RU indication index (six bits) | Indicated bandwidth/RU (indicated BW/RU) | Comments (comments) |
|---|---|---|
| 000000 to 001111 | 242-tone RUs (20 MHz) | 16 options (16 options), corresponding to sixteen 20 MHz segments in ascending order of frequency, respectively |
| 010000 to 010111 | 484-tone RUs (40 MHz) | Eight options (8 options), corresponding to eight 40 MHz segments in ascending order of frequency, respectively |
| 011000 to 011011 | 484 + 996-tone RU in a first 160 MHz (484 + 996 in 1st 160 MHz) | Four options (4 options) |
| 011100 to 011111 | 484 + 996-tone RU in a second 160 MHz (484 + 996 in 2nd 160 MHz) | Four options (4 options) |

TABLE 15-1-continued

| RU indication index (six bits) | Indicated bandwidth/RU (indicated BW/RU) | Comments (comments) |
|---|---|---|
| 100000 | Reserved (reserved) | One option (1 options) |
| 100001 to 101110 | N*996-tone RU (N = 1 to 3) | 14 options, last four least significant bits indicating four 80 MHz segments, respectively (14 options, last 4 LSB indicate each 80 MHz segment) |
| 101111 | Full BW (full bandwidth) or 4*996-tone RU | One option (1 options) |
| 110000 to 110011 | 242 + 484-tone RU in a first 80 MHz (242 + 484 in 1st 80 MHz Segment) | Four options (4 options) |
| 110100 to 110111 | 242 + 484-tone RU in a second 80 MHz (242 + 484 in 2nd 80 MHz Segment) | Four options (4 options) |
| 111000 to 111011 | 242 + 484-tone RU in a third 80 MHz (242 + 484 in 3rd 80 MHz Segment) | Four options (4 options) |
| 111100 to 111111 | 242 + 484-tone RU in a fourth 80 MHz (242 + 484 in 4th 80 MHz Segment) | Four options (4 options) |

Specific correspondences between 100001-101110 and indicated N*996-tone RUs may be shown in Table 16. Last four bits of 100001 to 101110 specifically indicate the N*996-tone RUs, and the last four bits implement a function of a bitmap.

TABLE 16

| RU indication index | Indicated RU (indicated RU) |
|---|---|
| 100001 | $4^{th}$ 80 MHz (fourth 80 MHz) |
| 100010 | $3^{rd}$ 80 MHz (third 80 MHz) |
| 100011 | $3^{rd}$ 80 MHz + $4^{th}$ 80 MHz (the third 80 MHz and the fourth 80 MHz) |
| 100100 | $2^{nd}$ 80 MHz (second 80 MHz) |
| 100101 | $2^{nd}$ 80 MHz + $4^{th}$ 80 MHz (the second 80 MHz and the fourth 80 MHz) |
| 100110 | $2^{nd}$ 80 MHz + $3^{rd}$ 80 MHz (the second 80 MHz and the third 80 MHz) |
| 100111 | $2^{nd}$ 80 MHz + $3^{rd}$ 80 MHz + $4^{th}$ 80 MHz (the second 80 MHz, the third 80 MHz, and the fourth 80 MHz) |
| 101000 | $1^{st}$ 80 MHz (first 80 MHz) |
| 101001 | $1^{st}$ 80 MHz + $4^{th}$ 80 MHz (the first 80 MHz and the fourth 80 MHz) |
| 101010 | $1^{st}$ 80 MHz + $3^{rd}$ 80 MHz (the first 80 MHz and the third 80 MHz) |
| 101011 | $1^{st}$ 80 MHz + $3^{rd}$ 80 MHz + $4^{th}$ 80 MHz (the first 80 MHz, the third 80 MHz, and the fourth 80 MHz) |
| 101100 | $1^{st}$ 80 MHz + $2^{nd}$ 80 MHz (the first 80 MHz and the second 80 MHz) |
| 101101 | $1^{st}$ 80 MHz + $2^{nd}$ 80 MHz + $4^{th}$ 80 MHz (the first 80 MHz, the second 80 MHz, and the fourth 80 MHz) |
| 101110 | $1^{st}$ 80 MHz + $2^{nd}$ 80 MHz + $3^{rd}$ 80 MHz (the first 80 MHz, the second 80 MHz, and the third 80 MHz) |
| 101111 | Full bandwidth or $1^{st}$ 80 MHz + $2^{nd}$ 80 MHz + $3^{rd}$ 80 MHz + $4^{th}$ 80 MHz (the first 80 MHz, the second 80 MHz, the third 80 MHz, and the fourth 80 MHz) |

When a bandwidth for which channel state information needs to be fed back is a full bandwidth, there are two indication solutions. The following separately describes the two indication solutions.

One of the two indication solutions is as follows: When a bandwidth for which channel state information needs to be fed back is a full bandwidth, an RU indication index indicates the full bandwidth or an RU corresponding to the full bandwidth, regardless of a size of a bandwidth. For example, when the bandwidth is 20 MHz, 40 MHz, 80 MHz, 160 MHz, or 320 MHz, the RU indication index indicates the full bandwidth or the RU corresponding to the full bandwidth (for example, in Table 15-1, an RU indication index (for example, 101111) is used to indicate the full bandwidth or the 4*996-tone RU).

The other indication solution is as follows: When a bandwidth for which channel state information needs to be fed back is a full bandwidth, an RU indication index (for example, in Table 15-1) indicating the 4*996-tone RU is used for indication only when a bandwidth is equal to the full bandwidth, for example, only when a bandwidth corresponding to an RU is 320 MHz, which is equal to the full bandwidth of 320 MHz, where the bandwidth for which channel state information needs to be fed back is the full bandwidth.

When the bandwidth for which channel state information needs to be fed back is the full bandwidth but a bandwidth is less than the full bandwidth, an RU indication index of an RU corresponding to the bandwidth is used for indication. Examples are as follows:

When the bandwidth is 20 MHz, if the bandwidth for which channel state information needs to be fed back is the full bandwidth, an RU indication index indicating a 242-tone RU in which the 20 MHz is located may be used for indication. For example, based on Table 15-1, one of 000000 to 001111 may be used for indication.

When the bandwidth is 40 MHz, if the bandwidth for which channel state information needs to be fed back is the full bandwidth, an RU indication index indicating a 484-tone RU in which the 40 MHz is located may be used for indication. For example, based on Table 15-1, one of 010000 to 010111 may be used for indication.

When the bandwidth is 80 MHz, if the bandwidth for which channel state information needs to be fed back is the full bandwidth, an RU indication index indicating a 996-tone RU in which the 80 MHz is located may be used for indication. For example, based on Table 15-1, one of 100001 to 101110 may be used for indication.

When the bandwidth is 160 MHz, if the bandwidth for which channel state information needs to be fed back is the full bandwidth, an RU indication index indicating a 2*996-tone RU in which the 160 MHz is located may be used for indication. For example, based on Table 15-1, one of 100001 to 101110 may be used for indication.

Optionally, rows in which the RU indication indexes 100001 to 101110 and 101111 are located in Table 15-1 may be replaced with Table 15-2 below.

TABLE 15-2

| | | |
|---|---|---|
| 100001 to 101111 | N*996-tone RU (N = 1 to 4) | 15 options, last four least significant bits indicating four 80 MHz segments, respectively (15 options, last 4 LSB indicate each 80 MHz segment) |

Correspondences between the RU indication index and the indicated bandwidth/RU in Table 15-1 may be adjusted and converted.

Optionally, the RU indication index may alternatively use seven bits, thereby supporting indication of more RU types.

Specifically, for a 2*996+484-tone RU, a corresponding bandwidth is 200 MHz, and 12 different RU indication indexes may be used to indicate different positions of the 2*996+484-tone RU in 320 MHz. Specifically, 240 MHz that is of 320 MHz and that is at a lowest frequency corresponds to six different RU indication indexes, which indicate 2*996+484-tone RUs that are in different positions in the 240 MHz at the lowest frequency; and 240 MHz that is of 320 MHz and that is at a highest frequency corresponds to another six different RU indication indexes.

For a 3*996+484-tone RU, a corresponding bandwidth is 280 MHz, and eight different RU indication indexes may be used to indicate different positions of the 3*996+484-tone RU in 320 MHz.

For example, the RU indication index may perform indication according to Table 17.

TABLE 17

| RU indication index (seven bits) | Indicated bandwidth/RU (indicated BW/RU) | Comments |
|---|---|---|
| 0000000 to 0001111 | 242-tone RUs (20 MHz) | 16 options (16 options), corresponding to sixteen 20 MHz segments in ascending order of frequency, respectively |
| 0010000 to 0010011 | 242 + 484-tone RU in a first 80 MHz (242 + 484 in 1st 80 MHz Segment) | Four options (4 options) |
| 0010100 to 0010111 | 242 + 484-tone RU in a second 80 MHz (242 + 484 in 2nd 80 MHz Segment) | Four options (4 options) |
| 0011000 to 0011011 | 242 + 484-tone RU in a third 80 MHz (242 + 484 in 3rd 80 MHz Segment) | Four options (4 options) |
| 0011100 to 0011111 | 242 + 484-tone RU in a fourth 80 MHz (242 + 484 in 4th 80 MHz Segment) | Four options (4 options) |
| 0100000 to 0100111 | 484-tone RUs (40 MHz) | Eight options (8 options), corresponding to eight 40 MHz segments in ascending order of frequency, respectively |
| 0101000 to 0101011 | 484 + 996-tone RU in a first 160 MHz (484 + 996 in 1st 160 MHz) | Four options (4 options) |
| 0101100 to 0101111 | 484 + 996-tone RU in a second 160 MHz (484 + 996 in 2nd 160 MHz) | Four options (4 options) |
| 0110000 to 0110011 | 996-tone RU | Four options (4 options) |
| 0110100 to 0111001 | 2*996-tone RU | Six options (6 options) |
| 0111010 to 1001101 | 2*996 + 484-tone RU | 12 options (12 options) |
| 1001110 to 1010001 | 3*996-tone RU | Four options (4 options) |
| 1010010 to 1011001 | 3*996 + 484-tone RU | Eight options (8 options) |
| 1011010 to 1111110 | Reserved (reserved) | 45 options (45 options) |
| 1111111 | Full bandwidth (full BW) | One option (1 options) |

For example, in another possible implementation, the RU indication index may perform indication according to Table 18. In Table 18, RU indication indexes other than an RU indication index indicating an N*996-tone RU are arranged in ascending order of RU size. The index indicating the N*996-tone RU includes a 4-bit bitmap.

TABLE 18

| RU indication index (six bits) | Indicated RU (indicated RU) | Comments |
|---|---|---|
| 000000 to 001111 | 242-tone RUs (20 MHz) | 16 options (16 options), corresponding to sixteen 20 MHz segments in ascending order of frequency, respectively |
| 010000 to 010011 | 242 + 484-tone RU in a first 80 MHz (242 + 484 in 1st 80 MHz Segment) | Four options (4 options) |
| 010100 to 010111 | 242 + 484-tone RU in a second 80 MHz (242 + 484 in 2nd 80 MHz Segment) | Four options (4 options) |
| 011000 to 011011 | 242 + 484-tone RU in a third 80 MHz (242 + 484 in 3rd 80 MHz Segment) | Four options (4 options) |
| 011100 to 011111 | 242 + 484-tone RU in a fourth 80 MHz (242 + 484 in 4th 80 MHz Segment) | Four options (4 options) |
| 100000 to 100111 | 484-tone RUs (40 MHz) | Eight options (8 options), corresponding to eight 40 MHz segments in ascending order of frequency, respectively |
| 101000 to 101011 | 484 + 996-tone RU in a first 160 MHz (484 + 996 in 1st 160 MHz) | Four options (4 options) |
| 101100 to 101111 | 484 + 996-tone RU in a second 160 MHz (484 + 996 in 2nd 160 MHz) | Four options (4 options) |
| 110000 | Reserved (reserved) | One option (1 options) |
| 110001 to 111110 | N*996-tone RU (N = 1 to 3) | 14 options, last four least significant bits indicating four 80 MHz segments, respectively (14 options, last 4 LSB indicate each 80 MHz segment) |
| 111111 | Full BW (full bandwidth) or 4*996-tone RU | One option (1 options) |

Optionally, the RU indication index may alternatively use seven bits, thereby supporting indication of more RU types. For example, for a 2*996+484-tone RU, a corresponding bandwidth is 200 MHz, and 12 different RU indication indexes may be used to indicate different positions of the 2*996+484-tone RU in 320 MHz. For a 3*996+484-tone RU, a corresponding bandwidth is 280 MHz, and eight different RU indication indexes may be used to indicate different positions of the 3*996+484-tone RU in 320 MHz.

For example, the RU indication index may perform indication according to Table 19. An index indicating an N*996-tone RU includes a 4-bit bitmap.

TABLE 19

| RU indication index (seven bits) | Indicated bandwidth/RU (indicated BW/RU) | Comments |
|---|---|---|
| 0000000 to 0001111 | 242-tone RUs (20 MHz) | 16 options (16 options), corresponding to sixteen 20 MHz segments in ascending order of frequency, respectively |
| 0010000 to 0010111 | 484-tone RUs (40 MHz) | Eight options (8 options), corresponding to eight 40 MHz segments in ascending order of frequency, respectively |
| 0011000 to 0011011 | 484 + 996-tone RU in a first 160 MHz (484 + 996 in 1st 160 MHz) | Four options (4 options) |
| 0011100 to 0011111 | 484 + 996-tone RU in a second 160 MHz (484 + 996 in 2nd 160 MHz) | Four options (4 options) |

TABLE 19-continued

| RU indication index (seven bits) | Indicated bandwidth/RU (indicated BW/RU) | Comments |
| --- | --- | --- |
| 0100000 | Reserved | One option (1 options) |
| 0100001 to 0101110 | N*996-tone RU (N = 1 to 3) | 14 options - last 4 LSB indicate each 80 MHz segment, '1' means segment is requested |
| 0101111 | Full BW (full bandwidth) or 4*996-tone RU | One option (1 options) |
| 0110000 to 0110011 | 242 + 484-tone RU in a first 80 MHz (242 + 484 in 1st 80 MHz Segment) | Four options (4 options) |
| 0110100 to 0110111 | 242 + 484-tone RU in a second 80 MHz (242 + 484 in 2nd 80 MHz Segment) | Four options (4 options) |
| 0111000 to 0111011 | 242 + 484-tone RU in a third 80 MHz (242 + 484 in 3rd 80 MHz Segment) | Four options (4 options) |
| 0111100 to 0111111 | 242 + 484-tone RU in a fourth 80 MHz (242 + 484 in 4th 80 MHz Segment) | Four options (4 options) |
| 1000000 to 1001011 | 2*996 + 484-tone RU | 12 options (12 options) |
| 1001100 to 1010011 | 3*996 + 484-tone RU | Eight options (8 options) |
| 1010100 to 1111111 | Reserved | 44 options (44 options) |

Correspondences between the RU indication index and the indicated bandwidth/RU in Table 19 may be adjusted and converted.

For example, in another possible implementation, the RU indication index may perform indication according to Table 20. In Table 20, RU indication indexes other than an RU indication index indicating an N*996-tone RU are arranged in ascending order of RU size. The index indicating the N*996-tone RU includes a 4-bit bitmap.

TABLE 20

| RU indication index (seven bits) | Indicated bandwidth/RU (indicated BW/RU) | Comments |
| --- | --- | --- |
| 0000000 to 0001111 | 242-tone RUs (20 MHz) | 16 options (16 options), corresponding to sixteen 20 MHz segments in ascending order of frequency, respectively |
| 0010000 to 0010011 | 242 + 484-tone RU in a first 80 MHz (242 + 484 in 1st 80 MHz Segment) | Four options (4 options) |
| 0010100 to 0010111 | 242 + 484-tone RU in a second 80 MHz (242 + 484 in 2nd 80 MHz Segment) | Four options (4 options) |
| 0011000 to 0011011 | 242 + 484-tone RU in a third 80 MHz (242 + 484 in 3rd 80 MHz Segment) | Four options (4 options) |
| 0011100 to 0011111 | 242 + 484-tone RU in a fourth 80 MHz (242 + 484 in 4th 80 MHz Segment) | Four options (4 options) |
| 0100000 to 0100111 | 484-tone RUs (40 MHz) | Eight options (8 options), corresponding to eight 40 MHz segments in ascending order of frequency, respectively |
| 0101000 to 0101011 | 484 + 996-tone RU in a first 160 MHz (484 + 996 in 1st 160 MHz) | Four options (4 options) |
| 0101100 to 0101111 | 484 + 996-tone RU in a second 160 MHz (484 + 996 in 2nd 160 MHz) | Four options (4 options) |
| 0110000 | Reserved (reserved) | One option (1 options) |
| 0110001 to 0111110 | N*996-tone RU (N = 1 to 3) | 14 options, last four least significant bits indicating four 80 MHz segments, respectively (14 options, last 4 LSB indicate each 80 MHz segment) |

TABLE 20-continued

| RU indication index (seven bits) | Indicated bandwidth/RU (indicated BW/RU) | Comments |
|---|---|---|
| 0111111 | Full BW (full bandwidth) or 4*996-tone RU | One option (1 options) |
| 1000000 to 1001011 | 2*996 + 484-tone RU | 12 options (12 options) |
| 1001100 to 1010011 | 3*996 + 484-tone RU | Eight options (8 options) |
| 1010100 to 1111111 | Reserved (reserved) | 44 options (44 options) |

In an optional embodiment, the RU indication index uses five bits, indicating a single RU. In this way, indication overheads can be further reduced.

For example, the RU indication index may perform indication according to Table 21.

TABLE 21

| RU indication index (five bits) | Indicated bandwidth/RU (indicated BW/RU) | Comments |
|---|---|---|
| 00000 to 01111 | 242-tone RUs (20 MHz) | 16 options (16 options), corresponding to sixteen 20 MHz segments in ascending order of frequency, respectively |
| 10000 to 10111 | 484-tone RUs (40 MHz) | Eight options (8 options), corresponding to eight 40 MHz segments in ascending order of frequency, respectively |
| 11000 to 11011 | 996-tone RU (80 MHz) | Four options (4 options) |
| 11100 to 11101 | 2*996-tone RU (160 MHz) | Two options (2 options) |
| 11110 | 4*996-tone RU (320 MHz) | One option (1 options) |
| 11111 | Reserved (reserved) | One option (1 options) |

In the foregoing embodiments provided in this application, the methods provided in embodiments of this application are separately described from perspectives of an access point and a station. To implement functions in the methods provided in the foregoing embodiments of this application, the access point and the station may include a hardware structure and a software module, and implement the foregoing functions in a form of the hardware structure, the software module, or a combination of the hardware structure and the software module. A function in the foregoing functions may be performed in a manner of the hardware structure, the software module, or a combination of the hardware structure and the software module.

Figure 15:
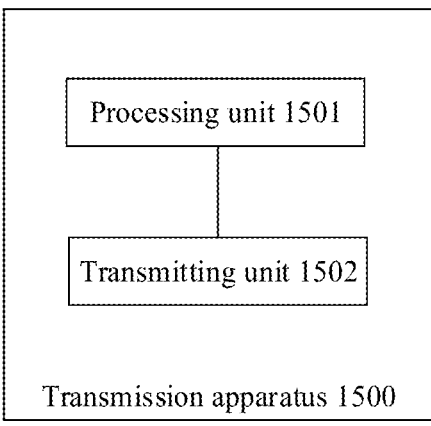
FIG. 15 is a schematic diagram of modules of a transmission apparatus according to an embodiment of this application.

FIG. 15 is a schematic diagram of a structure of a transmission apparatus according to an embodiment of this application. The transmission apparatus includes a processing unit 1501 and a transmitting unit 1502.

The processing unit 1501 is configured to generate an NDPA frame. The NDPA frame includes a station information field. The station information field includes an AID subfield indicating an association identifier AID of a station. The station information field further includes a partial bandwidth information subfield and/or a number of columns subfield. The partial bandwidth information subfield indicates an RU that is in a bandwidth corresponding to the NDPA frame and for which the station needs to feed back channel state information. The number of columns subfield indicates a quantity of columns in a compressed beamforming feedback matrix. The bandwidth corresponding to the NDPA frame is greater than 160 MHz. A column quantity indicated by the number of columns subfield is greater than 8.

The transmitting unit 1502 is configured to transmit the NDPA frame.

In this way, the partial bandwidth information subfield in the NDPA frame indicates an RU that is in a bandwidth greater than 160 MHz and for which channel state information needs to be fed back. In this case, the station information field can indicate the station to sound a channel with a bandwidth greater than 160 MHz, and feed back a beamforming report based on a channel sounding result, thereby implementing data transmission in a larger bandwidth and improving transmission efficiency. In addition, the column quantity indicated by the number of columns subfield is greater than 8. The station information field can indicate the station to sound a channel with a bandwidth whose column quantity is greater than 8, and feed back a beamforming report based on a channel sounding result, thereby implementing data transmission in more streams and improving transmission efficiency.

The transmission apparatus 1500 may be a communication apparatus or an access point, or the transmission apparatus 1500 may be deployed in a communication apparatus or in an access point. The processing unit 1501 of the transmission apparatus 1500 may be a processor, and the transmitting unit 1502 of the transmission apparatus 1500 may be a transceiver.

It should be understood that a related description of the foregoing NDPA frame transmission method is also applicable to the transmission apparatus 1500. Details are not described herein again.

Figure 16:
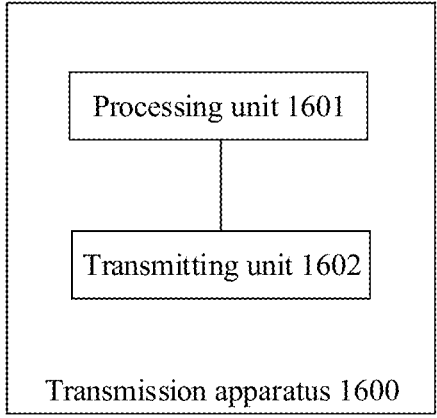
FIG. 16 is a schematic diagram of modules of a transmission apparatus according to another embodiment of this application.

FIG. 16 is a schematic diagram of a structure of a transmission apparatus according to an embodiment of this application. The transmission apparatus includes a processing unit 1601 and a transmitting unit 1602.

The processing unit 1601 is configured to generate an NDPA frame. The NDPA frame includes two station information fields. The two station information fields include an AID subfield indicating an association identifier AID of a same station. The transmitting unit 1602 is configured to transmit the NDPA frame.

The two station information fields meet at least one of the following:

partial bandwidth information subfields in the two station information fields jointly indicate an RU for which the station needs to feed back channel state information, and a bandwidth corresponding to the NDPA frame is greater than 160 MHz; or a number of columns subfield in one station information field and a number of columns subfield in the other station information field indicate a quantity of columns in a compressed beamforming feedback matrix, and a column quantity indicated by the number of columns subfields is greater than 8.

In this way, a station information field corresponding to a station can be newly added without changing a station information field that is originally included in an NDPA frame and that corresponds to the station. Partial bandwidth information subfields in the two station information fields cooperate to indicate an RU that is in a bandwidth greater than 160 MHz and for which channel state information needs to be fed back. The station can be indicated to sound a channel with a bandwidth greater than 160 MHz, and feed back a beamforming report based on a channel sounding result, thereby implementing data transmission in a larger bandwidth and improving transmission efficiency. Number of columns subfields in the two station information fields cooperate to indicate a column quantity greater than 8. The station can be indicated to sound a channel with a bandwidth whose column quantity is greater than 8, and feed back a beamforming report based on a channel sounding result, thereby implementing data transmission in more streams and improving transmission efficiency.

The transmission apparatus 1600 may be a communication apparatus or an access point, or the transmission apparatus 1600 may be deployed in a communication apparatus or in an access point. The processing unit 1601 of the transmission apparatus 1600 may be a processor, and the transmitting unit 1602 of the transmission apparatus 1600 may be a transceiver It should be understood that a related description of the foregoing NAPD frame transmission method is also applicable to the transmission apparatus 1600. Details are not described herein again.

Figure 17:
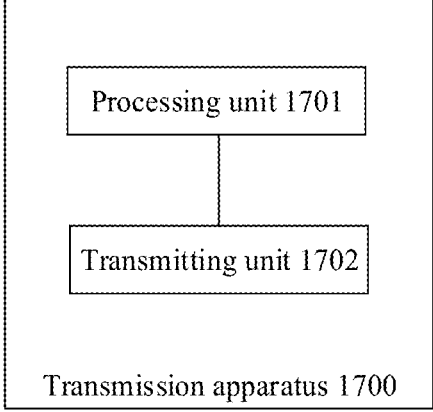
FIG. 17 is a schematic diagram of modules of a transmission apparatus according to still another embodiment of this application.

FIG. 17 is a schematic diagram of a structure of a transmission apparatus according to an embodiment of this application. The transmission apparatus includes a processing unit 1701 and a transmitting unit 1702.

The processing unit 1701 is configured to generate an NDPA frame. The NDPA frame includes a sounding dialog token field, a special station information field, and a station information field. The sounding dialog token field includes a frame type subfield. The special station information field includes a frame subtype subfield. The type information is carried in the frame type subfield and the frame subtype subfield. The frame type subfield indicates that the NDPA frame is not an HE NDPA frame or a ranging NDPA frame. The frame subtype subfield indicates that the NDPA frame is an EHT NDPA frame.

The transmitting unit 1702 is configured to transmit the NDPA frame.

In this way, the frame type subfield and the frame subtype subfield jointly indicate that the NDPA frame is an EHT NDPA frame. The EHT NDPA frame can indicate an RU that is in a bandwidth greater than 160 MHz and for which channel state information needs to be fed back, to indicate a station to sound a channel with a bandwidth greater than 160 MHz, and feed back a beamforming report based on a channel sounding result, thereby implementing data transmission in a larger bandwidth and improving transmission efficiency. The EHT NDPA frame can further indicate a column quantity greater than 8, to indicate a station to sound a channel with a bandwidth whose column quantity is greater than 8, and feed back a beamforming report based on a channel sounding result, thereby implementing data transmission in more streams and improving transmission efficiency. In addition, in this case, a new frame does not need to be defined, and an available type remaining in a MAC frame is fully utilized, thereby saving resources.

The transmission apparatus 1700 may be a communication apparatus or an access point, or the transmission apparatus 1700 may be deployed in a communication apparatus or in an access point. The processing unit 1701 of the transmission apparatus 1700 may be a processor, and the transmitting unit 1702 of the transmission apparatus 1700 may be a transceiver.

It should be understood that a related description of the foregoing NAPD frame transmission method is also applicable to the transmission apparatus 1700. Details are not described herein again.

Figure 18:
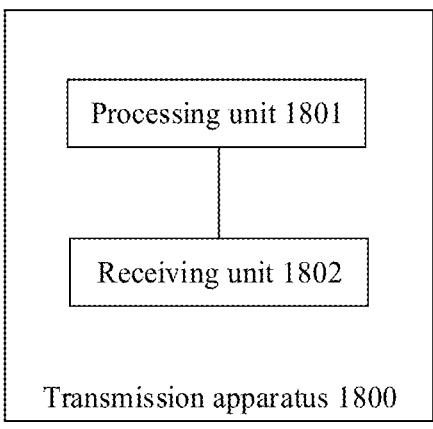
FIG. 18 is a schematic diagram of modules of a transmission apparatus according to yet another embodiment of this application.

FIG. 18 is a schematic diagram of a structure of a transmission apparatus according to an embodiment of this application. The transmission apparatus includes a processing unit 1801 and a receiving unit 1802.

The receiving unit 1802 is configured to receive an NDPA frame. The NDPA frame includes a station information field. The station information field includes an AID subfield indicating an association identifier AID of a station. The station information field further includes a partial bandwidth information subfield and/or a number of columns subfield. The partial bandwidth information subfield indicates an RU that is in a bandwidth corresponding to the NDPA frame and for which the station needs to feed back channel state information. The number of columns subfield indicates a quantity of columns in a compressed beamforming feedback matrix. The bandwidth corresponding to the NDPA frame is greater than 160 MHz. A column quantity indicated by the number of columns subfield is greater than 8.

The processing unit 1801 is configured to obtain, from the NDPA frame, the RU for which channel state information needs to be fed back.

In this way, the partial bandwidth information subfield in the NDPA frame indicates an RU that is in a bandwidth greater than 160 MHz and for which channel state information needs to be fed back. In this case, the station information field can indicate the station to sound a channel with a bandwidth greater than 160 MHz, and feed back a beamforming report based on a channel sounding result, thereby implementing data transmission in a larger bandwidth and improving transmission efficiency. In addition, the column quantity indicated by the number of columns subfield is greater than 8. In this case, the station information field can indicate the station to sound a channel with a bandwidth whose column quantity is greater than 8, and feed back a beamforming report based on a channel sounding result, thereby implementing data transmission in more streams and improving transmission efficiency.

The transmission apparatus may be a communication apparatus or a station, or the transmission apparatus may be deployed in a communication apparatus or in a station. The processing unit 1801 of the transmission apparatus 1800 may be a processor, and the receiving unit 1802 of the transmission apparatus 1800 may be a transceiver.

It should be understood that a related description of the foregoing NAPD frame transmission method is also applicable to the transmission apparatus 1800. Details are not described herein again.

Figure 19:
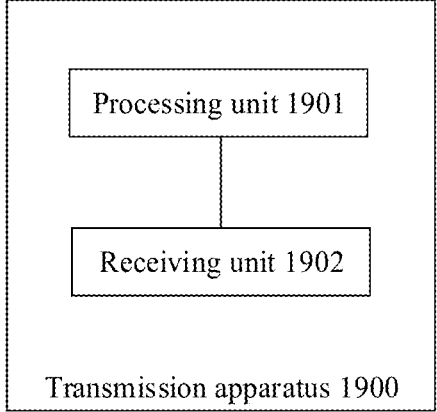
FIG. 19 is a schematic diagram of modules of a transmission apparatus according to still yet another embodiment of this application.

FIG. 19 is a schematic diagram of a structure of a transmission apparatus according to an embodiment of this application. The transmission apparatus includes a processing unit 1901 and a receiving unit 1902.

The receiving unit 1902 is configured to receive an NDPA frame. The NDPA frame includes two station information fields. The two station information fields include an AID subfield indicating an association identifier AID of a same station.

The two station information fields meet at least one of the following:

partial bandwidth information subfields in the two station information fields jointly indicate an RU for which the station needs to feed back channel state information, and a bandwidth corresponding to the NDPA frame is greater than 160 MHz; or a number of columns subfield in one of the two station information fields and a number of columns subfield in the other station information field indicate a quantity of columns in a compressed beamforming feedback matrix, and a column quantity indicated by the number of columns subfields is greater than 8.

The processing unit 1901 is configured to obtain, from the NDPA frame, the RU for which channel state information needs to be fed back and/or the quantity of the columns in the compressed beamforming feedback matrix.

In this way, a station information field corresponding to a station can be newly added without changing a station information field that is originally included in an NDPA frame and that corresponds to the station. Partial bandwidth information subfields in the two station information fields cooperate to indicate an RU that is in a bandwidth greater than 160 MHz and for which channel state information needs to be fed back. In this case, the station can be indicated to sound a channel with a bandwidth greater than 160 MHz, and feed back a beamforming report based on a channel sounding result, thereby implementing data transmission in a larger bandwidth and improving transmission efficiency. Number of columns subfields in the two station information fields cooperate to indicate a column quantity greater than 8. The station can be indicated to sound a channel with a bandwidth whose column quantity is greater than 8, and feed back a beamforming report based on a channel sounding result, thereby implementing data transmission in more streams and improving transmission efficiency.

The transmission apparatus may be a communication apparatus or a station, or the transmission apparatus may be deployed in a communication apparatus or in a station. The processing unit 1901 of the transmission apparatus 1900 may be a processor, and the receiving unit 1902 of the transmission apparatus 1900 may be a transceiver.

It should be understood that a related description of the foregoing NAPD frame transmission method is also applicable to the transmission apparatus 1900. Details are not described herein again.

Figure 20:
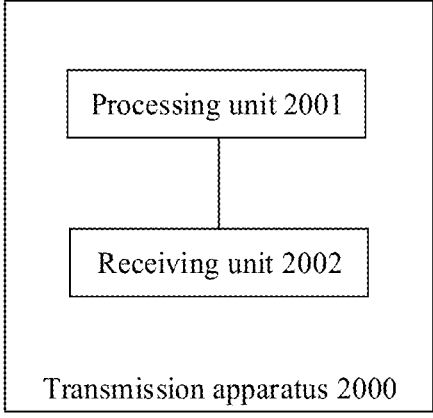
FIG. 20 is a schematic diagram of modules of a transmission apparatus according to a further embodiment of this application.

FIG. 20 is a schematic diagram of a structure of a transmission apparatus according to an embodiment of this application. The transmission apparatus includes a processing unit 2001 and a receiving unit 2002.

The receiving unit 2002 is configured to receive an NDPA frame. The NDPA frame includes a sounding dialog token field, a special station information field, and a station information field. The sounding dialog token field includes a frame type subfield. The special station information field includes a frame subtype subfield. The frame type subfield indicates that the NDPA frame is not an HE NDPA frame or a ranging NDPA frame. The frame subtype subfield indicates that the NDPA frame is an EHT NDPA frame.

The processing unit 2001 is configured to obtain the frame type subfield and the frame subtype subfield from the NDPA frame, to determine that the NDPA frame is an EHT NDPA frame.

In this way, the frame type subfield and the frame subtype subfield jointly indicate that the NDPA frame is an EHT NDPA frame. The EHT NDPA frame can indicate an RU that is in a bandwidth greater than 160 MHz and for which channel state information needs to be fed back, to indicate a station to sound a channel with a bandwidth greater than 160 MHz, and feed back a beamforming report based on a channel sounding result, thereby implementing data transmission in a larger bandwidth and improving transmission efficiency. The EHT NDPA frame can further indicate a column quantity greater than 8, to indicate a station to sound a channel with a bandwidth whose column quantity is greater than 8, and feed back a beamforming report based on a channel sounding result, thereby implementing data transmission in more streams and improving transmission efficiency. In addition, in this case, a new frame does not need to be defined, and an available type remaining in a MAC frame is fully utilized, thereby saving resources.

The transmission apparatus may be a communication apparatus or a station, or the transmission apparatus may be deployed in a communication apparatus or in a station. The processing unit 2001 of the transmission apparatus 2000 may be a processor, and the receiving unit 2002 of the transmission apparatus 2000 may be a transceiver.

It should be understood that a related description of the foregoing NAPD frame transmission method is also applicable to the transmission apparatus 2000. Details are not described herein again.

An embodiment of this application further provides a computer-readable storage medium. The computer-readable storage medium stores a computer program; and when the computer-readable storage medium is executed by a computer, functions of any one of the foregoing method embodiments are implemented.

An embodiment of this application further provides a computer program product. When the computer program product is executed by a computer, functions of any one of the foregoing method embodiments are implemented.

An embodiment of this application further provides a processor. The processor is configured to perform steps that can be performed by an access point in any one of the foregoing method embodiments, or is configured to perform steps that can be performed by a station in any one of the foregoing method embodiments. In a process of performing these methods, a process of sending the foregoing information and a process of receiving the foregoing information in the foregoing methods may be understood as a process of outputting the foregoing information by the processor and a process of receiving the foregoing input information by the processor. Specifically, when outputting the information, the processor outputs the information to a transceiver, so that the transceiver transmits the information. Still further, after the information is output by the processor, other processing may further need to be performed on the information before the information arrives at the transceiver. Similarly, when the processor receives the input information, the transceiver receives the information and inputs the information into the processor. Still further, after the transceiver receives the information, other processing may need to be performed on the information before the information is input into the processor.

In this case, for operations such as transmission, sending, and receiving related to the processor, if there is no particular statement, or if the operations do not contradict an actual function or internal logic of the operations in related descriptions, the operations may be more generally understood as operations such as output, receiving, and input of the processor, instead of operations such as transmission, sending, and receiving directly performed by a radio frequency circuit and an antenna.

In a specific implementation process, the processor may be a processor specially configured to perform these methods, or a processor, for example, a general-purpose processor, configured to execute computer instructions in a memory to perform these methods. The memory may be a non-transitory memory such as a read-only memory (ROM). The memory and the processor may be integrated on a same chip, or may be separately disposed on different chips. A type of the memory and a manner of disposing the memory and the processor are not limited in embodiments of the present invention.

An embodiment of this application further provides a chip system. The chip system includes a processor and an interface, and is configured to support a communication transmission device in implementing a function related to an access point or a station in any one of the foregoing method embodiments, for example, determining or processing at least one of data and information in the foregoing method. In a possible design, the chip system further includes a memory. The memory is configured to store information and data that are necessary for the communication apparatus. The chip system may include a chip, or may include a chip and another discrete component.

According to an eighteenth aspect, an embodiment of this application provides a functional entity. The functional entity is configured to implement the foregoing NDPA frame transmission method.

It should be further understood that "first", "second", "third", "fourth", and various numbers in this specification are merely used for differentiation for ease of description, and are not construed as a limitation on the scope of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution orders in various embodiments of this application. The execution orders of the processes should be determined based on functions and internal logic of the processes, and should not be construed as any limitation on the implementation processes of embodiments of this application.

A person of ordinary skill in the art may be aware that units and algorithm steps in the examples described with reference to embodiments disclosed in this application can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located in one location, or may be distributed on a plurality of network units. Some or all of the units may be selected depending on actual requirements to achieve the objectives of the solutions in the embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a computer software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

A sequence of the steps of the method in embodiments of this application may be adjusted, combined, and deleted based on an actual requirement.

The modules in the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, a person of ordinary skill in the art should understand that modifications to the technical solutions described in the foregoing embodiments or equivalent replacements to some technical features thereof may still be made, without departing from the scope of the technical solutions of embodiments of this application.

What is claimed is:

1. A null data packet announcement (NDPA) frame transmission method, comprising:

generating an NDPA frame, wherein the NDPA frame comprises a station information field, and the station information field comprises a partial bandwidth information subfield, the partial bandwidth information subfield indicates a resource unit (RU) that is in a bandwidth corresponding to the NDPA frame and for which the station needs to feed back channel state information, and the bandwidth corresponding to the NDPA frame is 320 MHz, and the RU that is in the 320 MHz indicated by the partial bandwidth information subfield is a 242+484-tone RU or 484+996-tone RU; and transmitting the NDPA frame.

2. The method according to claim 1, wherein the NDPA frame comprises type information, and the type information indicates that the NDPA frame is an extremely high throughput (EHT) NDPA frame.

3. The method according to claim 1, wherein the station information field comprises four octets.

4. The method according to claim 1, wherein the partial bandwidth information subfield is nine bits.

5. The method according to claim 1, wherein the partial bandwidth information subfield comprises eight different RU indication indexes, and four of the eight different RU indication indexes indicate the 484+996-tone RU at different positions in the lowest 160 MHz of the 320 MHz respectively, and another four of the eight different RU indication indexes indicate the 484+996-tone RU at different positions in the highest 160 MHz of the 320 MHz respectively.

6. A communication apparatus, comprising a processor and a memory, wherein the memory is configured to store instructions, and when the processor runs the instructions, the communication apparatus is configured to perform operations comprising:

generating a null data packet announcement (NDPA) frame, wherein the NDPA frame comprises a station information field, and the station information field comprises a partial bandwidth information subfield, the partial bandwidth information subfield indicates a resource unit (RU) that is in a bandwidth corresponding to the NDPA frame and for which the station needs to feed back channel state information, and the bandwidth corresponding to the NDPA frame is 320 MHz, and the RU that is in the 320 MHz indicated by the partial bandwidth information subfield is a 242+484-tone RU or 484+996-tone RU; and transmitting the NDPA frame.

7. The communication apparatus according to claim 6, wherein the NDPA frame comprises type information, and the type information indicates that the NDPA frame is an extremely high throughput (EHT) NDPA frame.

8. The communication apparatus according to claim 6, wherein the partial bandwidth information subfield is nine bits.

9. The communication apparatus according to claim 6, wherein the partial bandwidth information subfield comprises eight different RU indication indexes, and four of the eight different RU indication indexes indicate the 484+996-tone RU at different positions in the lowest 160 MHz of the 320 MHz respectively, and another four of the eight different RU indication indexes indicate the 484+996-tone RU at different positions in the highest 160 MHz of the 320 MHz respectively.

10. A non-transitory computer-readable storage medium, wherein the computer-readable storage medium stores computer instructions, and the computer instructions instruct a communication device to perform operations comprising:

generating a null data packet announcement (NDPA) frame, wherein the NDPA frame comprises a station information field, and the station information field comprises a partial bandwidth information subfield, the partial bandwidth information subfield indicates a resource unit (RU) that is in a bandwidth corresponding to the NDPA frame and for which the station needs to feed back channel state information, and the bandwidth corresponding to the NDPA frame is 320 MHz, and the RU that is in the 320 MHz indicated by the partial bandwidth information subfield is a 242+484-tone RU or 484+996-tone RU; and transmitting the NDPA frame.

11. The non-transitory computer-readable storage medium according to claim 10, wherein the NDPA frame comprises type information, and the type information indicates that the NDPA frame is an extremely high throughput (EHT) NDPA frame.

12. The non-transitory computer-readable storage medium according to claim 10, wherein the partial bandwidth information subfield is nine bits.

13. The non-transitory computer-readable storage medium according to claim 10, wherein the partial bandwidth information subfield comprises eight different RU indication indexes, and four of the eight different RU indication indexes indicate the 484+996-tone RU at different positions in the lowest 160 MHz of the 320 MHz respectively, and another four of the eight different RU indication indexes indicate the 484+996-tone RU at different positions in the highest 160 MHz of the 320 MHz respectively.

* * * * *